(12) United States Patent
Yerramalli et al.

(10) Patent No.: US 10,764,920 B2
(45) Date of Patent: Sep. 1, 2020

(54) SEMI-PERSISTENT SCHEDULING FOR SHARED SPECTRUM DOWNLINK

(71) Applicant: QUALCOMM Incorporated, San Diego, CA (US)

(72) Inventors: Srinivas Yerramalli, San Diego, CA (US); Farhad Meshkati, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/170,438

(22) Filed: Oct. 25, 2018

(65) Prior Publication Data

US 2019/0166621 A1    May 30, 2019

Related U.S. Application Data

(60) Provisional application No. 62/591,084, filed on Nov. 27, 2017.

(51) Int. Cl.
*H04W 72/04* (2009.01)
*H04W 72/12* (2009.01)
(Continued)

(52) U.S. Cl.
CPC ......... *H04W 74/004* (2013.01); *H04L 5/0082* (2013.01); *H04W 16/14* (2013.01); *H04W 72/1294* (2013.01)

(58) Field of Classification Search
CPC ........... H04W 74/004; H04W 72/0486; H04W 28/0236; H04W 72/0446; H04W 16/14;
(Continued)

(56) References Cited

U.S. PATENT DOCUMENTS

| 2013/0163543 A1* | 6/2013 | Freda | H04W 72/0406 |
| | | | 370/329 |
| 2013/0208587 A1* | 8/2013 | Bala | H04W 16/14 |
| | | | 370/230 |

(Continued)

FOREIGN PATENT DOCUMENTS

| WO | WO-2013120253 A1 * | 8/2013 | ............ H04W 72/12 |
| WO | WO-2017148956 A1 * | 9/2017 | ........ H04W 74/0808 |

OTHER PUBLICATIONS

International Search Report and Written Opinion—PCT/US2018/057704—ISA/EPO—dated Jan. 18, 2019.

(Continued)

*Primary Examiner* — Edan Orgad
*Assistant Examiner* — Vanneilian Lalchinthang
(74) *Attorney, Agent, or Firm* — Liem T. Do

(57) ABSTRACT

Methods, systems, and devices for wireless communications are described. A user equipment (UE) may receive a semi-persistent scheduling (SPS) configuration message from a base station, the SPS configuration message containing at least one SPS parameter for downlink SPS communications over a shared radio frequency spectrum band. The UE may identify, based on the SPS configuration, one or more subframes or slots allocated for the downlink SPS communications. The UE may perform the downlink SPS communications during the one or more subframes or slots and according to the SPS configuration.

49 Claims, 26 Drawing Sheets

(51) Int. Cl.
*H04W 74/00* (2009.01)
*H04L 5/00* (2006.01)
*H04W 16/14* (2009.01)

(58) Field of Classification Search
CPC ............. H04W 72/1294; H04L 5/0082; H04L 5/0098; H04L 1/22; H04L 5/001
USPC ........................................................ 370/329
See application file for complete search history.

(56) References Cited

U.S. PATENT DOCUMENTS

| | | | | |
|---|---|---|---|---|
| 2014/0362832 | A1* | 12/2014 | Rudolf | H04W 72/0413 370/336 |
| 2015/0131536 | A1* | 5/2015 | Kaur | H04L 5/001 370/329 |
| 2015/0358986 | A1* | 12/2015 | Yang | H04W 72/12 370/280 |
| 2016/0218849 | A1* | 7/2016 | Bertrand | H04L 5/0055 |
| 2017/0079013 | A1* | 3/2017 | Noh | H04W 72/042 |
| 2018/0242367 | A1* | 8/2018 | Kim | H04W 72/04 |
| 2018/0302926 | A1* | 10/2018 | Bhorkar | H04W 28/065 |
| 2018/0376490 | A1* | 12/2018 | Lunttila | H04L 5/0055 |
| 2019/0116005 | A1* | 4/2019 | Harada | H04W 16/14 |

OTHER PUBLICATIONS

Nokia, et al: "Autonomous Uplink Access," 3GPP Draft; R2-1708483 Autonomous Uplink Access, 3rd Generation Partnership Project (3GPP), Mobile Competence Centre; 650, Route Des Lucioles; F-06921, Sophia-Antipolis Cedex; France, vol. RAN WG2, no. Berlin, Germany; Aug. 21, 2017-Aug. 25, 2017, Aug. 20, 2017, XP051318338, 108 pages, Retrieved from the Internet: URL: http://www.3gpp.org/ftp/Meetings_3GPP_SYNC/RAN2/Docs/ [retrieved on Aug. 20, 2017].

* cited by examiner

SEMI-PERSISTENT SCHEDULING FOR SHARED SPECTRUM DOWNLINK

CROSS REFERENCES

The present Application for Patent claims the benefit of U.S. Provisional Patent Application No. 62/591,084 by YERRAMALLI, et al., entitled "SEMI-PERSISTENT SCHEDULING FOR SHARED SPECTRUM DOWNLINK," filed Nov. 27, 2017, assigned to the assignee hereof, and expressly incorporated herein.

BACKGROUND

The following relates generally to wireless communication, and more specifically to semi-persistent scheduling (SPS) for shared spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Certain wireless communication systems may operate in a shared or unlicensed radio frequency spectrum band (e.g., in a MulteFire network) that base stations and/or UE may use without a licensed frequency anchor carrier. Access to the medium for wireless communications in a shared or unlicensed radio frequency spectrum band, however, is not guaranteed. Instead, wireless devices attempting to access the channel for wireless communications may perform a contention based process (e.g., a clear channel assessment (CCA) procedure, a listen-before-talk (LBT) procedure, and the like) to capture the channel. When successful, these contention based processes may permit the wireless devices to transmit on the channel during dynamically determined transmission opportunities (TxOPs). When unsuccessful, the wireless devices may perform a backoff procedure and may further attempt to communicate on the channel at a later time.

Wireless communication systems operating in a licensed radio frequency spectrum band may utilize semi-persistent scheduling (SPS) techniques. Broadly, SPS addresses a scenario in which a UE is expected to periodically transmit or receive data consistently over a time period. One example may involve voice calls over cellular, or other processes involving small packet transmissions with predictable payload over the time period. One advantage of SPS is a reduction of control signaling overhead. Conventional systems, however, have not adapted SPS techniques for use in a shared or unlicensed radio frequency spectrum where channel access is not guaranteed.

SUMMARY

The described techniques relate to improved methods, systems, devices, or apparatuses that support semi-persistent scheduling (SPS) for shared spectrum. Generally, the described techniques provide for implementation of semi-persistent scheduling (SPS) techniques in a shared or unlicensed radio frequency spectrum band, such as a MulteFire network. Aspects of the described techniques may be utilized for uplink and/or downlink wireless communications. Broadly, an SPS configuration may be deployed for wireless devices operating in the shared or unlicensed radio frequency spectrum band. The SPS configuration may include an SPS periodicity, hybrid automatic repeat request (HARQ) processes for the SPS configuration, and the like. Generally, the SPS configuration may provide for subframes or slots scheduled for uplink (from a user equipment (UE)) and/or downlink (from a base station) wireless transmissions to a receiving device. The base station may configure and provide the SPS configuration information to one or more UEs operating within the coverage area of the base station and then perform SPS communications (e.g., uplink and/or downlink) with the UE during certain subframes or slots and according to the SPS configuration.

In some aspects, the described techniques provide for retransmission of an SPS message when a previous attempt was unsuccessful (e.g., when the medium is busy and cannot be captured and/or the receiving device was unable to properly decode the SPS message).

In some aspects, the SPS message retransmission may be grant-based (e.g., transmitted via an uplink grant or downlink grant). For example, a downlink SPS message may not be successful in a downlink SPS subframe or slot (e.g., the UE may not capture the channel, and/or the base station may receive no acknowledgement (ACK) message). Accordingly, the base station may transmit a downlink grant indication to the UE and the UE may use the resources allocated in the downlink grant for retransmission of the message. In an uplink SPS message scenario, the base station may not receive and/or properly decode the uplink message from the UE during an SPS subframe or slot. Accordingly, the base station may configure and transmit an uplink grant indication to the UE that allocates resources for the retransmission of the uplink message. The UE may receive the uplink grant and use the allocated resources for retransmission of the uplink message.

In some aspects, the SPS message retransmission may be a grantless retransmission. For example, a downlink SPS message may not be successful in a downlink SPS subframe or slot. Accordingly, the base station may transmit a grantless retransmission of the message during a subsequent subframe or slot of the SPS configuration. The UE may monitor the SPS subframes or slots (e.g., all or those within a configured window) to detect the grantless retransmission. In an uplink SPS message scenario, the base station may not receive and/or properly decode the uplink message from the UE during an SPS subframe. The base station may configure bit(s) within a downlink control indicator (DCI) to indicate that the uplink transmission was not received. Accordingly, the UE may perform a grantless retransmission of the uplink message during a subsequent subframe or slot of the SPS configuration. The base station may monitor the SPS configured subframes or slots to detect the grantless retransmission of the uplink message.

In some aspects, the SPS message transmission(s) may be triggered. For example, the SPS configuration may identify the SPS periodicity, identify the HARQ processes, etc., but may not identify which subframes or slots are to be used for SPS messages. Accordingly, base station may configure a field (e.g., in a group common physical downlink control channel (GC-PDCCH)) of a subframe or slot that carries resources allocated for transmission of the SPS message. In the downlink example, the UE may decode the GC-PDCCH in each (or some) subframe or slot and may determine if the trigger is present for that UE for that subframe or slot. If the field is configured to indicate the trigger, the UE will decode the corresponding physical downlink shared channel (PDSCH) portions of the subframe or slot to receive the downlink message. In the uplink example, the UE may decode the GC-PDCCH to determine if the trigger is present for that UE during that subframe or slot. If the field is configured to indicate the trigger, the UE will transmit the uplink message in the physical uplink shared channel (PUSCH) portion of the subframe or slot.

A method of wireless communication is described. The method may include receiving a semi-persistent scheduling (SPS) configuration message from a base station, the SPS configuration message containing at least one SPS parameter for downlink SPS communications over a shared radio frequency spectrum band, identifying, based on the SPS configuration, one or more subframes or slots allocated for the downlink SPS communications, and performing the downlink SPS communications during the one or more subframes or slots according to the SPS configuration.

An apparatus for wireless communication is described. The apparatus may include means for receiving a semi-persistent scheduling (SPS) configuration message from a base station, the SPS configuration message containing at least one SPS parameter for downlink SPS communications over a shared radio frequency spectrum band, means for identifying, based on the SPS configuration, one or more subframes or slots allocated for the downlink SPS communications, and means for performing the downlink SPS communications during the one or more subframes or slots according to the SPS configuration.

Another apparatus for wireless communication is described. The apparatus may include a processor, memory in electronic communication with the processor, and instructions stored in the memory. The instructions may be operable to cause the processor to receive a semi-persistent scheduling (SPS) configuration message from a base station, the SPS configuration message containing at least one SPS parameter for downlink SPS communications over a shared radio frequency spectrum band, identify, based on the SPS configuration, one or more subframes or slots allocated for the downlink SPS communications, and perform the downlink SPS communications during the one or more subframes or slots according to the SPS configuration.

A non-transitory computer-readable medium for wireless communication is described. The non-transitory computer-readable medium may include instructions operable to cause a processor to receive a semi-persistent scheduling (SPS) configuration message from a base station, the SPS configuration message containing at least one SPS parameter for downlink SPS communications over a shared radio frequency spectrum band, identify, based on the SPS configuration, one or more subframes or slots allocated for the downlink SPS communications, and perform the downlink SPS communications during the one or more subframes or slots according to the SPS configuration.

In some examples of the method, apparatus, and non-transitory computer-readable medium described above, performing the downlink SPS communications may include determining a message was not received on a channel of the shared radio frequency spectrum during a first subframe or slot according to the SPS configuration. Some examples of the method, apparatus, and non-transitory computer-readable medium described above may further include processes, features, means, or instructions for receiving, based on the determination, a downlink grant indicating a second subframe or slot that replaces the first subframe or slot for transmission of the message. Some examples of the method, apparatus, and non-transitory computer-readable medium described above may further include processes, features, means, or instructions for receiving the message on the channel during the second subframe or slot in accordance with the downlink grant.

Some examples of the method, apparatus, and non-transitory computer-readable medium described above may further include processes, features, means, or instructions for determining that the channel may be unavailable for transmission of an acknowledgement/negative acknowledgement (ACK/NACK) message during a third subframe or slot according to the downlink grant. Some examples of the method, apparatus, and non-transitory computer-readable medium described above may further include processes, features, means, or instructions for dropping the ACK/NACK message based on the channel being unavailable.

In some examples of the method, apparatus, and non-transitory computer-readable medium described above, receiving the downlink grant may involve obtaining a new data indicator (NDI) field of the downlink grant that may be set based on an unavailability of the channel during the first subframe or slot.

In some examples of the method, apparatus, and non-transitory computer-readable medium described above, receiving the downlink grant may involve obtaining a new hybrid automatic repeat request (HARQ) process assignment for the message based on an unavailability of the channel during the first subframe or slot.

In some examples of the method, apparatus, and non-transitory computer-readable medium described above, the downlink grant contains an indication of an acknowledgement/negative acknowledgement (ACK/NACK) resource associated with the message.

Some examples of the method, apparatus, and non-transitory computer-readable medium described above may further include processes, features, means, or instructions for receiving a configuration message indicating a plurality of possible physical uplink control channel (PUCCH) resources for ACK/NACK transmissions, where the indication of the ACK/NACK resource in the downlink grant identifies one of the possible PUCCH resources.

In some examples of the method, apparatus, and non-transitory computer-readable medium described above, performing the downlink SPS communications may involve determining that a message was not received on a channel of the shared radio frequency spectrum during a first subframe or slot according to the SPS configuration. Some examples of the method, apparatus, and non-transitory computer-readable medium described above may further include processes, features, means, or instructions for identifying, based on the determination, a second subframe or slot that replaces the first subframe or slot for transmission of the message and a configured window within an SPS period. Some examples of the method, apparatus, and non-transitory computer-readable medium described above may further include processes, features, means, or instructions for receiving a grantless transmission of the message on the channel during the second subframe or slot.

Some examples of the method, apparatus, and non-transitory computer-readable medium described above may further include processes, features, means, or instructions for determining, based on the SPS configuration, a window size of the configured window, where the second subframe or slot may be identified based on the determining.

In some examples of the method, apparatus, and non-transitory computer-readable medium described above, identifying the second subframe or slot may involve decoding a plurality of consecutive subframes or slots within the configured window to detect the grantless transmission of the message.

Some examples of the method, apparatus, and non-transitory computer-readable medium described above may further include processes, features, means, or instructions for receiving a configuration message indicating a window size associated with the configured window, the window size containing a plurality of subframes or slots within the configured window.

Some examples of the method, apparatus, and non-transitory computer-readable medium described above may further include processes, features, means, or instructions for determining a transmission parameter associated with receiving the message during the first subframe or slot, where the grantless transmission may be received based on the transmission parameter.

In some examples of the method, apparatus, and non-transitory computer-readable medium described above, the transmission parameter may contain at least one modulation and coding scheme (MCS) to be used for reception of the message during the first subframe or slot, or a resource allocation scheme associated with the reception of the message during the first subframe or slot, or a combination thereof.

Some examples of the method, apparatus, and non-transitory computer-readable medium described above may further include processes, features, means, or instructions for transmitting, based on receiving the message and in accordance with the SPS configuration, at least one of an acknowledgement (ACK) message using a first physical random access channel (PRACH) waveform, or a negative acknowledgement (NACK) message using a second PRACH waveform.

In some examples of the method, apparatus, and non-transitory computer-readable medium described above, performing the downlink SPS communications may involve detecting an SPS trigger in a control signal of a subframe or slot, the SPS trigger based on the SPS parameter. Some examples of the method, apparatus, and non-transitory computer-readable medium described above may further include processes, features, means, or instructions for receiving a downlink message in the subframe or slot in accordance with the SPS trigger.

Some examples of the method, apparatus, and non-transitory computer-readable medium described above may further include processes, features, means, or instructions for descrambling a downlink control indicator (DCI) of the control signal using an identifier associated with the SPS configuration to detect the SPS trigger.

In some examples of the method, apparatus, and non-transitory computer-readable medium described above, the identifier contains a group common SPS cell radio network temporary identifier (GC-SPS C-RNTI).

Some examples of the method, apparatus, and non-transitory computer-readable medium described above may further include processes, features, means, or instructions for monitoring a number of subframes or slots within a configured window within an SPS period to detect the SPS trigger, where the number of subframes or slots are included in the subframe or slot.

In some examples of the method, apparatus, and non-transitory computer-readable medium described above, the at least one SPS parameter contains an SPS periodicity, or a number of hybrid automatic repeat/request (HARQ) processes associated with the SPS configuration, or a combination thereof.

In some examples of the method, apparatus, and non-transitory computer-readable medium described above, the SPS configuration message does not identify the subframe or slot for the SPS transmission of the downlink message.

Some examples of the method, apparatus, and non-transitory computer-readable medium described above may further include processes, features, means, or instructions for decoding a group common physical downlink control channel (GC-PDCCH) to detect the SPS trigger.

In some examples of the method, apparatus, and non-transitory computer-readable medium described above, the GC-PDCCH indicates the SPS trigger for the UE and for at least one additional UE.

In some examples of the method, apparatus, and non-transitory computer-readable medium described above, performing the downlink SPS communications may involve determining that no SPS packet was received at the one or more subframes or slots allocated for the downlink SPS communications. Some examples of the method, apparatus, and non-transitory computer-readable medium described above may further include processes, features, means, or instructions for detecting an SPS trigger at a subsequent subframe or slot based on the determining. Some examples of the method, apparatus, and non-transitory computer-readable medium described above may further include processes, features, means, or instructions for receiving a message on the channel during the subsequent subframe or slot and in accordance with the SPS trigger.

A method of wireless communication is described. The method may include identifying one or more user equipment (UE) for performing downlink semi-persistent scheduling (SPS) communications over a shared radio frequency spectrum band, transmitting an SPS configuration message containing at least one SPS parameter for the downlink SPS communications over the shared radio frequency spectrum band to the one or more UEs, and performing the downlink SPS communications during one or more subframes or slots according to the SPS configuration.

An apparatus for wireless communication is described. The apparatus may include means for identifying one or more user equipment (UE) for performing downlink semi-persistent scheduling (SPS) communications over a shared radio frequency spectrum band, means for transmitting an SPS configuration message that contains at least one SPS parameter for the downlink SPS communications over the shared radio frequency spectrum band to the one or more UEs, and means for performing the downlink SPS communications during one or more subframes or slots according to the SPS configuration.

Another apparatus for wireless communication is described. The apparatus may include a processor, memory in electronic communication with the processor, and instructions stored in the memory. The instructions may be operable to cause the processor to identify one or more user equipment (UE) for performing downlink semi-persistent scheduling (SPS) communications over a shared radio frequency spectrum band, transmit an SPS configuration message that contains at least one SPS parameter for the downlink SPS communications over the shared radio frequency spectrum band to the one or more UEs, and perform the downlink SPS communications during one or more subframes or slots according to the SPS configuration.

A non-transitory computer-readable medium for wireless communication is described. The non-transitory computer-readable medium may include instructions operable to cause a processor to identify one or more user equipment (UE) for performing downlink semi-persistent scheduling (SPS) communications over a shared radio frequency spectrum band, transmit an SPS configuration message that contains at least one SPS parameter for the downlink SPS communications over the shared radio frequency spectrum band to the one or more UEs, and perform the downlink SPS communications during one or more subframes or slots according to the SPS configuration.

In some examples of the method, apparatus, and non-transitory computer-readable medium described above, performing the downlink SPS communications may involve determining that a channel of the shared radio frequency spectrum may be unavailable for a transmission of a message during a first subframe or slot according to the SPS configuration. Some examples of the method, apparatus, and non-transitory computer-readable medium described above may further include processes, features, means, or instructions for transmitting a downlink grant based on the unavailability of the channel, the downlink grant indicating a second subframe or slot that replaces the first subframe for transmission of the message. Some examples of the method, apparatus, and non-transitory computer-readable medium described above may further include processes, features, means, or instructions for attempting to transmit the message on the channel during the second subframe or slot in accordance with the downlink grant.

Some examples of the method, apparatus, and non-transitory computer-readable medium described above may further include processes, features, means, or instructions for setting a new data indicator (NDI) field of the downlink grant based on the unavailability of the channel.

In some examples of the method, apparatus, and non-transitory computer-readable medium described above, attempting to transmit the message on the channel during the second subframe or slot may involve determining that the channel may be unavailable during the second subframe or slot for transmitting the message. Some examples of the method, apparatus, and non-transitory computer-readable medium described above may further include processes, features, means, or instructions for assigning the message to a new hybrid automatic repeat request (HARQ) process based on the unavailability of the channel during the second subframe or slot.

In some examples of the method, apparatus, and non-transitory computer-readable medium described above, the downlink grant contains an indication of an acknowledgement/negative acknowledgement (ACK/NACK) resource associated with the message.

Some examples of the method, apparatus, and non-transitory computer-readable medium described above may further include processes, features, means, or instructions for transmitting a configuration message indicating a plurality of possible physical uplink control channel (PUCCH) resources for ACK/NACK transmissions, where the indication of the ACK/NACK resource in the downlink grant identifies one of the possible PUCCH resources.

In some examples of the method, apparatus, and non-transitory computer-readable medium described above, attempting to transmit the message on the channel during the second subframe or slot may involve determining that the channel may be unavailable during the second subframe or slot for transmitting the message. Some examples of the method, apparatus, and non-transitory computer-readable medium described above may further include processes, features, means, or instructions for dropping a packet containing the message based on the unavailability of the channel during the second subframe or slot.

In some examples of the method, apparatus, and non-transitory computer-readable medium described above, attempting to transmit the message on the channel during the second subframe or slot may involve performing a clear channel assessment (CCA) on the channel prior to the second subframe or slot. Some examples of the method, apparatus, and non-transitory computer-readable medium described above may further include processes, features, means, or instructions for transmitting the message on the channel during the second subframe or slot based on a result of the CCA.

In some examples of the method, apparatus, and non-transitory computer-readable medium described above, performing the downlink SPS communications may involve determining that a channel of the shared radio frequency spectrum may be unavailable for a transmission of a message during a first subframe or slot according to the SPS configuration. Some examples of the method, apparatus, and non-transitory computer-readable medium described above may further include processes, features, means, or instructions for selecting a second subframe or slot that replaces the first subframe or slot based on the unavailability of the channel and a configured window within an SPS period. Some examples of the method, apparatus, and non-transitory computer-readable medium described above may further include processes, features, means, or instructions for performing a grantless transmission of the message on the channel during the selected second subframe or slot.

Some examples of the method, apparatus, and non-transitory computer-readable medium described above may further include processes, features, means, or instructions for determining a window size associated with the configured window, where the second subframe or slot may be selected based on the window size.

Some examples of the method, apparatus, and non-transitory computer-readable medium described above may further include processes, features, means, or instructions for transmitting a configuration message indicating a window size associated with the configured window, the window size containing plurality of subframes or slots within the configured window.

Some examples of the method, apparatus, and non-transitory computer-readable medium described above may further include processes, features, means, or instructions for determining a transmission parameter associated with transmission of the message during the first subframe or slot, where the grantless transmission may be performed based on the transmission parameter.

In some examples of the method, apparatus, and non-transitory computer-readable medium described above, the transmission parameter contains at least one modulation and coding scheme (MCS) to be used for transmission of the message during the first subframe or slot, or a resource allocation scheme associated with the transmission of the message during the first subframe or slot, or a combination thereof.

Some examples of the method, apparatus, and non-transitory computer-readable medium described above may further include processes, features, means, or instructions for identifying a first physical random access channel (PRACH) waveform to use for acknowledgement (ACK) messages transmitted in accordance with the SPS configuration. Some examples of the method, apparatus, and non-transitory computer-readable medium described above may further include processes, features, means, or instructions for identifying a second PRACH waveform to use for negative acknowledgement (NACK) messages transmitted in accordance with the SPS configuration.

Some examples of the method, apparatus, and non-transitory computer-readable medium described above may further include processes, features, means, or instructions for determining that a defined number of user equipment (UE) may be associated with active SPS processes. Some examples of the method, apparatus, and non-transitory computer-readable medium described above may further include processes, features, means, or instructions for selecting an SPS periodicity of the SPS configuration based on the determining.

In some examples of the method, apparatus, and non-transitory computer-readable medium described above, performing the downlink SPS communications may involve selecting a subframe or slot for an SPS transmission of a downlink message to a UE of the one or more UEs. Some examples of the method, apparatus, and non-transitory computer-readable medium described above may further include processes, features, means, or instructions for transmitting a control signal during the subframe or slot, the control signal containing an SPS trigger based on the SPS parameter for the UE. Some examples of the method, apparatus, and non-transitory computer-readable medium described above may further include processes, features, means, or instructions for transmitting the downlink message to the UE during the subframe or slot in accordance with the SPS trigger.

In some examples of the method, apparatus, and non-transitory computer-readable medium described above, the at least one SPS parameter contains an SPS periodicity or a number of hybrid automatic repeat/request (HARQ) processes associated with the SPS configuration, or a combination thereof.

In some examples of the method, apparatus, and non-transitory computer-readable medium described above, the SPS configuration message does not identify the subframe or slot for the SPS transmission of the downlink message.

Some examples of the method, apparatus, and non-transitory computer-readable medium described above may further include processes, features, means, or instructions for configuring a group common physical downlink control channel (GC-PDCCH) to indicate the SPS trigger for the UE.

Some examples of the method, apparatus, and non-transitory computer-readable medium described above may further include processes, features, means, or instructions for configuring one or more bits in the GC-PDCCH to indicate the SPS trigger for the UE and at least one additional UE.

Some examples of the method, apparatus, and non-transitory computer-readable medium described above may further include processes, features, means, or instructions for scrambling a downlink control indicator (DCI) of the control signal using an identifier associated with the SPS configuration to indicate the SPS trigger.

In some examples of the method, apparatus, and non-transitory computer-readable medium described above, the identifier containing a group common SPS cell radio network temporary identifier (GC-SPS C-RNTI).

DETAILED DESCRIPTION

Figure 1:
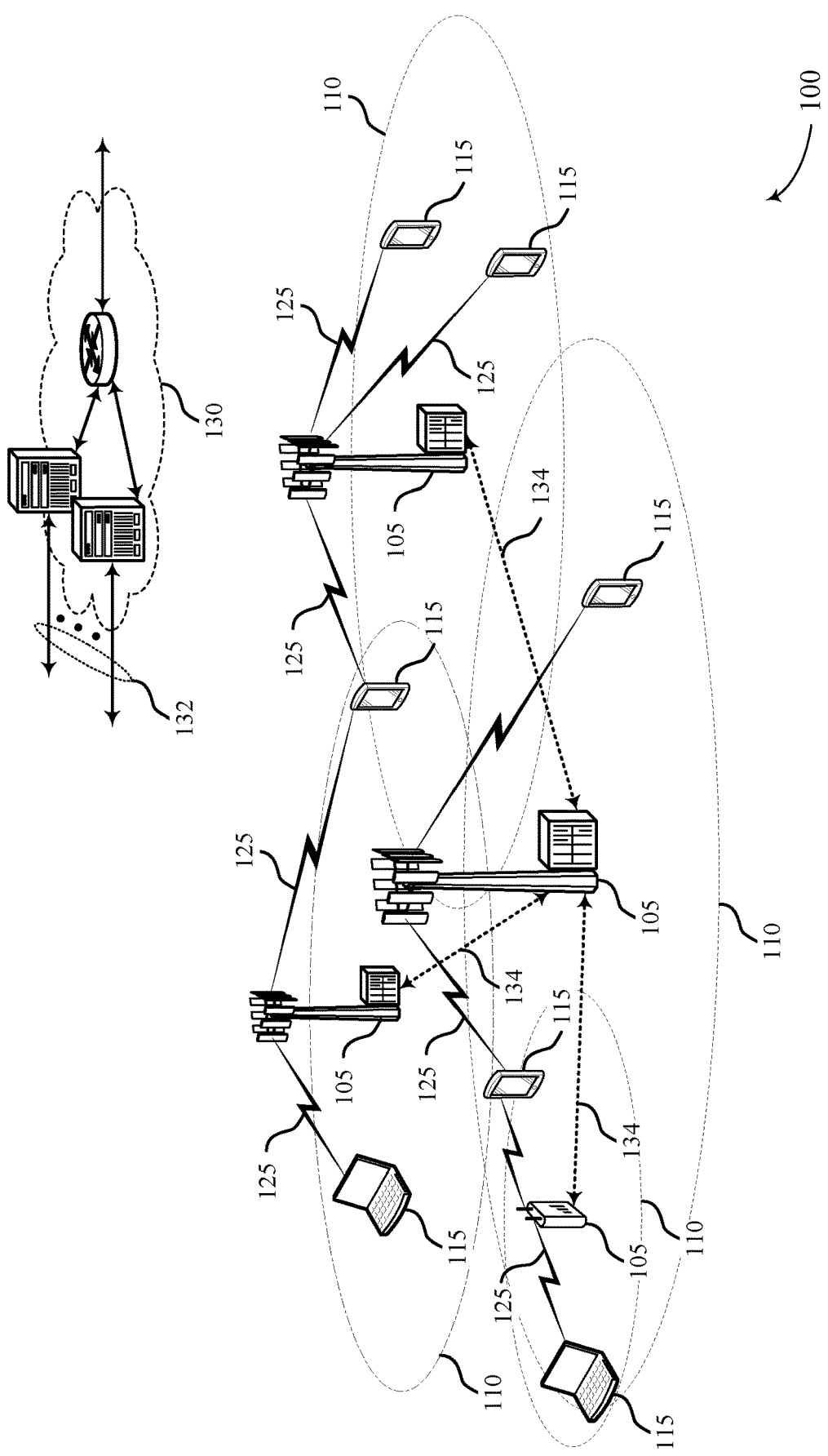
FIG. 1 illustrates an example of a system for wireless communication that supports SPS for shared spectrum in accordance with aspects of the present disclosure.

In some wireless systems, wireless devices such as a base station and/or a user equipment (UE) may operate in an unlicensed radio frequency band. As one example, a MulteFire radio access technology may operate in an unlicensed or shared frequency band. A MulteFire network may include base stations and/or UE communicating in an unlicensed radio frequency spectrum band without a licensed frequency anchor carrier. For example, the MulteFire network may operate without an anchor carrier in the licensed spectrum. Operations in an unlicensed or shared communication medium may include different radio access technologies (RATs) or multiple mobile network operators using the available shared radio frequency (RF) spectrum. Accordingly, wireless devices may contend for medium access using various mechanisms, such as a clear channel assessment (CCA) procedure, a listen-before-talk (LBT) procedure, and the like. Thus, in some instances the channel may be unavailable during a particular subframe or slot.

Semi-persistent scheduling (SPS) techniques are typically deployed for use in a licensed radio frequency spectrum band where access to the medium is more consistent (e.g., where the radio resources are allocated by the base station). Typically, SPS techniques are deployed to reduce the control channel (e.g., PDCCH) overhead in a situation where persistent radio resources are allocated at a regular interval (e.g., to support voice over Internet Protocol (VoIP) or voice over Long Term Evolution (VoLTE) calls). This may include scenarios where a UE generates relatively small packets at short or regular intervals. During SPS operations, resource allocations, modulation and coding schemes (MCS), etc., may be fixed for the current SPS configuration. Conventionally, new SPS configurations are deployed when the radio link conditions change, and retransmissions may be scheduled separately.

Aspects of the disclosure are initially described in the context of a wireless communications system. Aspects of the present disclosure provide for adaptation of SPS techniques into a shared or unlicensed radio frequency spectrum band. The described techniques may be used for uplink and/or downlink SPS communications in the shared or unlicensed radio frequency spectrum band. Broadly, a base station may transmit a configuration message to UE(s) indicating the SPS configuration. The SPS configuration may include SPS parameter(s) associated with performing uplink and/or downlink SPS communications. The UE and/or base station may use the SPS configuration to identify subframe(s) or slot(s) allocated for use in the SPS communications. The base station and UE may then perform the SPS communications during the subframe(s) or slot(s) in accordance with the SPS configuration. In some aspects, the described techniques provide for a grant-based, grantless, and/or triggered SPS transmission. In As one example of a grant-based scheme, the base station may determine that a downlink message transmission was unsuccessful during an SPS configured subframe or slot. Generally, references to transmission of a message being unsuccessful may refer to the transmitting device being unable to capture the channel (e.g., due to an unsuccessful CCA/LBT procedure) to transmit the message and/or to the receiving device being unable to successfully decode the message. Accordingly, the base station may identify a second SPS configured subframe or slot (e.g., in the next transmission opportunity (TxOP)) and transmit a downlink grant to the UE identifying downlink resources allocated to retransmission of the message. The base station may use the allocated resources to transmit the message during the second subframe or slot. In an uplink scenario, the base station may determine that the uplink message transmission was not received during the SPS configured subframe or slot. Accordingly, the base station may transmit an uplink grant indication to the UE identifying resources allocated for the UE to transmit the message during the second subframe or slot. Accordingly, the grant-based SPS message transmission scheme be an example of implementing SPS techniques into a shared or unlicensed radio frequency spectrum band operation where channel access may not be guaranteed.

As one example of a grantless scheme, the base station may determine that a downlink message transmission was unsuccessful during an SPS configured subframe or slot. Accordingly, the base station may identify a second SPS configured subframe or slot (e.g., a subframe or slot within a configured window) and perform a grantless transmission of the SPS message to the UE. The UE may monitor the SPS configured subframes or slots to determine which subframe or slot carries the message transmission. In an uplink scenario, the UE may determine that the uplink transmission during the SPS subframe or slot was not received at the base station. The UE may identify the second subframe or slot (e.g., a subframe or slot within the configured window) and perform the grantless transmission of the message to the base station. The base station may monitor the SPS configured subframes or slots to determine which subframe or slot carries the message transmission.

As one example of a trigger-based scheme, the base station may send the SPS configuration information, but may not identify the subframe or slot that the SPS message transmission is to occur in. Instead, the base station may trigger the SPS message transmission by encoding bit(s) in a GC-PDCCH field during the subframe or slot that the SPS message is being communicated. In a downlink scenario, the UE may monitor the control portions of the SPS configured subframes or slots to detect the trigger and, if present, receive the downlink transmission in that subframe or slot. In an uplink scenario, the UE may again monitor the control portions of the SPS configured subframes or slots to detect the trigger and, if present, transmit the uplink transmission in the configured subframe or slot. In some aspects, a number of bits of the control portion of the subframe or slot may provide an SPS trigger to multiple UEs.

Aspects of the disclosure are further illustrated by and described with reference to apparatus diagrams, system diagrams, and flowcharts that relate to SPS for shared spectrum.

FIG. 1 illustrates an example of a wireless communications system 100 that supports SPS for shared spectrum in accordance with various aspects of the present disclosure. The present disclosure describes various techniques with reference to or that may be applied in next generation networks (e.g., 5G or new radio (NR) networks) that are being designed to support distinct features such as high bandwidth operations. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a 5G or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a subframe or slot number (SFN) ranging from 0 to 1023. Each frame may include 10 subframes or slots numbered from 0 to 9, and each subframe or slot may have a duration of 1 ms. A subframe or slot may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe or slot may be the smallest scheduling unit of the wireless communications system 100, and may be referred to as a transmission time interval (TTI). In other cases, a smallest scheduling unit of the wireless communications system 100 may be shorter than a subframe or slot or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105. It is noted that the term "slot," as used herein, refers to either a standard slot or a mini-slot, and the principles described with respect to a "slot" may be applied to either a standard slot or a mini-slot.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space, and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that may support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). One or more features may characterize an eCC, including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

SPS enables radio resources to be semi-statically configured and allocated to a UE 115 for a longer time period than one subframe or slot, avoiding the need for specific downlink assignment messages or uplink grant messages over the PDCCH for each subframe or slot. SPS is useful for services where the timing and amount of radio resources needed are predictable, such as Voice over Internet Protocol (VoIP), thus reducing the overhead of the PDCCH compared to dynamic scheduling. An identifier of the scheduling messages transmitted on the PDCCH for SPS PDSCH data transmissions may allow the UE 115 to differentiate these messages from those used for dynamic scheduling messages identified by Cell-Radio Network Temporary Identifier (C-RNTI). A wireless device may transmit the identifier as a scrambling code applied to the Cyclic Redundancy Check (CRC) of the PDCCH transmission. Aspects of wireless communications system 100 may be configured to support SPS techniques in a shared or unlicensed radio frequency spectrum.

In some cases, a wireless device may encode and/or decode messages transmitted over PDCCH using polar coding or tail biting convolution code (TBCC). A wireless device may further encode and/or decode messages transmitted over PDSCH using turbo coding or low-density parity-check (LDPC) coding.

In some aspects, a base station 105 may identify one or more UEs 115 for performing uplink and/or downlink SPS communications over a shared radio frequency spectrum band. The base station 105 may transmit an SPS configuration message to the one or more UEs 115 that contains at least one SPS parameter for the uplink and/or downlink SPS communications over the shared radio frequency spectrum band. The base station 105 may perform the uplink and/or downlink SPS communications during one or more subframes or slots according to the SPS configuration.

In some aspects, a base station 105 may determine that a channel of a shared radio frequency spectrum is unavailable for a transmission of a message during a first subframe or slot according to an SPS configuration. The base station 105 may transmit a downlink grant based on the unavailability of the channel, the downlink grant indicating a second subframe or slot that replaces the first subframe or slot for transmission of the message. The base station 105 may attempt to transmit the message on the channel during the second subframe or slot in accordance with the downlink grant.

In some aspects, a base station 105 may determine that a channel of a shared radio frequency spectrum is unavailable for a transmission of a message during a first subframe or slot according to an SPS configuration. The base station 105 may select a second subframe or slot that replaces the first subframe or slot based on the unavailability of the channel and a configured window within an SPS period. The base station 105 may perform a grantless transmission of the message on the channel during the selected second subframe or slot.

In some aspects, a base station 105 may transmit an SPS configuration message to a UE 115, the SPS configuration message containing at least one SPS parameter for SPS transmissions to the UE 115 over a shared radio frequency spectrum band. The base station 105 may select a subframe or slot for an SPS transmission of a downlink message to the UE 115. The base station 105 may transmit a control signal during the subframe or slot, the control signal containing an SPS trigger based on the SPS parameter for the UE 115. The base station 105 may transmit the downlink message to the UE 115 during the subframe or slot in accordance with the SPS trigger.

In some aspects, a base station 105 may determine that a transmission of a message was not received on a channel of a shared radio frequency spectrum during a first subframe or slot according to an SPS configuration. The base station 105 may transmit an uplink grant based on the determination, the uplink grant indicating a second subframe or slot that replaces the first subframe or slot for transmission of the message. The base station 105 may receive the message on the channel during the second subframe or slot in accordance with the uplink grant.

In some aspects, a base station 105 may determine that a transmission of a message was not received on a channel of a shared radio frequency spectrum during a first subframe or slot according to an SPS configuration. The base station 105 may select a second subframe or slot that replaces the first subframe or slot based on the determining and the SPS configuration. The base station 105 may receive a grantless transmission of the message on the channel during the selected second subframe or slot.

In some aspects, a base station 105 may transmit an SPS configuration message to a UE 115, the SPS configuration message containing at least one SPS parameter for SPS transmissions from the UE 115 over a shared radio frequency spectrum band. The base station 105 may select a subframe or slot for an SPS transmission of an uplink message from the UE 115. The base station 105 may transmit a control signal during the subframe or slot, the control signal containing an SPS trigger based on the SPS parameter for the UE 115. The base station 105 may receive the uplink message from the UE 115 during the subframe or slot in accordance with the SPS trigger.

In some aspects, a UE 115 may receive an SPS configuration message from a base station 105, the SPS configuration message containing at least one SPS parameter for uplink and/or downlink SPS communications over a shared radio frequency spectrum band. The UE 115 may identify, based on the SPS configuration, one or more subframes or slots allocated for the uplink and/or downlink SPS communications. The UE 115 may perform the uplink and/or downlink SPS communications during the one or more subframes or slots and according to the SPS configuration.

In some aspects, a UE 115 may determine that a message was not received on a channel of a shared radio frequency spectrum during a first subframe or slot according to an SPS configuration. The UE 115 may receive, based on the determination, a downlink grant indicating a second subframe or slot that replaces the first subframe or slot for transmission of the message. The UE 115 may receive the message on the channel during the second subframe or slot in accordance with the downlink grant.

In some aspects, a UE 115 may determine that a message was not received on a channel of a shared radio frequency spectrum during a first subframe or slot according to an SPS configuration. The UE 115 may identify, based on the determination, a second subframe or slot that replaces the first subframe or slot for transmission of the message and a configured window within an SPS period. The UE 115 may receive a grantless transmission of the message on the channel during the second subframe or slot.

In some aspects, a UE 115 may receive an SPS configuration message from a base station 105, the SPS configuration message containing at least one SPS parameter for SPS transmissions over a shared radio frequency spectrum band. The UE 115 may detect an SPS trigger in a control signal of a subframe or slot, the SPS trigger based on the SPS parameter. The UE 115 may receive a downlink message in the subframe or slot in accordance with the SPS trigger.

In some aspects, a UE 115 may determine that a message was not received at a base station 105 on a channel of a shared radio frequency spectrum during a first subframe or slot according to an SPS configuration. The UE 115 may receive, based on the determination, an uplink grant indicating a second subframe or slot that replaces the first subframe or slot for transmission of the message. The UE 115 may attempt to transmit the message on the channel during the second subframe or slot in accordance with the uplink grant.

In some aspects, a UE 115 may determine that a message was not received at a base station on a channel of a shared radio frequency spectrum during a first subframe or slot according to an SPS configuration. The UE 115 may identify, based on the determination, a second subframe or slot that replaces the first subframe or slot for transmission of the message and a configured window within an SPS period. The UE 115 may perform a grantless transmission of the message on the channel during the second subframe or slot.

In some aspects, a UE 115 may receive an SPS configuration message from a base station 105, the SPS configuration message containing at least one SPS parameter for SPS transmissions over a shared radio frequency spectrum band. The UE 115 may detect an SPS trigger in a control signal of a subframe or slot, the SPS trigger based on the SPS parameter. The UE 115 may transmit an uplink message in the subframe or slot in accordance with the SPS trigger.

Figure 2:
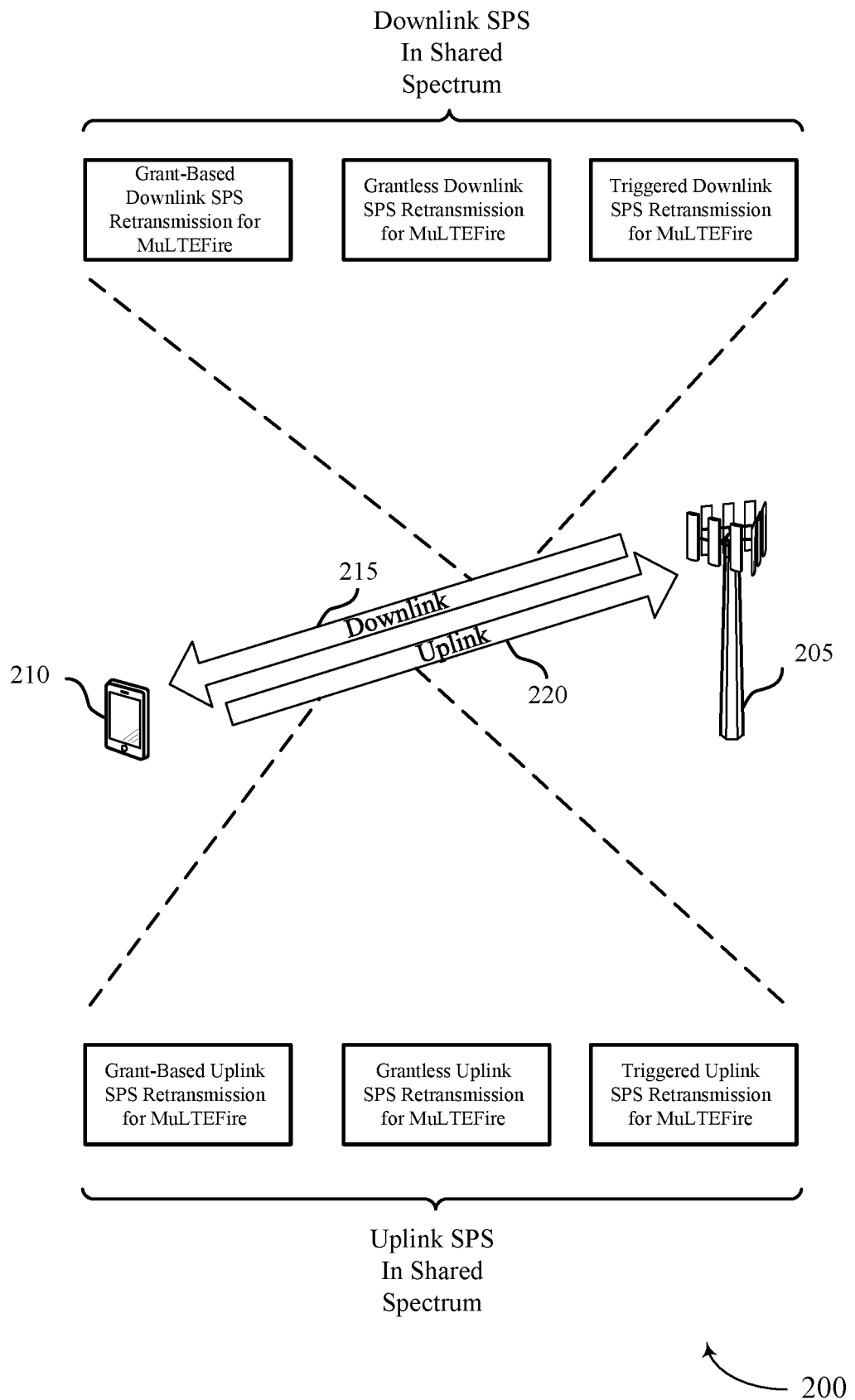
FIG. 2 illustrates an example of a system for wireless communication that supports SPS for shared spectrum in accordance with aspects of the present disclosure.

FIG. 2 illustrates an example of a wireless communications system 200 that supports SPS for shared spectrum in accordance with various aspects of the present disclosure. In some examples, wireless communications system 200 may implement aspects of wireless communications system 100. Wireless communications system 200 may include a base station 205 and a UE 210, which may be examples of the corresponding devices described herein. Broadly, wireless communications system 200 illustrates one example of a system where SPS techniques are integrated into wireless communications in a shared or unlicensed radio frequency spectrum band. The described SPS techniques may be integrated into uplink and/or downlink wireless communications.

In some aspects, wireless communications system 200 may be configured to operate in a shared or unlicensed radio frequency spectrum band. In one non-limiting example, wireless communications system 200 may be configured as a MulteFire network. Base station 205 may perform downlink wireless transmissions to UE 210 via downlink channel 215. Base station 205 may receive uplink wireless transmissions from UE 210 via uplink channel 220. Downlink channel 215 and/or uplink channel 220 may be examples of communication links 125 of wireless communications system 100.

In some aspects, base station 205 and/or UE 210 may be configured to integrate uplink and/or downlink techniques into an shared or unlicensed radio frequency spectrum. Operations in a shared spectrum may typically include a contention-based channel access scheme where the wireless devices must contend for the channel during any given time period (e.g., frame, subframe, slot, symbol, and the like). In some scenarios, the channel may be relatively unused and channel access may be almost guaranteed (e.g., a deployment without any major interference and a moderately loaded channel). In other scenarios, the channel may be heavily used, and channel access may be more limited (e.g., such as when access to the channel is less likely for any given instance). Conventional systems do not utilize SPS techniques in a shared spectrum due to the unreliable nature of accessing the channel (e.g., due to preconfigured resources being unavailable during the scheduled instance). However, aspects of the described techniques provide for SPS techniques to be used for uplink and/or downlink SPS communications in the shared spectrum.

For example, base station 205 may identify UEs 210 that are located within the coverage area of base station 205 that are suitable for performing uplink and/or downlink SPS communications over the shared spectrum. The UE (such as UE 210) may be suitable for performing SPS communications in the shared spectrum where the timing and amount of radio resources needed are predictable, such as in a VoIP/VoLTE scenario, in a MulteFire deployment, and the like. The number and/or location of UEs 210 participating in SPS communications over the shared spectrum may change over time (e.g., due to UE mobility, demand, and the like).

The base station 205 may transmit an SPS configuration message to the UE 210 that are configured for uplink and/or downlink SPS communications in the shared spectrum, such as UE 210. The SPS configuration may include SPS parameter(s) for the uplink and/or downlink SPS communications over the shared spectrum. In some examples, the SPS parameters may include an SPS periodicity, a subframe or slot delay parameter, the number of HARQ processes associated with the SPS communications, an identifier associated with the UE(s) 210 participating in the SPS communications, a subframe or slot identifier to be used for the SPS communications, and the like. In some aspects, the SPS configuration message may not identify the subframe or slot to be used for the SPS communications (such as in the trigger-based SPS communications approach).

The UE 210 may receive the SPS configuration message and identify subframe(s) or slot(s) that have been allocated for the uplink and/or downlink SPS communication. In some aspects, identifying the subframes or slots may include identifying which subframes or slots within the SPS period that are allocated for the SPS communications. In some aspects, identifying the subframes or slots may include determining that the SPS configuration does not include an identification of the SPS subframes or slots and, instead, the SPS subframes or slots will be SPS trigger-based. In some aspects, identifying the subframes or slots may include identifying a configured window based on the SPS configuration.

The base station 205 and UE 210 may then perform the uplink and/or downlink SPS communications during the subframe(s) or slot(s) and in accordance with the SPS configuration. In some aspects, the SPS communications may be grant-based, may be grantless, may be trigger-based, and/or may be a hybrid approach to the SPS communications.

In one example of a grant-based approach for downlink SPS communications, the base station 205 and UE 210 may determine that a message was not received at the UE 210 on a channel of the shared spectrum during a first subframe or slot. The message may not be received due to the base station 205 determining that the channel is unavailable (e.g., based on a CCA or LBT procedure being unsuccessful) during the first subframe or slot and/or based on the UE 210 being unable to successfully decode the message. Based on the message not being received during the first subframe or slot, the base station 205 may configure and transmit a downlink grant message to the UE 210 that carries or otherwise conveys an indication of resources allocated for retransmission of the downlink SPS message. The downlink grant may indicate a second subframe or slot that replaces the first subframe or slot for transmission of the message. During the second subframe or slot, the base station 205 may then attempt to transmit the message and, if successful, the UE 210 may receive the message on the channel of the shared spectrum. The base station 205 may attempt to transmit the message during the second subframe or slot by performing a CCA and/or LBT procedure on the channel. If the CCA or LBT procedure is successful, the base station 205 may transmit the message to the UE 210 during the second subframe or slot. If the CCA or LBT procedure is unsuccessful, the base station 205 may drop the message, may reschedule the message for a different HARQ process, and the like.

In one example of a grant-based approach for uplink SPS communications, the base station 205 and UE 210 may determine that a message was not received at the base station 205 on a channel of the shared spectrum during a first subframe or slot. The message may not be received due to the UE 210 determining that the channel is unavailable (e.g., based on a CCA or LBT procedure being unsuccessful) during the first subframe or slot and/or based on the base station 205 being unable to successfully decode the message. Based on the message not being received during the first subframe or slot, the base station 205 may configure and transmit an uplink grant message to the UE 210 that carries or otherwise conveys an indication of resources allocated for retransmission of the uplink SPS message. The uplink grant may indicate a second subframe or slot that replaces the first subframe or slot for transmission of the message. During the second subframe or slot, the UE 210 may then attempt to transmit the message and, if successful, the base station 205 may receive the message on the channel of the shared spectrum. The UE 210 may attempt to transmit the message during the second subframe or slot by performing a CCA and/or LBT procedure on the channel. If the CCA or LBT procedure is successful, the UE 210 may transmit the message to the base station 205 during the second subframe or slot. If the CCA or LBT procedure is unsuccessful, the UE 210 may drop the message, the base station 205 may reschedule the message for a different HARQ process, and the like.

In one example of a grantless approach for downlink SPS communications, the base station 205 and UE 210 may determine that a message was not received at the UE 210 on a channel of the shared spectrum during a first subframe or slot. The message may not be received due to the base station 205 determining that the channel is unavailable (e.g., based on a CCA or LBT procedure being unsuccessful) during the first subframe or slot and/or based on the UE 210 being unable to successfully decode the message. The base station 205 may, based on the message not being received during the first subframe or slot, identify a second subframe or slot that replaces the first subframe or slot for transmission of the message. The second subframe or slot may be identified based on a configured window (e.g., may occur within a set number of subframes or slots occurring after the first subframe or slot). During the second subframe or slot, the base station 205 may then attempt to transmit the message and, if successful, the UE 210 may receive the message on the channel of the shared spectrum. The base station 205 may attempt to perform the grantless transmission of the message during the second subframe or slot by performing a CCA and/or LBT procedure on the channel. If the CCA or LBT procedure is successful, the base station 205 may transmit the message to the UE 210 during the second subframe or slot. If the CCA or LBT procedure is unsuccessful, the base station 205 may drop the message, may reschedule the message for a different HARQ process, and the like. In some aspects, the UE 210 may monitor each subframe or slot within the configured window to identify the second subframe or slot and receive the grantless transmission of the message.

In one example of a grantless approach for uplink SPS communications, the base station 205 and UE 210 may determine that a message was not received at the base station 205 on a channel of the shared spectrum during a first subframe or slot. The base station 205 may not receive the message due to the UE 210 determining that the channel is unavailable (e.g., based on a CCA or LBT procedure being unsuccessful) during the first subframe or slot and/or based on the base station 205 being unable to successfully decode the message. The UE 210 may, based on the message not being received during the first subframe or slot, identify a second subframe or slot that replaces the first subframe or slot for transmission of the message. The second subframe or slot may be identified based on a configured window (e.g., the subframe or slot may occur within a set number of subframes or slots occurring after the first subframe or slot). During the second subframe or slot, the UE 210 may then attempt to perform a grantless transmission of the message and, if successful, the base station 205 may receive the message on the channel of the shared spectrum. The UE 210 may attempt to perform the grantless transmission of the message during the second subframe or slot by performing a CCA and/or LBT procedure on the channel. If the CCA or LBT procedure is successful, the UE 210 may transmit the message to the base station 205 during the second subframe or slot. If the CCA or LBT procedure is unsuccessful, the UE 210 may drop the message, the base station 205 may reschedule the message for a different HARQ process, and the like. In some examples, the UE 210 may attempt to transmit the message during each subframe or slot within the configured window and identify the second subframe or slot based on the CCA or LBT procedure being successful during the second subframe or slot. In some aspects, the base station 205 may monitor each subframe or slot within the configured window to identify the second subframe or slot and receive the grantless transmission of the message.

In one example of a trigger-based approach for downlink SPS communications, the base station 205 may identify or otherwise select a subframe or slot for transmission of the downlink message. The subframe or slot may be identified or otherwise based on the SPS configuration. That is, the SPS configuration may not identify which subframes or slots are to be used for SPS communication. Instead, the SPS configuration may indicate other SPS parameter(s), e.g., periodicity, HARQ processes, and the like. The subframe or slot may optionally be identified based on a configured window (e.g., may occur in a subframe or slot within a number of subframes or slots occurring according to the SPS configuration). During the subframe or slot, the base station 205 may transmit a control signal during the subframe or slot that indicates an SPS trigger. The SPS trigger may be indicated in a group common PDCCH (GC-PDCCH) for UE 210 and, in some aspects, for other UEs. The SPS trigger may be indicated by scrambling a DCI of the control signal using an SPS-based identifier (e.g., a GC-SPS C-RNTI). The UE 210 may detect the SPS trigger by decoding the control signal. The base station 205 may transmit, and the UE 210 may receive, the message during the subframe or slot.

In one example of a trigger-based approach for uplink SPS communications, the base station 205 may identify or otherwise select a subframe or slot for transmission of the uplink message. The subframe or slot may be identified or otherwise based on the SPS configuration. That is, the SPS configuration may not identify which subframes or slots are to be used for SPS communication. Instead, the SPS configuration may indicate other SPS parameter(s) (e.g., periodicity, HARQ processes, and the like). The subframe or slot may optionally be identified based on a configured window (e.g., may occur in a subframe or slot within a number of subframes or slots occurring according to the SPS configuration). During the subframe or slot, the base station 205 may transmit a control signal during the subframe or slot that indicates an SPS trigger. The SPS trigger may be indicated in a group common PDCCH (GC-PDCCH) for UE 210 and, in some aspects, for other UEs. The SPS trigger may be indicated by scrambling a DCI of the control signal using an SPS-based identifier (e.g., a GC-SPS C-RNTI). The UE 210 may detect the SPS trigger by decoding the control signal. The UE 210 may transmit, and the base station 205 may receive, the message during the subframe or slot.

In one example of a hybrid approach for downlink SPS communications, the base station 205 and/or UE 210 may attempt to decode an SPS packet at the designated SPS subframe or slot. If the designated SPS subframe or slot is not a valid subframe or slot (e.g., if the UE 210 determines there is no eNB transmission during the designated SPS subframe or slot or if the UE does not receive an SPS packet during the designated subframe or slot), then the UE 210 may monitor one or more subsequent subframes or slots to detect a downlink control signal containing an SPS trigger. The subsequent subframe(s) or slot(s) in which the UE 210 may look for the SPS trigger may be defined by a window following the designated SPS subframe or slot. If the UE 210 receives the trigger in one of the subsequent subframes or slots, the UE 210 may receive an SPS packet containing a message on the channel during the subsequent subframe or slot in accordance with the SPS trigger.

In one example of a hybrid approach for uplink SPS communications, the UE 210 may attempt to transmit an SPS packet at the designated SPS subframe or slot. If the UE 210 determines that an CCA procedure or a LBT procedure performed by the UE fails for the designated SPS subframe or slot, the UE 210 may monitor one or more subsequent subframes or slots to detect a downlink control signal containing an SPS trigger. The subsequent subframe(s) or slot(s) in which the UE 210 may look for the SPS trigger may be defined by a window following the designated SPS subframe or slot. If the UE 210 receives the trigger in one of the subsequent subframes or slots, the UE 210 may transmit the SPS packet containing a message on the channel during the subsequent subframe or slot in accordance with the SPS trigger.

Figure 3:
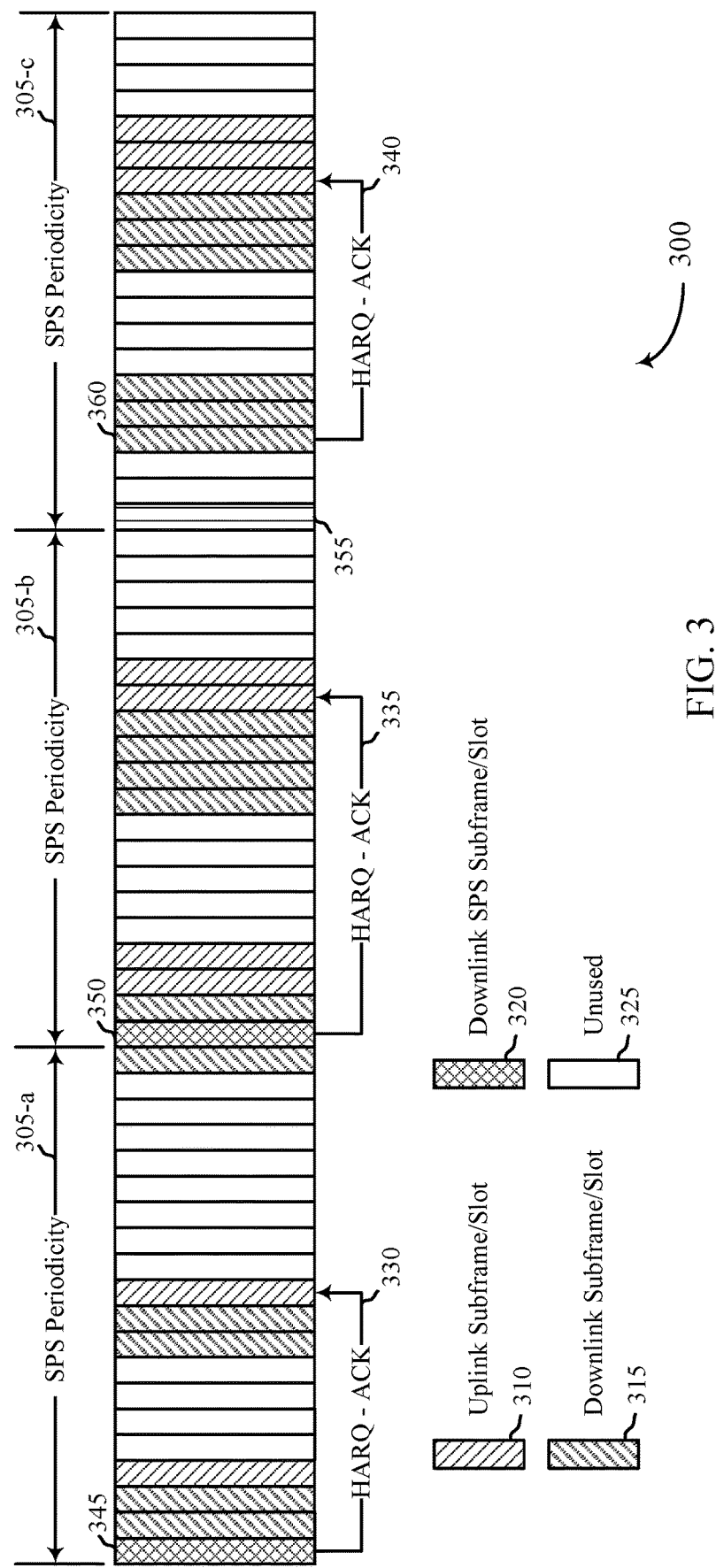
FIG. 3 illustrates an example of an SPS configuration that supports SPS for shared spectrum in accordance with aspects of the present disclosure.

FIG. 3 illustrates an example of an SPS configuration 300 that supports SPS for shared spectrum in accordance with various aspects of the present disclosure. In some examples, SPS configuration 300 may implement aspects of wireless communication systems 100 and 200. Aspects of SPS configuration 300 may be implemented by a base station and/or a UE, which may be examples of the corresponding devices described herein. Broadly, SPS configuration 300 illustrates one example of a grant-based approach for downlink SPS communications.

Broadly, SPS configuration 300 may include a plurality of SPS periods 305. Each SPS period 305 may be based on the periodicity of the SPS configuration. In the example of SPS configuration 300, each SPS period 305 spans 20 subframes or slots. However, some or all of the SPS periods 305 may span a different number of subframes or slots. Each SPS period 305 may include uplink subframe(s) or slot(s) 310, downlink subframe(s) or slot(s) 315, downlink SPS subframe(s) or slot(s) 320, and/or unused subframe(s) or slot(s) 325. Each SPS period 305 may have one or more configured HARQ processes. For example, SPS period 305-*a* may have HARQ process 330 configured, SPS period 305-*b* may have HARQ process 335 configured, and SPS period 305-*c* may have HARQ process 340 configured. Generally, the HARQ process provide a mechanism for transmission of ACK/NACK feedback information from the receiving device.

In some aspects, SPS configuration 300 may include the base station transmitting (and the UE receiving) an SPS configuration message that includes SPS parameter(s) for downlink SPS communications over the shared spectrum. The UE may use the SPS configuration to identify subframe(s) or slot(s) allocated for the downlink SPS communications. The base station and UE may perform the downlink SPS communications during the subframe(s) or slot(s) and according to the SPS configuration.

Thus, SPS period 305-*a* may begin at subframe or slot 345 where the base station transmits a downlink SPS subframe or slot 320. Subframe or slot 345 may be followed with downlink subframe(s) or slot(s) 310, uplink subframe(s) or slot(s) 315, and/or unused subframes or slots 325, per the SPS configuration. The SPS configuration message may also identify HARQ process 330 which identifies resources allocated for transmission of ACK/NACK information from the UE.

Similarly, SPS period 305-*b* may begin at subframe or slot 350 where the base station transmits a downlink SPS subframe or slot 320. Subframe or slot 350 may be followed with downlink subframe(s) or slot(s) 310, uplink subframe(s) or slot(s) 315, and/or unused subframes or slots 325, per the SPS configuration. The SPS configuration message may also identify HARQ process 335 which identifies resources allocated for transmission of ACK/NACK information from the UE.

The base station may schedule SPS period 305-*c* to begin at subframe or slot 355 where the base station may have transmitted a downlink SPS subframe or slot 320. However, the base station may determine that the channel is unavailable for transmission during subframe or slot 355 due to, for example, an unsuccessful CCA and/or LBT procedure being performed on the channel. Accordingly, during subframe or slot 360 the base station may transmit a downlink grant to the UE based on the channel being unavailable during subframe or slot 355. The downlink grant may indicate a second subframe or slot (e.g., subframe or slot 360) that replaces the first subframe or slot (e.g., subframe or slot 355) for transmission of the downlink message. Subframe or slot 360 may be followed with downlink subframe(s) or slot(s) 310, uplink subframe(s) or slot(s) 315, and/or unused subframes or slots 325, per the SPS configuration. The base station may attempt to transmit the message during subframe or slot 360 by, for example, performing a CCA and/or LBT procedure on the channel first. The downlink grant may also identify HARQ process 340 which identifies resources allocated for transmission of ACK/NACK information from the UE.

In some aspects, SPS configuration 300 may be implemented in a scenario where channel access is almost guaranteed (e.g., a planned deployment without any major interference to downlink transmissions and moderately loaded channel). In some aspects, the base station only uses the configured subframes or slots of a HARQ process to transmit the SPS packets without a downlink grant. However, if the channel access is not available at the desired subframe or slot, then the base station transmits the SPS packets using regular PDCCH grant in a later subframe or slot. Thus, the base station and UE may perform downlink SPS communications during subframe(s) or slot(s) according to the SPS configuration and, when the channel is unavailable, may perform retransmission using a downlink grant.

In some aspects, this may include setting a NDI field of the downlink grant based on the channel being unavailable during the first subframe or slot. For example, the NDI may be set to "0" in the SPS activation grant (e.g., in an SPS configuration by default). Conventionally, retransmission grants set the NDI field to "1". However, in accordance with aspects of the present disclosure, the NDI may be set to "0" in the downlink grant for the UE.

In some aspects, this may include dropping certain packets. If the base station is not able to transmit the data in the SPS HARQ process before the arrival of the next instance of the packet, then the base station may have several options. In one option, the base station may drop the packet. In another option, the base station may transmit the packet using some other HARQ process. This may include the base station transmitting a new HARQ assignment for the message. The choice of which option to take may be based on base station implementation and/or depending on the application demand (e.g., based on any higher layer impact such as configuring a QoS, a core network impact, and the like).

In some aspects, this may include certain ACK/NACK reporting techniques. For example, if the UE has received the packet but is not able to report the HARQ-ACK before receiving the next downlink packet (e.g., due to the channel being unavailable during the ACK/NACK subframe or slot) with the same HARQ process, then the UE may drop the HARQ-ACK. In some aspects, the downlink grant may indicate an ACK/NACK resource associated with the message.

In some aspects, this may include certain consideration with respect to PUCCH resource selection. For example, multiple sPUCCH and ePUCCH resources may be RRC configured so that the downlink grant can indicate one of the ACK/NACK resources to use. A different number of PUCCH resources in sPUCCH and ePUCCH may be feasible, but may use a mechanism to address sPUCCH and ePUCCH resources independently. This may include the base station transmitting and the UE receiving a configuration message indicating a plurality of possible PUCCH resources for ACK/NACK transmissions. The indication of the ACK/NACK resource in the downlink grant may identify one of the possible PUCCH resources.

Figure 4:
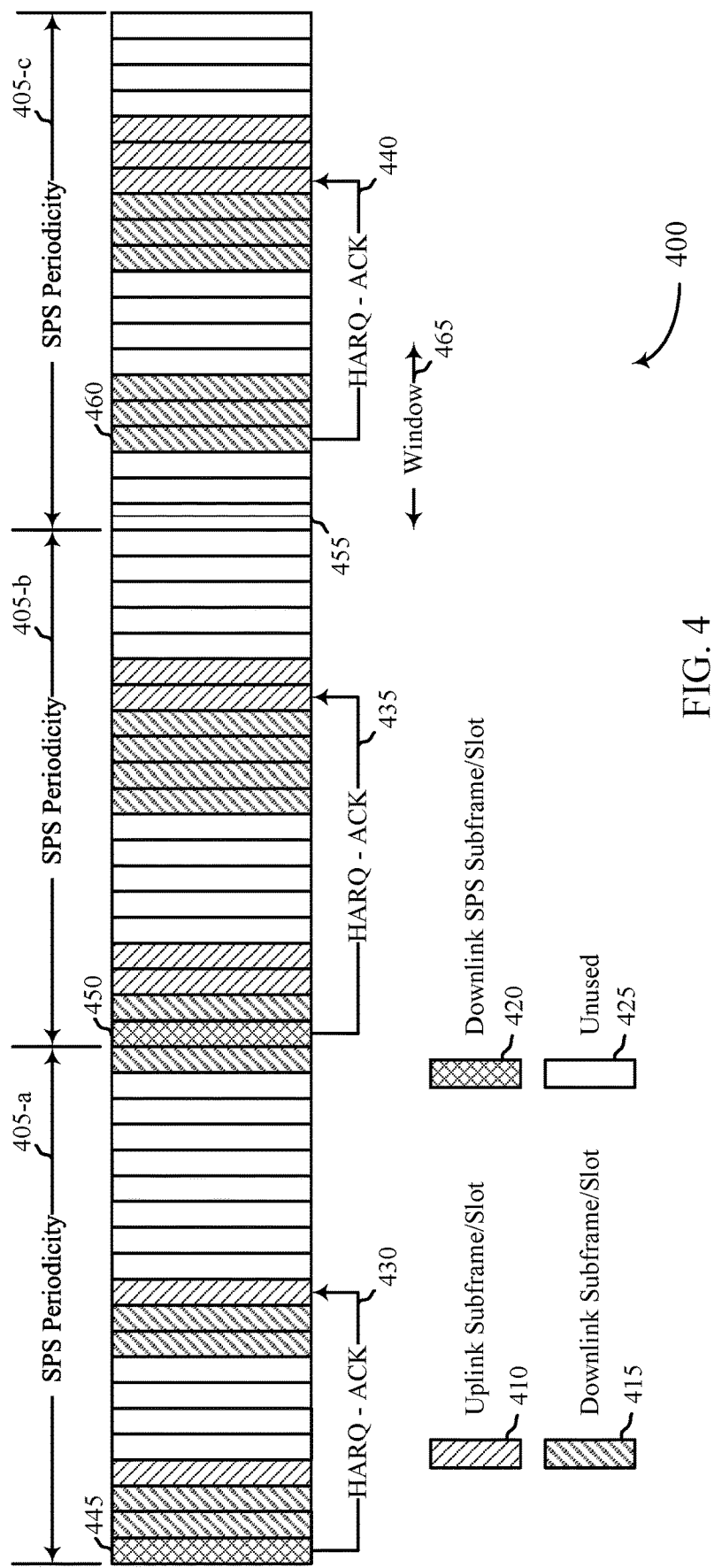
FIG. 4 illustrates an example of an SPS configuration that supports SPS for shared spectrum in accordance with aspects of the present disclosure.

FIG. 4 illustrates an example of an SPS configuration 400 that supports SPS for shared spectrum in accordance with various aspects of the present disclosure. In some examples, SPS configuration 400 may implement aspects of wireless communication systems 100, 200, and/or SPS configuration 300. Aspects of SPS configuration 400 may be implemented by a base station and/or a UE, which may be examples of the corresponding devices described herein. Broadly, SPS configuration 400 illustrates one example of a grantless approach for downlink SPS communications.

Broadly, SPS configuration 400 may include a number of SPS periods 405. Each SPS period 405 may be based on the periodicity of the SPS configuration. In the example of SPS configuration 400, each SPS period 405 spans 20 subframes or slots. However, some or all of the SPS periods 405 may span a different number of subframes or slots. Each SPS period 405 may include uplink subframe(s) or slot(s) 410, downlink subframe(s) or slot(s) 415, downlink SPS subframe(s) or slot(s) 420, and/or unused subframe(s) or slot(s) 425. Each SPS period 405 may have one or more configured HARQ processes. For example, SPS period 405-a may have HARQ process 430 configured, SPS period 405-b may have HARQ process 435 configured, and SPS period 405-c may have HARQ process 440 configured. More generally, the HARQ process may provide a mechanism for transmission of ACK/NACK feedback information from a receiving device.

In some aspects, SPS configuration 400 may include the base station transmitting (and the UE receiving) an SPS configuration message that includes SPS parameter(s) for downlink SPS communications over the shared spectrum. The UE may use the SPS configuration to identify subframe(s) or slot(s) allocated for the downlink SPS communications. The base station and UE may perform the downlink SPS communications during the subframe(s) or slot(s) and according to the SPS configuration. In some aspects, the base station may determine the SPS periods 405 based on the number of UE that are active SPS configured UE.

Thus, SPS period 405-a may begin at subframe or slot 445 where the base station transmits a downlink SPS subframe or slot 420. Subframe or slot 445 may be followed with downlink subframe(s) or slot(s) 410, uplink subframe(s) or slot(s) 415, and/or unused subframes or slots 425, per the SPS configuration. The SPS configuration message may also identify HARQ process 430 which identifies resources allocated for transmission of ACK/NACK information from the UE.

Similarly, SPS period 405-b may begin at subframe or slot 450 where the base station transmits a downlink SPS subframe or slot 420. Subframe or slot 450 may be followed with downlink subframe(s) or slot(s) 410, uplink subframe(s) or slot(s) 415, and/or unused subframes or slots 425, per the SPS configuration. The SPS configuration message may also identify HARQ process 435 which identifies resources allocated for transmission of ACK/NACK information from the UE.

The base station may schedule SPS period 405-c to begin at subframe or slot 455 where the base station would have transmitted a downlink SPS subframe or slot 420. However, the base station may determine that the channel is unavailable for transmission during subframe or slot 455 due to, for example, an unsuccessful CCA and/or LBT procedure being performed on the channel. Accordingly, during subframe or slot 460 the base station may perform a grantless transmission of the downlink message to the UE. The base station and UE may identify subframe or slot 460 based on the channel being unavailable during subframe or slot 455. In some aspects, the grantless transmission may be based on a configured window 465. The configured window 465 may be based on the SPS configuration and may have a window size that spans a set number of subframes or slots of the SPS period 405-c. The subframe or slot 460 may be identified according to the configured window 465. In some aspects, this may include the base station attempting to transmit (and the UE monitoring/decoding) each subframe or slot within the configured window 465 in order. The subframe or slot 460 may be the first subframe or slot in which the CCA and/or LBT procedure was successful. The base station may preconfigure the configured window 465 (e.g., in an SPS configuration message or in a different configuration message).

In some aspects, the grantless transmission may be based on transmission parameter(s) associated with what would have been the transmission during the subframe or slot 455, but for the channel being unavailable. The base station may use the same transmission parameters for the grantless transmission of the message during the subframe or slot 460. Examples of the transmission parameters include, but are not limited to, MCS, resource allocations, and the like. In some aspects, the UE may receive the grantless transmission without a UE specific downlink grant in the subframe or slot. The UE may blindly detect a PDSCH (e.g., a downlink message retransmission) present in the allocated resources that are scrambled with SPS C-RNTI or C-RNTI. The base station may optionally configure the configured window 465 beyond which the UE does not search for the PDSCH.

In some aspects, the grantless transmission of the message during subframe or slot 460 may identify or otherwise be associated with HARQ process 440. In some aspects, HARQ process 440 may use different PRACH waveforms to indicate ACK/NACK. For example, a first PRACH waveform may be used by the UE to indicate ACK and a second PRACH waveform may be used by the UE to indicate NACK.

In some aspects, a UE may implement SPS configuration 400 in a scenario where the UE expects to receive a PDSCH (e.g., message transmission) within the configured window 465 from the subframe or slot configured for the downlink SPS subframe or slot 420. The UE may detect the PDSCH in each subframe or slot without any UE specific PDCCH grant by using the same MCS and/or resource allocation as the original subframe or slot. The UE may optionally perform PDSCH detection only within the configured window 465. In some aspects, the configured window 465 may be suitable for PDSCH based detection using turbo code based decoding or low-density parity-check (LDPC) based decoding. By contrast, PDCCH decoding may be based on tail biting convolution code (TBCC) or polar coding.

In some aspects, SPS configuration 400 may address the issue of control overhead, but at increased power consumption cost as the UE now blindly decodes PDSCH in each subframe or slot (instead of PDCCH as in a grant-based SPS communication approach).

In some aspects, PUCCH capacity may be considered in accordance with SPS configuration 400. For example, the payload capacity of sPUCCH may be very high in general compared to traditional LTE (e.g., sPUCCH format 3 supports 40 coded bits with 12 user multiplexing per interlace, at least 10-20 uncoded bits can be sent typically on one sPUCCH resource). For a base station scheduling a large number of SPS UEs per cell, the PUCCH capacity can become a bottleneck in some scenarios. In an example for SPS periodicity=20 ms, one sPUCCH instance once every 10 ms on average, and 5 interlaces allocated to SPS ACK/NACK, the base station may support $$5 \text{ interlaces} \times 12 \frac{\text{users}}{\text{interlace}} \times \frac{20 \text{ ms}}{10 \text{ ms}} = 120 \text{ users}.$$

The system may not support 12 users per interlace (e.g., typically a few cyclic shifts/code words are unused for Nt estimation). This example calculation assumes a best case channel access scenario. If sPUCCH resources are not available at the right periodicity, all UEs with pending ACK/NACK reports on sPUCCH may result in collisions. Multiple options may be available to increase the number of supported SPS users in the downlink. In a first option, use two sPRACH waveforms (one for ACK and one NACK). In a second option, a larger SPS periodicity may be used, but with multiple SPS processes. This may be suited for delay tolerant traffic such as data monitoring systems.

Figure 5:
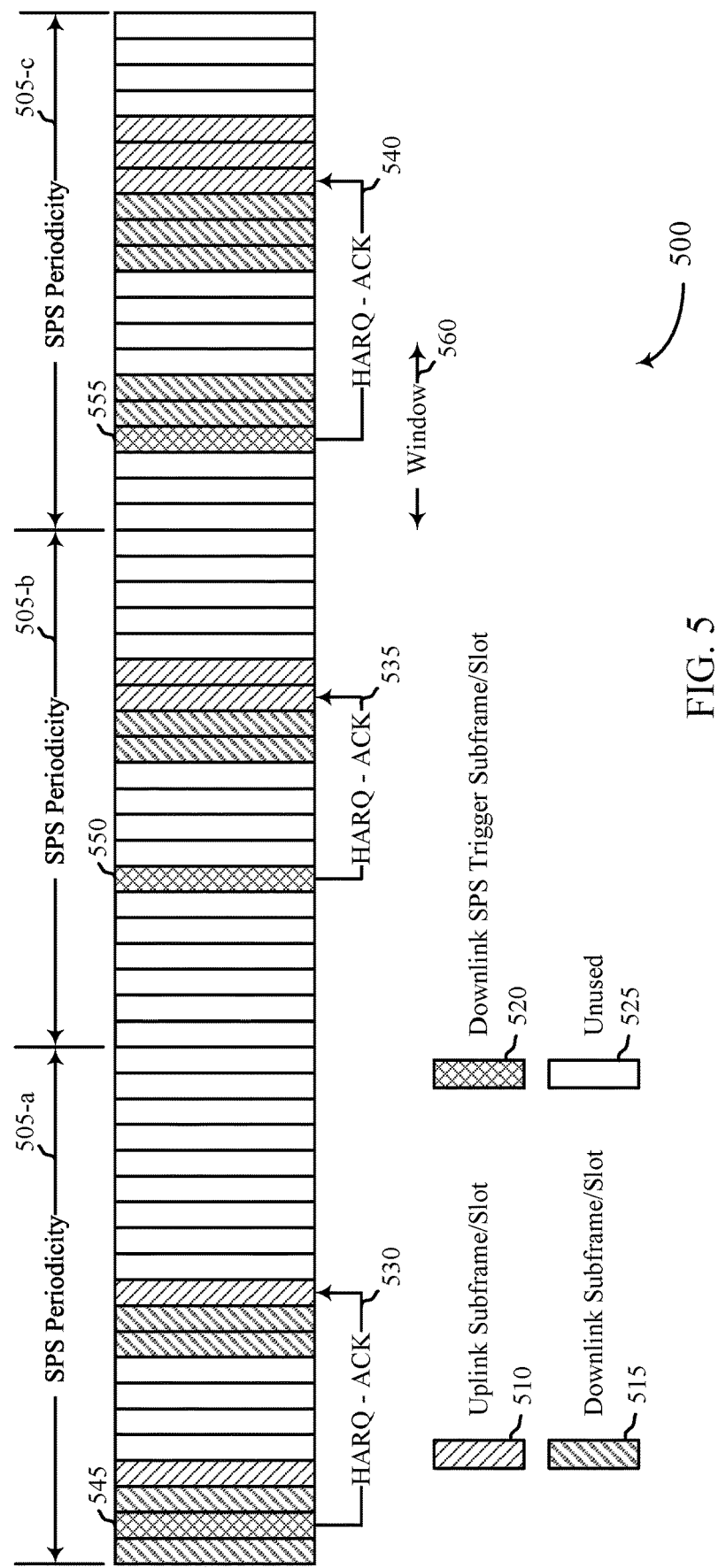
FIG. 5 illustrates an example of an SPS configuration that supports SPS for shared spectrum in accordance with aspects of the present disclosure.

FIG. 5 illustrates an example of an SPS configuration 500 that supports SPS for shared spectrum in accordance with various aspects of the present disclosure. In some examples, SPS configuration 500 may implement aspects of wireless communication systems 100, 200, and/or SPS configurations 300/400. Aspects of SPS configuration 500 may be implemented by a base station and/or a UE, which may be examples of the corresponding devices described herein. Broadly, SPS configuration 500 illustrates one example of a trigger-based approach for downlink SPS communications.

SPS configuration 500 may include a number of SPS periods 505. Each SPS period 505 may be based on the periodicity of the SPS configuration. In the example of SPS configuration 500, each SPS period 505 spans 20 subframes or slots. However, some or all of the SPS periods 505 may span a different number of subframes or slots. Each SPS period 505 may include uplink subframe(s) or slot(s) 510, downlink subframe(s) or slot(s) 515, downlink SPS trigger subframe(s) or slot(s) 520, and/or unused subframe(s) or slot(s) 525. Each SPS period 505 may have one or more configured HARQ processes. For example, SPS period 505-*a* may have HARQ process 530 configured, SPS period 505-*b* may have HARQ process 535 configured, and SPS period 505-*c* may have HARQ process 540 configured. Generally, the HARQ process provides a mechanism for transmission of ACK/NACK feedback information from the receiving device.

In some aspects, SPS configuration 500 may include the base station transmitting (and the UE receiving) an SPS configuration message that includes SPS parameter(s) for downlink SPS communications over the shared spectrum. The UE may use the SPS configuration to identify subframe(s) or slot(s) allocated for the downlink SPS communications. The base station and UE may perform the downlink SPS communications during the subframe(s) or slot(s) and according to the SPS configuration. The downlink SPS communications may be trigger-based such that an SPS trigger identifies which subframes or slots contain SPS communications. Accordingly, the SPS configuration may not identify which subframes or slots are used for SPS communications. Instead, the SPS configuration may identify such SPS parameter(s) as the SPS periodicity, the number of HARQ processes, and the like.

Thus, SPS period 505-*a* may include subframe or slot 545 where the base station selects subframe or slot 545 for an SPS transmission of a downlink message to UE(s). Accordingly, the base station may transmit (and the UE may receive) a control signal during the subframe or slot 545 that includes an SPS trigger. The SPS trigger may be sent in a GC-PDCCH, in some examples. In some aspects, the SPS trigger may be indicated by scrambling the DCI of the control signal using an identifier associated with the SPS configuration. One example of the identifier may include a GC-SPS C-RNTI. The SPS trigger may be for one or more than one UEs. The base station may then transmit (and the UE may receive) the downlink message in the subframe or slot 545 according to the SPS trigger. The downlink message may be associated with HARQ process 530 where the UE transmits ACK/NACK information based on whether the downlink message was successfully received and decoded by the UE.

Similarly, SPS period 505-*b* may include subframe or slot 550 where the base station selects subframe or slot 550 for an SPS transmission of a downlink message to UE(s). Accordingly, the base station may transmit (and the UE may receive) a control signal during the subframe or slot 550 that includes an SPS trigger. The SPS trigger may be sent in a GC-PDCCH, in some examples. In some aspects, the SPS trigger may be indicated by scrambling the DCI of the control signal using an identifier associated with the SPS configuration. One example of the identifier may include a GC-SPS C-RNTI. The SPS trigger may be for one or more than one UEs. The base station may then transmit (and the UE may receive) the downlink message in the subframe or slot 550 according to the SPS trigger. The downlink message may be associated with HARQ process 535 where the UE transmits ACK/NACK information based on whether the downlink message was successfully received and decoded by the UE.

Lastly, SPS period 505-*c* may include subframe or slot 555 where the base station selects subframe or slot 555 for an SPS transmission of a downlink message to UE(s).

Accordingly, the base station may transmit (and the UE may receive) a control signal during the subframe or slot 555 that includes an SPS trigger. In some examples, the base station may send the SPS trigger in a GC-PDCCH. In some aspects, the SPS trigger may be indicated by scrambling the DCI of the control signal using an identifier associated with the SPS configuration. One example of the identifier may include a GC-SPS C-RNTI. The SPS trigger may be for one or more than one UEs. The base station may then transmit (and the UE may receive) the downlink message in the subframe or slot 555 according to the SPS trigger. The downlink message may be associated with HARQ process 540 where the UE transmits ACK/NACK information based on whether the downlink message was successfully received and decoded by the UE.

In some aspects, the SPS configuration may include a configured window 560 in which the UE monitors a number of subframes or slots within to detect the SPS trigger. The subframe or slot 555 may be within the configured window 560.

In some aspects, SPS configuration 500 may be implemented in a scenario where the channel is heavily loaded, and channel access is not usually guaranteed at the desired instances. Thus, the UE may be configured with SPS periodicity and number of HARQ processes, but the exact subframe or slot location is not configured. Instead, the UE may monitor for a GC-PDCCH in every subframe or slot. One or more bits in the GC-PDCCH may indicate whether the UE's downlink SPS transmission corresponding a given HARQ process is present in that subframe or slot. This may constitute the SPS trigger.

In some aspects, the bits of the GC-PDCCH may be allocated to multiple UEs which share a common GC-SPS C-RNTI (e.g., as assigned via RRC signaling to each UE). An example bit assignment for the GC-PDCCH may include: bits 0,1,2 may indicate SPS process 0,1,2 for UE 1; bits 3,4 may indicate SPS process 0,1 for UE 2; and bits 5,6,7,8 may indicate SPS process 0,1,2,3 for UE 3. The SPS trigger may indicate the presence of the corresponding PDSCH in that subframe or slot.

In some aspects, multiple GC-SPS C-RNTIs may be configured to different sets of UEs to increase the number of SPS users in the system. In some aspects, the base station may send the DCI scrambled with GC-SPS C-RNTI in the common search space of the cell or a new search space defined by the GC-SPS C-RNTI. This may be different from SPS-RNTI which is assigned individually per UE and can be used to activate/release/update SPS configuration and resource allocation. In some aspects, the UEs also can be optionally configured to monitor a trigger within a desired window, such as configured window 465.

In some aspects, the SPS trigger for different HARQ processes for a given UE may be assigned to GC-PDCCH with different RNTI. This is because the UE is not expected to decode more than one SPS process per subframe or slot. Only one bit per UE may be activated in the DCI if all the triggers for a UE are in the same DCI.

In a fallback mode of operation, if the UE does not receive any SPS triggers within the configured window 560, the UE may monitor the regular PDSCH scheduled by PDCCH scrambled with the UE's C-RNTI. This may be suitable if the configured window 560 is configured to the UE in which the base station is expected to transmit the SPS.

Figure 6:
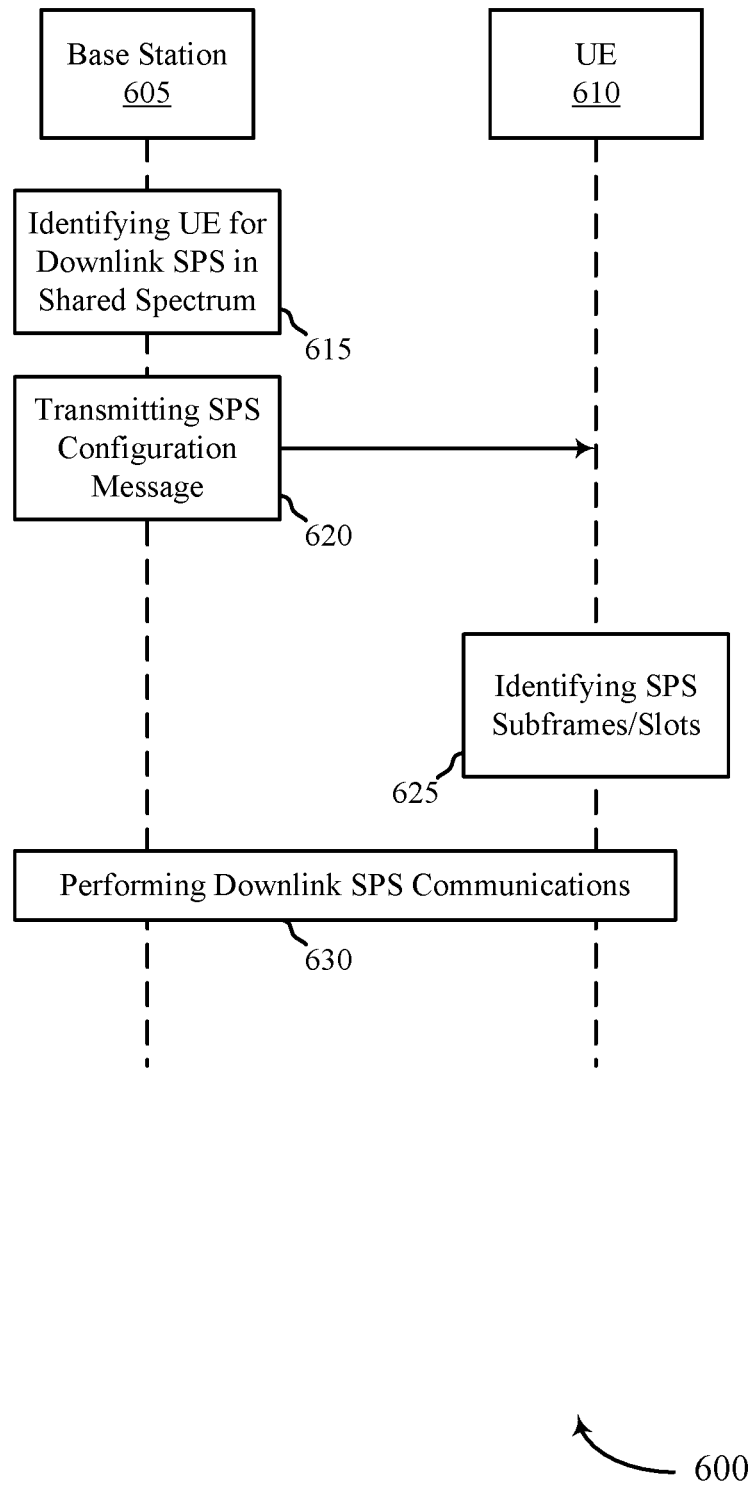
FIG. 6 illustrates an example of a process that supports SPS for shared spectrum in accordance with aspects of the present disclosure.

FIG. 6 illustrates an example of a process 600 that supports SPS for shared spectrum in accordance with various aspects of the present disclosure. In some examples, process 600 may implement aspects of wireless communication systems 100/200 and/or SPS configurations 300/400/500. Process 600 may include a base station 605 and a UE 610, which may be examples of the corresponding devices described herein.

At 615, base station 605 may identify UE(s) for performing downlink SPS communications over a shared spectrum. The identified UE(s) may include UE 610.

At 620, base station 605 may transmit (and UE 610 may receive) an SPS configuration message to the identified UE(s) 610. The SPS configuration message may carry or otherwise convey SPS parameter(s) for the downlink SPS communications over the shared spectrum (e.g., SPS periodicity, number of HARQ processes, resource allocation(s), etc.).

At 625, UE 610 may identify subframe(s) or slot(s) that are allocated, according to the SPS configuration, for the downlink SPS communications. In some aspects, the SPS configuration may identify which subframe(s) or slot(s) have been allocated for the downlink SPS communications. In some aspects, the SPS configuration may not identify the subframe(s) or slot(s), but may instead indicate that the subframes or slots will be trigger-based.

At 630, base station 605 and UE 610 may perform downlink SPS communications in the shared spectrum and according during the identified subframe(s) or slot(s) and in accordance with the SPS configuration.

In some aspects, the downlink SPS communications may include grant-based SPS transmissions where, when the channel is unavailable during a first subframe or slot, the base station transmits a downlink grant for a second subframe or slot that replaces the first subframe or slot for transmission of the downlink message. The base station may transmit the downlink message in the second subframe or slot and according to the downlink grant.

In some aspects, the downlink SPS communications may include grantless transmissions where, when the channel is unavailable during a first subframe or slot, the base station performs a grantless transmission of the downlink message during a second subframe or slot. The second subframe or slot may be within a configured window according to the SPS configuration. The UE may monitor each subframe or slot within the configured window to detect and receive the grantless transmission of the downlink message.

In some aspects, the downlink SPS communications may be trigger-based transmissions where the SPS configuration does not identify the subframes or slots configured for the downlink SPS configurations. Instead, the base station will include or otherwise convey an indication of an SPS trigger in a subframe or slot carrying the downlink message. The UE may monitor the control signal in subframes or slots (e.g., within a configured window) to detect the SPS trigger and, when detected, receive the downlink message in that subframe or slot.

In some aspects, the downlink SPS communications may adopt a hybrid approach where the UE monitors the control signal to detect a downlink grant and/or an SPS trigger. If either is detected in the control signal of the subframe or slot, the UE may receive the downlink message during that subframe or slot.

Figure 7:
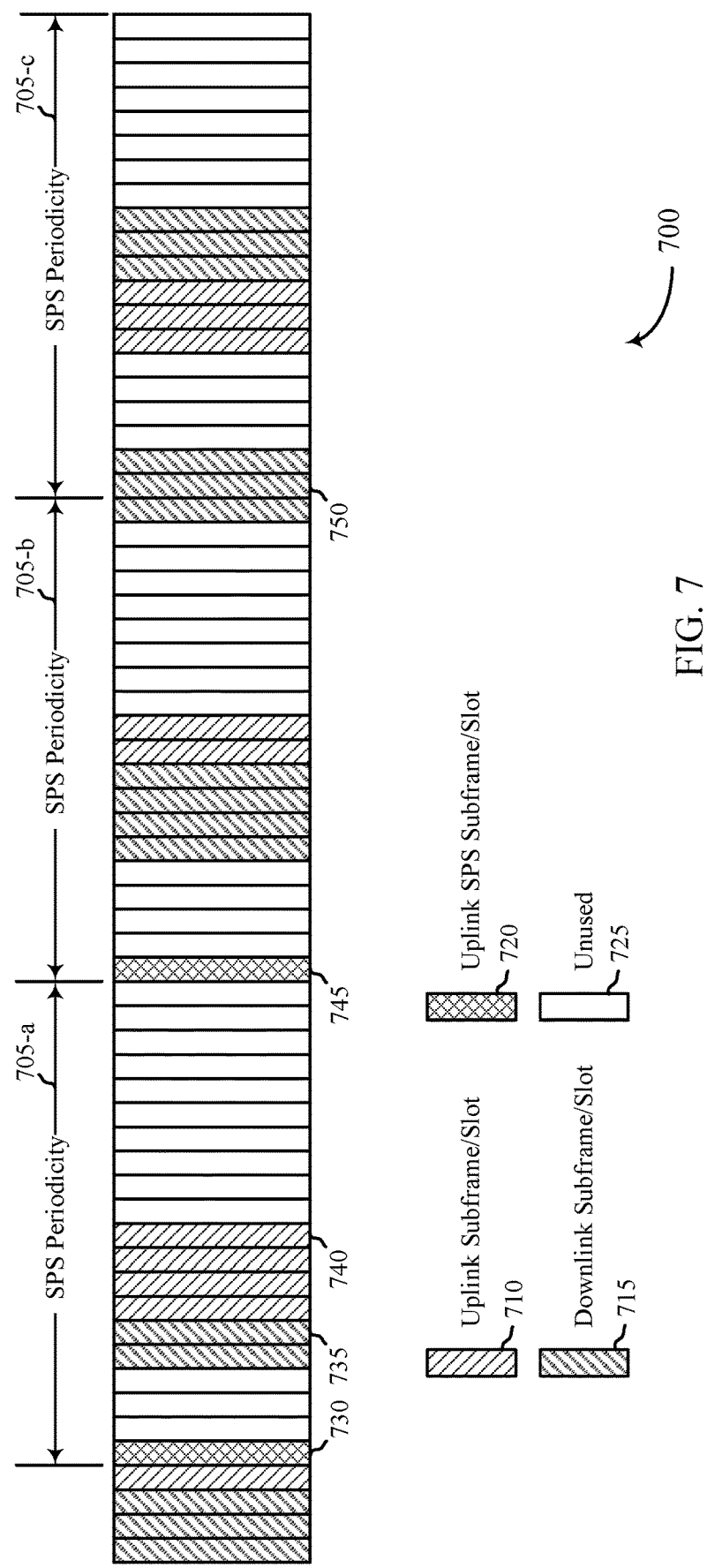
FIG. 7 illustrates an example of an SPS configuration that supports SPS for shared spectrum in accordance with aspects of the present disclosure.

FIG. 7 illustrates an example of an SPS configuration 700 that supports SPS for shared spectrum in accordance with various aspects of the present disclosure. In some examples, SPS configuration 700 may implement aspects of wireless communication systems 100, 200, SPS configurations 300/400/500, and/or process 600. Aspects of SPS configuration 700 may be implemented by a base station and/or a UE, which may be examples of the corresponding devices described herein. Broadly, SPS configuration 700 illustrates one example of a grant-based approach for uplink SPS communications.

SPS configuration 700 may include a number of SPS periods 705. Each SPS period 705 may be based on the periodicity of the SPS configuration. In the example of SPS configuration 700, each SPS period 705 spans 20 subframes or slots. However, some or all of the SPS periods 705 may span a different number of subframes or slots. Each SPS period 705 may include uplink subframe(s) or slot(s) 710, downlink subframe(s) or slot(s) 715, uplink SPS subframe(s) or slot(s) 720, and/or unused subframe(s) or slot(s) 725. Each SPS period 705 may have one or more configured HARQ processes (not shown). Generally, the HARQ process provides a mechanism for transmission of ACK/NACK feedback information from the receiving device.

In some aspects, SPS configuration 700 may include the base station identifying UE(s) for performing uplink SPS communications over a shared spectrum. The base station may transmit (and the UE may receive) an SPS configuration message that includes SPS parameter(s) for uplink SPS communications over the shared spectrum. The UE may use the SPS configuration to identify subframe(s) or slot(s) allocated for the uplink SPS communications. The base station and UE may perform the uplink SPS communications during the subframe(s) or slot(s) and according to the SPS configuration.

Thus, SPS period 705-a may begin at subframe or slot 730 where the UE attempts to transmit a uplink SPS subframe or slot 720. The UE may perform a CCA and/or LBT procedure (e.g., a 25 micro second LBT procedure as the SPS subframe or slot is within a transmission opportunity) on the channel and, if successful, transmit the uplink message during the subframe or slot 730. However, if the CCA and/or LBT procedure is unsuccessful during the subframe or slot 730, the base station may transmit (and the UE may receive) an uplink grant that during the subframe or slot 735 identifying a second subframe or slot that replaces the first subframe or slot (e.g., subframe or slot 730) for transmission of the uplink message. Accordingly, during subframe or slot 740 the UE may again attempt to transmit the uplink message to the base station according to the uplink grant. If the UE determines that the channel is unavailable during the subframe or slot 740, the UE may drop the message. If the UE determines that the subframe or slot 740 occurs after the next instance of the SPS TxOP, the UE may again drop the message. If the UE determines that the base station has scheduled subframe or slot 740 for downlink transmission, the UE may refrain from transmitting the uplink message during the subframe or slot 740. In some aspects, the uplink grant may assign the uplink message to a new HARQ process.

In some aspects, the UE may determine that the uplink transmission was not received at the base station by decoding field(s) of a PHICH, PDCCH, etc. The field(s) may carry or otherwise convey ACK/NACK information from the base station. In some aspects, the base station may drop the ACK/NACK message during subframes or slots that are determined to be unavailable (e.g., due to unsuccessful CCA and/or LBT procedures).

SPS period 705-b may include subframe or slot 745 where the UE attempts to transmit a uplink SPS subframe or slot 720. The UE may perform a CCA and/or LBT procedure (e.g., a category (CAT) 4 LBT procedure with priority class 1) on the channel and, if successful as is shown in SPS configuration 700, transmit the uplink message during the subframe or slot 745.

SPS period 705-c may subframe or slot 750 in which the base station has scheduled downlink in this uplink SPS instance. The UE may determine based on the C-PDCCH that this subframe or slot 750 has been scheduled for downlink and may skip the uplink SPS instance during SPS period 705-c.

In some aspects, SPS configuration 700 may be implemented in a situation where channel access is almost guaranteed (e.g., a planned deployment without any major interference to uplink transmissions and moderately loaded channel).

In some aspects, this may include an asynchronous HARQ scenario where the uplink activation grant indicates the HARQ process ID, the start subframe or slot (and subframe or slot number (SFN)) of the transmission of uplink SPS, and the like. SPS periodicity may be configured in RRC signaling.

In some aspects, SPS configuration 700 may be applicable to two-stage uplink grants. For example, the UE may activate the uplink SPS by a single stage uplink grant which indicates the starting delay for the SPS uplink instance. This may include no cross-TxOP activation.

In some aspects, this may include various LBT types utilized by the UE. For example, if the UE detects base station transmission in subframe or slot n−2, the UE may use C-PDCCH signaling to determine the LBT type to use for the uplink transmission. If the UE receives the C-PDCCH in subframe or slot n−2 indicating that the designated uplink SPS subframe or slot is part of a base station TxOP, the UE may perform a 25 is LBT. If not, the UE may perform a Category 4 LBT with priority class N. The value of N may depend on how many consecutive HARQ processes are scheduled by the base station. If one or two subframes or slots, a LBT priority class 1 may be sufficient If the UE LBT fails or the base station detection/decoding of the uplink message fails, the base station may transmit an uplink grant to the UE for retransmission of that HARQ feedback, and the UE may retransmit the HARQ feedback according to the retransmission grant. If the retransmission is successful before the next instance of transmission of that HARQ process, then the uplink transmission is successful. If the retransmission is not successful or the retransmission grant schedules a UE to transmit after the next instance of the SPS transmission, the UE may discard the packet. If the uplink SPS instance is declared as downlink by the base station, then the UE may skip the SPS instance.

For grant-based uplink SPS communications, the HARQ process may be preconfigured by the base station. For grantless uplink SPS communications, the UE may choose HARQ, RV, and/or NDI. For grant-based uplink SPS communications, the uplink SPS communications based on asynchronous uplink HARQ may not be explicitly ACKed by the base station. Asynchronous HARQ may not be ACKed by the base station in general. For synchronous HARQ, the PHICH may carry or otherwise convey the ACK/NACK info. For grantless uplink SPS communications, the base station may use the DCI/DCF to indicate the ACK feedback.

In some aspects where only one uplink HARQ process is configured, a grantless uplink SPS transmission may not reduce control overhead as the grantless transmission needs to be ACKed by the base station in a UE specific DCI. A grant-based uplink SPS transmission may reduce control overhead as the uplink transmission is assumed to be received correctly. Only retransmission may be scheduled.

In some aspects where multiple HARQ processes are configured, grantless uplink SPS transmissions may provide some transmission flexibility and reduce control overhead, (e.g., all the ACK information can be sent in the same DCI). However, this may provide little control over which HARQ process is used by the UE at a given instance of time, and periodicity may not be maintained.

Figure 8:
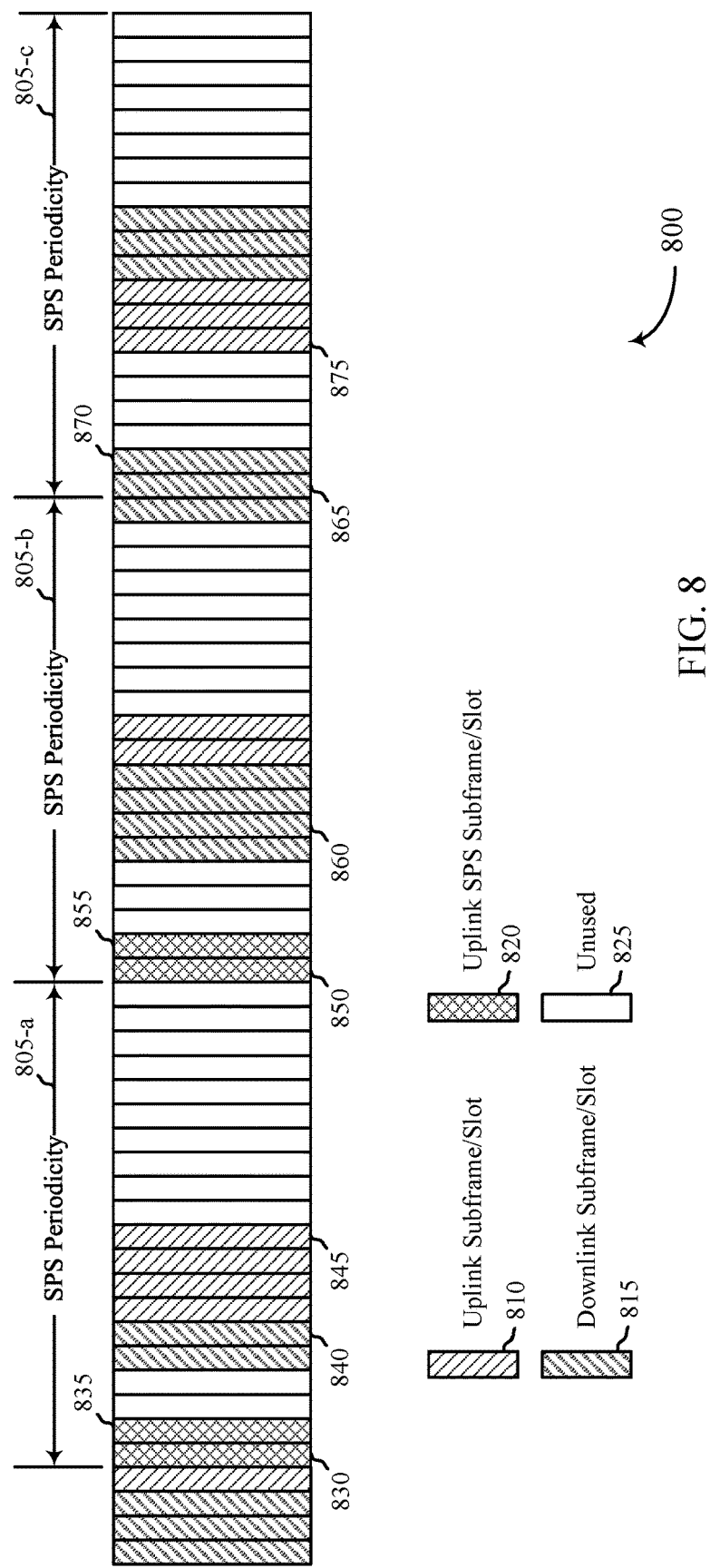
FIG. 8 illustrates an example of an SPS configuration that supports SPS for shared spectrum in accordance with aspects of the present disclosure.

FIG. 8 illustrates an example of an SPS configuration 800 that supports SPS for shared spectrum in accordance with various aspects of the present disclosure. In some examples, SPS configuration 800 may implement aspects of wireless communication systems 100, 200 and/or SPS configurations 300/400/500/700, and/or process 600. Aspects of SPS configuration 800 may be implemented by a base station and/or a UE, which may be examples of the corresponding devices described herein. Broadly, SPS configuration 800 illustrates one example of a grantless approach for uplink SPS communications.

Broadly, SPS configuration 800 may include a plurality of SPS periods 805. Each SPS period 805 may be based on the periodicity of the SPS configuration. In the example of SPS configuration 800, each SPS period 805 spans 20 subframes or slots. However, some or all of the SPS periods 805 may span a different number of subframes or slots. Each SPS period 805 may include uplink subframe(s) or slot(s) 810, downlink subframe(s) or slot(s) 815, uplink SPS subframe(s) or slot(s) 820, and/or unused subframe(s) or slot(s) 825. Each SPS period 805 may have one or more configured HARQ processes (not shown). Generally, the HARQ process provides a mechanism for transmission of ACK/NACK feedback information from the receiving device.

In some aspects, SPS configuration 800 may include the base station identifying UE(s) for performing uplink SPS communications over a shared spectrum. The base station may transmit (and the UE may receive) an SPS configuration message that includes SPS parameter(s) for uplink SPS communications over the shared spectrum. The UE may use the SPS configuration to identify subframe(s) or slot(s) allocated for the uplink SPS communications. The base station and UE may perform the uplink SPS communications during the subframe(s) or slot(s) and according to the SPS configuration.

Thus, SPS period 805-a may include subframes or slots 830 and 835. Subframe or slot 830 may carry uplink SPS transmission for a first group of UEs and subframe or slot 835 may carry uplink SPS transmission or a second group of UEs. Subframe or slot 845 may carry a GC-DCI (e.g., ACK/NACK information) that indicates the uplink SPS transmission status for the UEs from both groups of UEs. Assuming that the uplink SPS transmission were successful, no further transmissions may be needed. However, when the channel was unavailable and/or the uplink SPS transmission was not received at the base station, at subframe or slot 840 the UE may perform a grantless uplink transmission of the uplink SPS message.

In some aspects, the grantless transmission may be based on transmission parameter(s) associated with what would have been the transmission during the subframe or slot 830 and/or 835, but for the channel being unavailable or the uplink SPS transmission not being received at the base station. The UE may use the same transmission parameters for the grantless transmission of the message during the subframe or slot 845. Examples of the transmission parameters include, but are not limited to, an MCS, a resource allocation scheme, and the like.

In some aspects, the base station may transmit a configuration message (e.g., the SPS configuration message or a separate configuration message) that identifies resources to be used for the grantless uplink SPS transmission. The resources may indicate the subframe or slot 845 as allocated for grantless uplink SPS transmissions for one or more UEs.

Similarly, SPS period 805-b may include subframes or slots 850 and 855. Subframe or slot 850 may carry uplink SPS transmission for a first group of UEs and subframe or slot 855 may carry uplink SPS transmission or a second group of UEs, and so on. Subframe or slot 860 may carry a GC-DCI (e.g., ACK/NACK information) that indicates the uplink SPS transmission status for the UEs from both groups of UEs. Assuming that the uplink SPS transmission were successful (as is shown during SPS period 805-b), no further SPS transmissions may be needed.

Lastly, SPS period 805-c may include subframes or slots 865 and 870. Subframe or slot 865 may carry uplink SPS transmission for a first group of UEs and subframe or slot 870 may carry uplink SPS transmission or a second group of UEs. Subframe or slot 875 may carry a GC-DCI (e.g., ACK/NACK information) that indicates the uplink SPS transmission status for the UEs from both groups of UEs. Assuming that the uplink SPS transmission was successful (as is shown during SPS period 805-c), no further SPS transmissions may be needed.

In some aspects, a grant-based uplink SPS transmission scheme may be configured with a grantless uplink SPS transmission scheme implemented as a fallback. The grantless uplink SPS transmission may be used in the instance where the uplink LBT or uplink transmission is unsuccessful. A DCI may be used to signal whether the uplink SPS transmission is successful or not (e.g., a common DCI in which one bit is assigned to a given UE's uplink SPS process). For example, bits 0,1,2 may be associated with uplink SPS process 0,1,2 for UE1, bit 3,4 may be associated with uplink SPS process 0,1 for UE2, etc. The DCI may be scrambled similar to a group common DCI with a common RNTI shared by many UEs. The grantless uplink SPS transmission resources may be overloaded as the chances of uplink transmission of most UEs can be considered successful. An optional approach may include DCI/DFI indicating success of the uplink SPS transmission. If UE1 cannot transmit before the next instance, UE1 may discard the packet of the uplink SPS transmission.

In some aspects, the grantless uplink SPS transmission may be based on a configured window (not shown). Accordingly, the subframe or slot 845 may be identified based on the configured window. The base station may transmit a configuration message (e.g., the SPS configuration message or a separate configuration message) to the UE that identifies the configured window.

Figure 9:
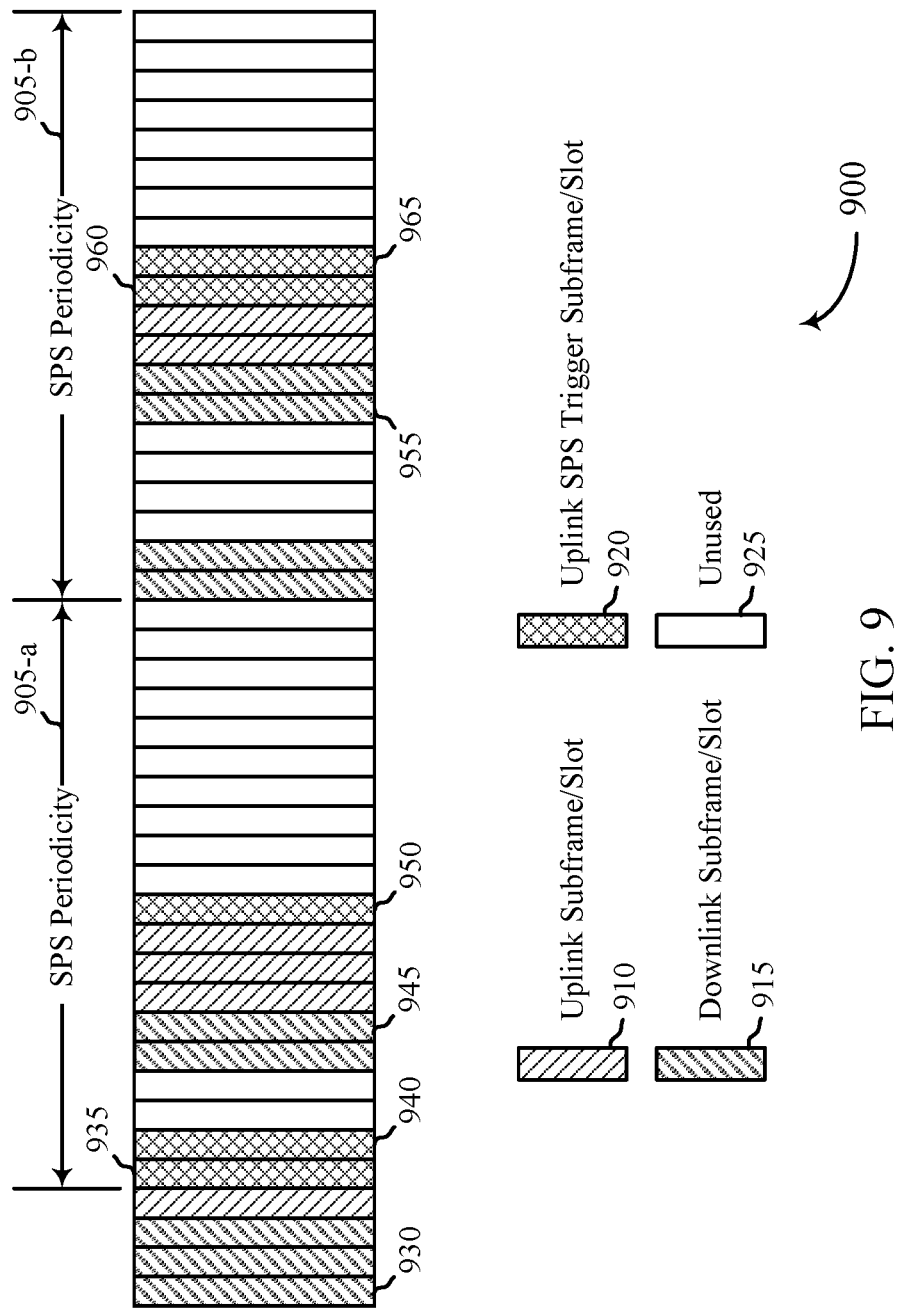
FIG. 9 illustrates an example of an SPS configuration that supports SPS for shared spectrum in accordance with aspects of the present disclosure.

FIG. 9 illustrates an example of an SPS configuration 900 that supports SPS for shared spectrum in accordance with various aspects of the present disclosure. In some examples, SPS configuration 900 may implement aspects of wireless communication systems 100, 200, and/or SPS configurations 300/400/500/700/800, and/or process 600. Aspects of SPS configuration 900 may be implemented by a base station and/or a UE, which may be examples of the corresponding devices described herein. Broadly, SPS configuration 900 illustrates one example of a trigger-based approach for uplink SPS communications.

Broadly, SPS configuration 900 may include a plurality of SPS periods 905. Each SPS period 905 may be based on the periodicity of the SPS configuration. In the example of SPS configuration 900, each SPS period 905 spans 20 subframes or slots. However, some or all of the SPS periods 905 may span a different number of subframes or slots. Each SPS period 905 may include uplink subframe(s) 910, downlink subframe(s) or slot(s) 915, uplink SPS trigger subframe(s) or slot(s) 920, and/or unused subframe(s) or slot(s) 925. Each SPS period 905 may have one or more configured HARQ processes (not shown). Generally, the HARQ process provides a mechanism for transmission of ACK/NACK feedback information from the receiving device.

In some aspects, SPS configuration 900 may include the base station transmitting (and the UE receiving) an SPS configuration message that includes SPS parameter(s) for uplink SPS communications over the shared spectrum. The UE may use the SPS configuration to identify subframe(s) or slot(s) allocated for the uplink SPS communications. The base station and UE may perform the uplink SPS communications during the subframe(s) or slot(s) and according to the SPS configuration. The uplink SPS communications may be trigger-based in that an uplink SPS trigger subframe or slot 920 identifies which subframes or slots contain uplink SPS communications. Accordingly, the SPS configuration may not identify which subframes or slots are used for uplink SPS communications. Instead, the SPS configuration may identify such SPS parameter(s) as the SPS periodicity, the number of HARQ processes, and the like.

Subframe or slot 930 may include an SPS trigger in a control signal of the subframe or slot that triggers one or more UEs to perform uplink SPS transmissions during a subframe or slot. In the example SPS period 905-a, the SPS trigger from subframe or slot 930 triggers a first group of UEs to perform uplink SPS transmissions during subframe or slot 935 and a second group of UEs to perform uplink SPS transmissions during subframe or slot 940. That is, the base station may select subframes or slots 935 and 940 for an SPS transmission of an uplink message from the UEs within the first and second groups. The base station transmits the SPS trigger in the control signal during the subframe or slot 930. During SPS period 905-a, subframe or slot 945 may include a GC DCI field that is set based on the success of the uplink SPS transmissions from the first and second groups of UEs (e.g., carries ACK/NACK information). In the example SPS configuration 900, the subframe or slot 945 triggers retransmission of the unsuccessful uplink SPS transmissions during subframe or slot 950. That is, the base station may select subframe or slot 950 for an SPS transmission of an uplink message from the UEs whose uplink SPS transmissions were previously unsuccessful. The base station transmits the SPS trigger in the control signal during the subframe or slot 945.

Similarly, SPS period 905-b may include subframe or slot 955 where the base station selects subframes or slots 960 and 965 for an SPS transmission of uplink messages from the first and second groups of UEs. Accordingly, the base station may transmit (and the UE may receive) a control signal during the subframe or slot 955 that includes an SPS trigger. The SPS trigger may be sent in a GC-PDCCH, in some examples. In some aspects, the SPS trigger may be indicated by scrambling the DCI of the control signal using an identifier associated with the SPS configuration. One example of the identifier may include a GC-SPS C-RNTI. The UEs may then transmit (and the base station may receive) the uplink SPS messages in the subframes or slots 960 and 969 according to the SPS trigger. The uplink messages may be associated with HARQ process where the base station transmits ACK/NACK information based on whether the uplink message was successfully received and decoded by the base station.

In some aspects, SPS configuration 900 may be implemented in a scenario where the channel is loaded, and channel access is not usually guaranteed at the desired instances. Accordingly, the UE may be configured with SPS periodicity and the number of HARQ processes, but the exact subframe or slot location may not be configured. Instead, the UE may monitor for a GC-PDCCH in every subframe or slot. One bit in the GC-PDCCH may indicate whether the UE's uplink SPS transmission corresponding a given HARQ process is present in that subframe or slot. This may constitute the SPS trigger.

In some aspects, the bits of the GC-PDCCH can be allocated to many UEs which share a common GC-SPS C-RNTI (e.g., as assigned via RRC signaling to each UE). As one example of bit assignment in GC-PDCCH: bits 0,1,2 may be associated with HARQ SPS process 0,1,2 for UE 1; bits 3,4 may be associated with HARQ SPS process 0,1 for UE 2; bits 5,6,7,8 may be associated with HARQ SPS process 0,1,2,3 for UE 3; and so on.

In some aspects, each UE may be configured with a subframe or slot delay for an SPS process. Based on when the SPS trigger is received and the configured subframe or slot delay, the UE may determine which subframe or slot is used for the uplink SPS transmission.

In some aspects, two options may be implemented with respect to a redundancy version (RV). In a first option, RV0 may be used for all transmissions and retransmissions. On a second option, the RV is indicated in the GC-DCI. All UEs triggered by the DCI may share the same RV.

In some aspects, various LBT schemes may be used. For example, Category 4 LBT may be used for certain UEs, but may have an associated risk of collision. For each UE, since the packet size is small, it is sufficient for each UE to perform Category 4 LBT with priority class 1 (with maximum window size of 7). The base station may (in RRC signaling or an SPS activation grant) configure the transmit PUSCH only until symbol 12 or symbol 13 so that there is sufficient gap for the next UE's LBT.

Figure 10:
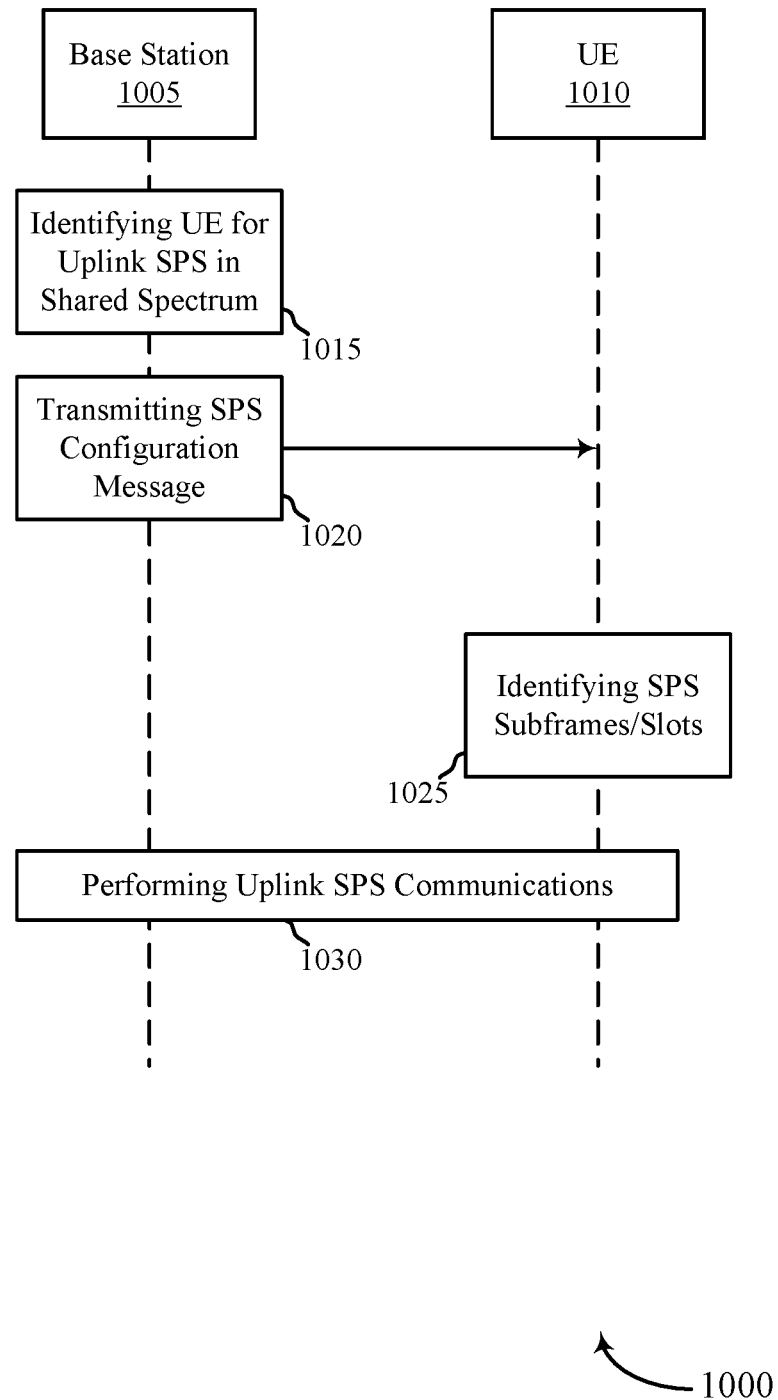
FIG. 10 illustrates an example of a process that supports SPS for shared spectrum in accordance with aspects of the present disclosure.

FIG. 10 illustrates an example of a process 1000 that supports SPS for shared spectrum in accordance with various aspects of the present disclosure. In some examples, process 1000 may implement aspects of wireless communication systems 100,200, SPS configurations 300/400/500/ 700/800/900, and/or process 600. Process 1000 may include a base station 1005 and a UE 1010, which may be examples of the corresponding devices described herein.

At 1015, base station 1005 may identify UE(s) for performing uplink SPS communications over a shared spectrum. The identified UE(s) may include UE 1010.

At 1020, base station 1005 may transmit (and UE 610 may receive) an SPS configuration message to the identified UE(s). The SPS configuration message may carry or otherwise convey SPS parameter(s) for the uplink SPS communications over the shared spectrum (e.g., SPS periodicity, number of HARQ processes, resource allocation(s), etc.).

At 1025, UE 1010 may identify subframe(s) or slot(s) that are allocated, according to the SPS configuration, for the uplink SPS communications. In some aspects, the SPS configuration may identify which subframe(s) or slot(s) have been allocated for the uplink SPS communications. In some aspects, the SPS configuration may not identify the subframe(s) or slot(s), but may instead indicate that the subframes or slots will be trigger-based.

At 1030, base station 1005 and UE 1010 may perform uplink SPS communications in the shared spectrum and according during the identified subframe(s) or slot(s) and in accordance with the SPS configuration.

In some aspects, the uplink SPS communications may include grant-based SPS transmissions where, when the channel is unavailable during a first subframe or slot, the base station transmits an uplink grant for a second subframe or slot that replaces the first subframe or slot for transmission of the uplink message. The UE may transmit the uplink message in the second subframe or slot and according to the uplink grant.

In some aspects, the uplink SPS communications may include grantless transmissions where, when the channel is unavailable during a first subframe or slot, the UE performs a grantless transmission of the uplink message during a second subframe or slot. The second subframe or slot may be within a configured window according to the SPS configuration. The base station may monitor each subframe or slot within the configured window to detect and receive the grantless transmission of the uplink message.

In some aspects, the uplink SPS communications may be trigger-based transmissions where the SPS configuration does not identify the subframes or slots configured for the uplink SPS configurations. Instead, the base station will include or otherwise convey an indication of an SPS trigger in a subframe or slot carrying the uplink message. The UE may monitor the control signal in subframes or slots (e.g., within a configured window) to detect the SPS trigger and transmit the uplink message in that subframe or slot upon detection.

In some aspects, the uplink SPS communications may adopt a hybrid approach where the UE monitors the control signal to detect an uplink grant and/or an SPS trigger. If either is detected in the control signal of the subframe or slot, the UE may transmit the uplink message during that subframe or slot.

Figure 11:
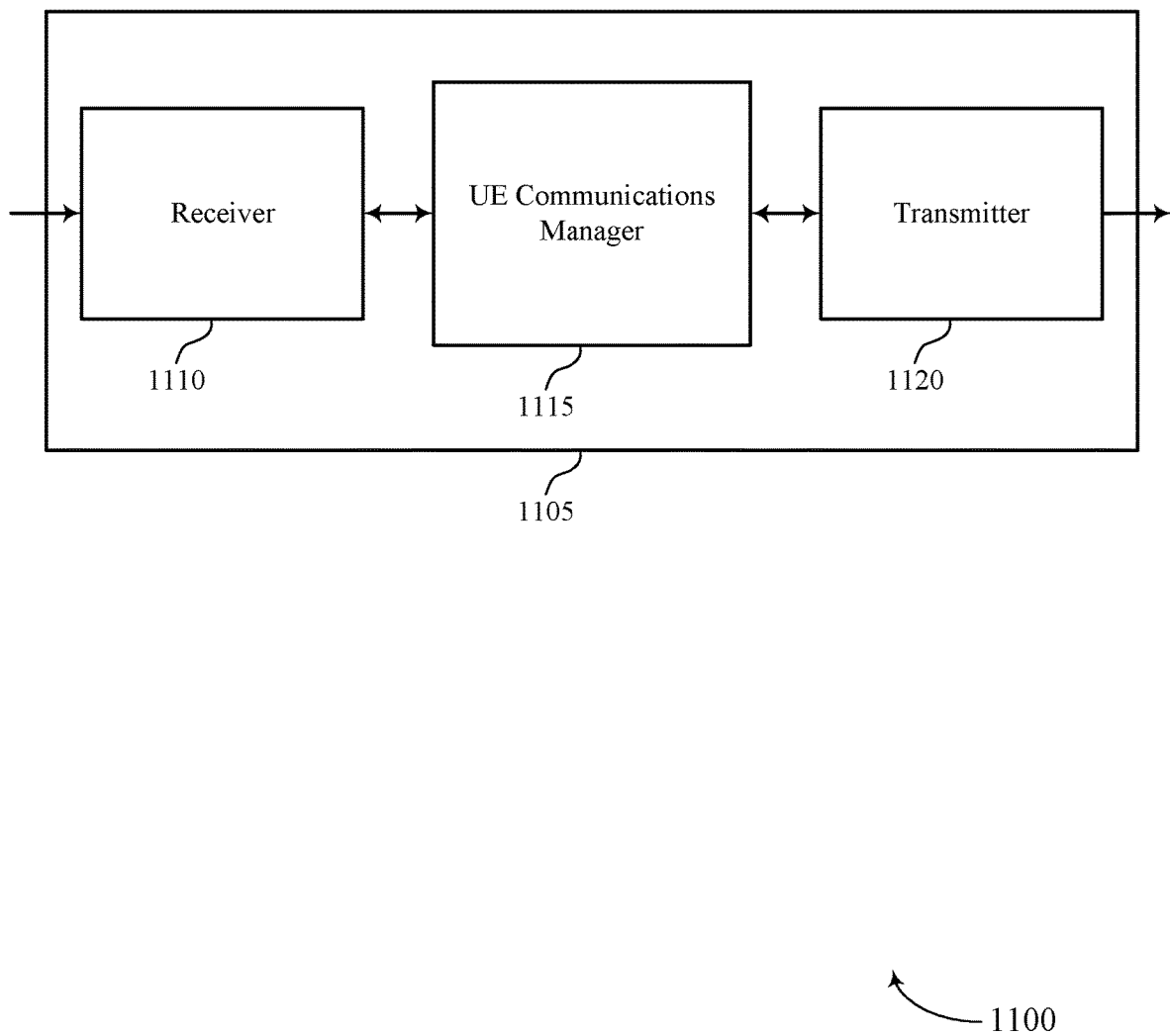
FIGS. 11 through 13 show block diagrams of a device that supports SPS for shared spectrum in accordance with aspects of the present disclosure.

FIG. 11 shows a block diagram 1100 of a wireless device 1105 that supports SPS for shared spectrum in accordance with aspects of the present disclosure. Wireless device 1105 may be an example of aspects of a UE 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to SPS for shared spectrum, etc.). Information may be passed on to other components of the device. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14.

UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may receive an SPS configuration message from a base station, the SPS configuration message including at least one SPS parameter for downlink SPS communications over a shared radio frequency spectrum band, identify, based on the SPS configuration, one or more subframes or slots allocated for the downlink SPS communications, and perform the downlink SPS communications during the one or more subframes or slots and according to the SPS configuration. The UE communications manager 1115 may also receive an SPS configuration message from a base station, the SPS configuration message including at least one SPS parameter for uplink SPS communications over a shared radio frequency spectrum band, identify, based on the SPS configuration, one or more subframes or slots allocated for the uplink SPS communications, and perform the uplink SPS communications during the one or more subframes or slots and according to the SPS configuration.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
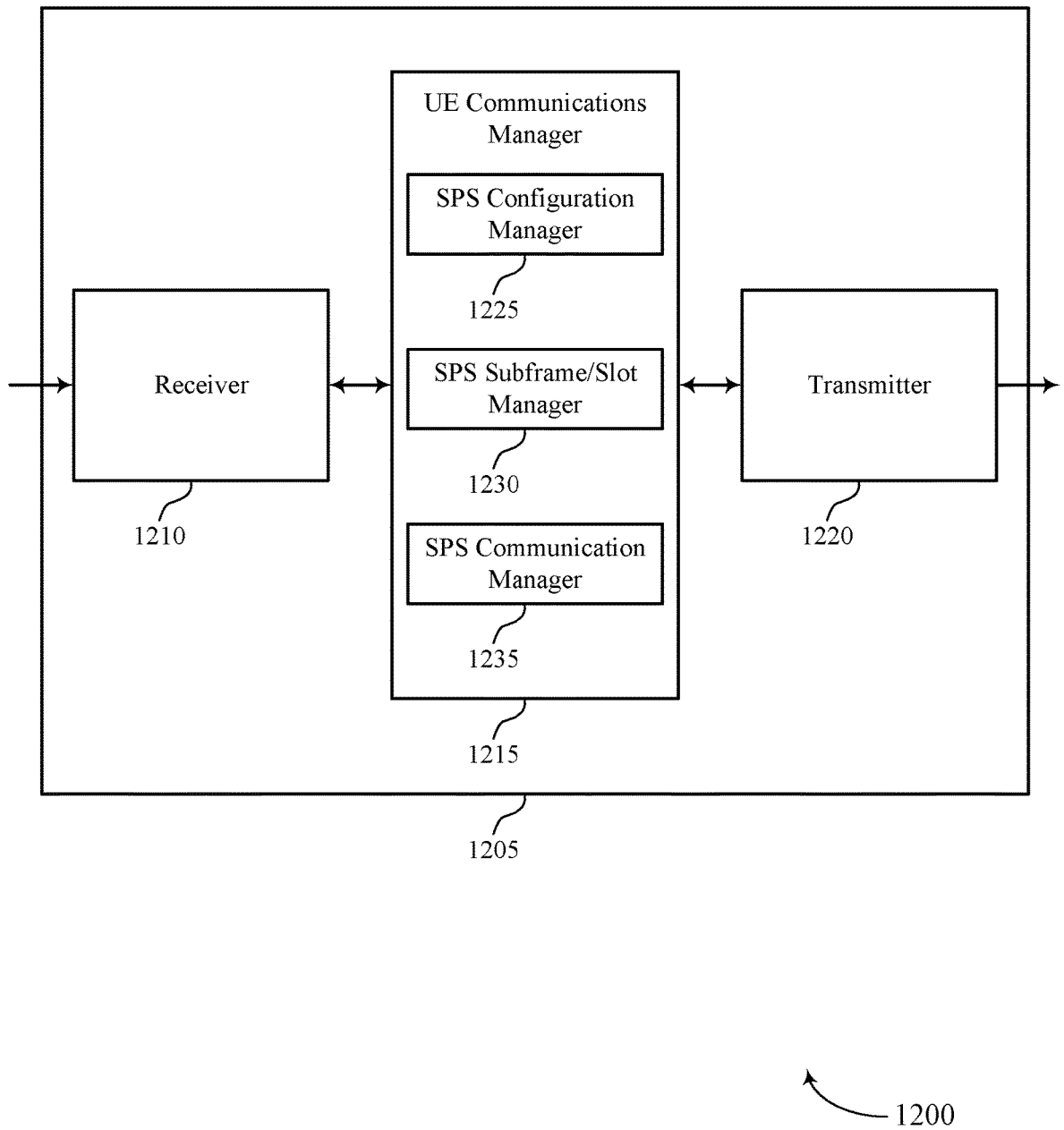

FIG. 12 shows a block diagram 1200 of a wireless device 1205 that supports SPS for shared spectrum in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to SPS for shared spectrum, etc.). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14.

UE communications manager 1215 may also include SPS configuration manager 1225, SPS subframe or slot manager 1230, and SPS communication manager 1235.

SPS configuration manager 1225 may receive an SPS configuration message from a base station, the SPS configuration message including at least one SPS parameter for downlink SPS communications over a shared radio frequency spectrum band and receive an SPS configuration message from a base station, the SPS configuration message including at least one SPS parameter for uplink SPS communications over a shared radio frequency spectrum band.

SPS subframe or slot manager 1230 may identify, based on the SPS configuration, one or more subframes or slots allocated for the downlink SPS communications and identify, based on the SPS configuration, one or more subframes or slots allocated for the uplink SPS communications.

SPS communication manager 1235 may perform the downlink SPS communications during the one or more subframes or slots and according to the SPS configuration and perform the uplink SPS communications during the one or more subframes or slots and according to the SPS configuration.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
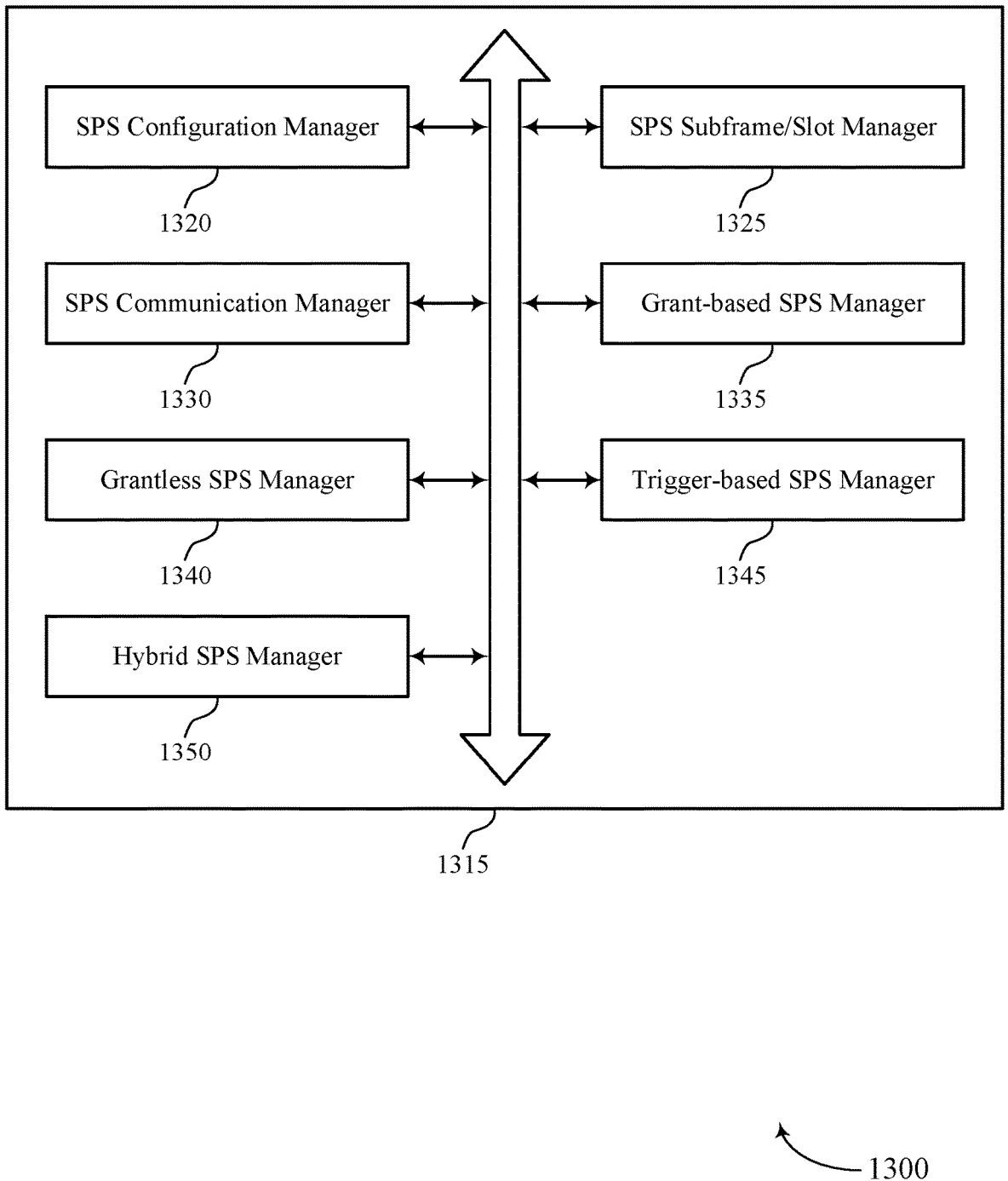

FIG. 13 shows a block diagram 1300 of a UE communications manager 1315 that supports SPS for shared spectrum in accordance with aspects of the present disclosure. The UE communications manager 1315 may be an example of aspects of a UE communications manager 1115, a UE communications manager 1215, or a UE communications manager 1415 described with reference to FIGS. 11, 12, and 14. The UE communications manager 1315 may include SPS configuration manager 1320, SPS subframe or slot manager 1325, SPS communication manager 1330, grant-based SPS manager 1335, grantless SPS manager 1340, trigger-based SPS manager 1345, and hybrid SPS manager 1350. Each of these modules may communicate, directly or indirectly, with one another (e.g., via one or more buses).

SPS configuration manager 1320 may receive an SPS configuration message from a base station, the SPS configuration message including at least one SPS parameter for downlink SPS communications over a shared radio frequency spectrum band and receive an SPS configuration message from a base station, the SPS configuration message including at least one SPS parameter for uplink SPS communications over a shared radio frequency spectrum band.

SPS subframe or slot manager 1325 may identify, based on the SPS configuration, one or more subframes or slots allocated for the downlink SPS communications and identify, based on the SPS configuration, one or more subframes or slots allocated for the uplink SPS communications.

SPS communication manager 1330 may perform the downlink SPS communications during the one or more subframes or slots and according to the SPS configuration and perform the uplink SPS communications during the one or more subframes or slots and according to the SPS configuration.

Grant-based SPS manager 1335 may transmit the message on the channel during the second subframe or slot based on a result of the CCA or LBT procedure, receive the message on the channel during the second subframe or slot in accordance with the downlink grant, determine that the channel is unavailable for transmission of an acknowledgement/negative ACK/NACK message during a third subframe or slot according to the downlink grant, drop the ACK/NACK message based on the channel being unavailable, receive a configuration message indicating a set of possible PUCCH resources for ACK/NACK transmissions, where the indication of the ACK/NACK resource in the downlink grant identifies one of the possible PUCCH resources, receive, based on the determination, an uplink grant indicating a second subframe or slot that replaces the first subframe or slot for transmission of the message, receive, based on the determination, a downlink grant indicating a second subframe or slot that replaces the first subframe or slot for transmission of the message, drop a packet including the message based on the unavailability of the channel during the second subframe or slot, drop a packet including the message based on the second subframe or slot occurring after the next instance of the SPS transmission opportunity, receive an indication that the second subframe or slot has been scheduled for a downlink transmission, refrain from transmitting the message during the second subframe or slot based on the indication, and attempt to transmit the message on the channel during the second subframe or slot in accordance with the uplink grant. In some cases, performing the downlink SPS communications includes determining that a message was not received on a channel of the shared radio frequency spectrum during a first subframe or slot according to the SPS configuration. In some cases, receiving the downlink grant includes obtaining a NDI field of the downlink grant that is set based on an unavailability of the channel during the first subframe or slot. In some cases, receiving the downlink grant includes obtaining a new HARQ process assignment for the message based on an unavailability of the channel during the first subframe or slot. In some cases, the downlink grant includes an indication of an ACK/NACK resource associated with the message. In some cases, performing the uplink SPS communications includes determining that a message was not received at a base station on a channel of the shared radio frequency spectrum during a first subframe or slot according to the SPS configuration. In some cases, determining that the message was not received includes decoding a field of at least one of a PHICH, or a PDCCH, or a combination thereof, to determine that the message was not received at the base station. In some cases, determining that the message was not received includes determining that the channel is unavailable for transmission of the message during the first subframe or slot. In some cases, attempting to transmit the message during the second subframe or slot includes determining that the channel is unavailable during the second subframe or slot for transmitting the message. In some cases, attempting to transmit the message during the second subframe or slot includes determining, based on the uplink grant, that the second subframe or slot occurs after a next instance of an SPS transmission opportunity on the channel. In some cases, attempting to transmit the message during the second subframe or slot includes performing at least one of a CCA procedure or a LBT procedure on the channel prior to the second subframe or slot.

Grantless SPS manager 1340 may receive a grantless transmission of the message on the channel during the second subframe or slot, determine, based on the SPS configuration, a window size of the configured window, where the second subframe or slot is identified based on the determining, receive a configuration message indicating a window size associated with the configured window, the window size including a set of subframes or slots within the configured window, determine a transmission parameter associated with receiving the message during the first subframe or slot, where the grantless transmission is received based on the transmission parameter, transmit, based on receiving the message and in accordance with the SPS configuration, at least one of an ACK message using a first PRACH waveform or a NACK message using a second PRACH waveform, identify, based on the determination, a second subframe or slot that replaces the first subframe or slot for transmission of the message and a configured window within an SPS period, perform a grantless transmission of the message on the channel during the second subframe or slot, decode one or more bits of a DCI to receive an ACK/NACK indication associated with the grantless transmission of the message, descramble a group common DCI using an identifier associated with the UE and at least one additional UE, determine a window size associated with the configured window, where the second subframe or slot is identified based on the window size, and determine a transmission parameter associated with transmission of the message during the first subframe or slot, where the grantless transmission is performed based on the transmission parameter. In some cases, performing the downlink SPS communications includes determining that a message was not received on a channel of the shared radio frequency spectrum during a first subframe or slot according to the SPS configuration. In some cases, identifying the second subframe or slot includes performing at least one of a CCA procedure or a LBT procedure on the channel during a set of subframes or slots within the configured window, where the second subframe or slot is identified based on a result of the CCA or LBT procedure. In some cases, identifying the second subframe or slot includes decoding a set of consecutive subframes or slots within the configured window to detect the grantless transmission of the message. In some cases, the transmission parameter includes at least one MC to be used for reception of the message during the first subframe or slot, or a resource allocation scheme associated with the reception of the message during the first subframe or slot, or a combination thereof. In some cases, the transmission parameter includes at least one of a MCS to be used for transmission of the message during the first subframe or slot, or a resource allocation scheme associated with the transmission of the message during the first subframe or slot, or a combination thereof. In some cases, performing the uplink SPS communications includes determining that a message was not received at a base station on a channel of a shared radio frequency spectrum during a first subframe or slot according to an SPS configuration.

Trigger-based SPS manager 1345 may descramble a DC) of the control signal using an identifier associated with the SPS configuration to detect the SPS trigger, monitor a set of subframes or slots within a configured window within an SPS period to detect the SPS trigger, where the set of subframes or slots include the subframe or slot, decode a GC-PDCCH to detect the SPS trigger, receive a downlink message in the subframe or slot in accordance with the SPS trigger, determine a subframe or slot delay parameter associated with the SPS configuration, the subframe or slot delay parameter identifying a number of subframes or slots to delay transmission of the uplink message after the subframe or slot in which the SPS trigger is received, where the uplink message is transmitted in a subframe or slot in accordance with the subframe or slot delay parameter, identify a RV for the uplink message based on the SPS configuration, configure the uplink message to indicate the RV, and transmit an uplink message in the subframe or slot in accordance with the SPS trigger. In some cases, performing the downlink SPS communications includes detecting an SPS trigger in a control signal of a subframe or slot, the SPS trigger based on the SPS parameter. In some cases, the GC-PDCCH indicates the SPS trigger for the UE and for at least one additional UE. In some cases, the identifier includes a GC-SPS C-RNTI. In some cases, the at least one SPS parameter includes an SPS periodicity, or a number of HARQ processes associated with the SPS configuration, or a combination thereof. In some cases, the SPS configuration message does not identify the subframe or slot for the SPS transmission of the downlink message. In some cases, the GC-PDCCH indicates the SPS trigger for the UE and for at least one additional UE. In some cases, performing the uplink SPS communications includes detecting an SPS trigger in a control signal of a subframe or slot of the one or more subframes or slots, the SPS trigger based on the SPS parameter. In some cases, the identifier includes a GC-SPS C-RNTI. In some cases, the at least one SPS parameter includes an SPS periodicity, or a subframe or slot delay parameter associated with the SPS configuration, or a number of HARQ processes associated with the SPS configuration, or a combination thereof. In some cases, the SPS configuration message does not identify the subframe or slot for the SPS transmission of the downlink message.

Hybrid SPS manager 1350 may detect an SPS trigger in a control signal during the subframe or slot based on the determining, receive a message on the channel during the subframe or slot and in accordance with the SPS trigger, and transmit the message on the channel during the subframe or slot and in accordance with the SPS trigger. In some cases, performing the downlink SPS communications includes determining that no SPS packet was received at the one or more subframes or slots allocated for the downlink SPS communications, detecting an SPS trigger at a subsequent subframe or slot based on the determining, and receiving a message on the channel during the subsequent subframe or slot and in accordance with the SPS trigger.

Figure 14:
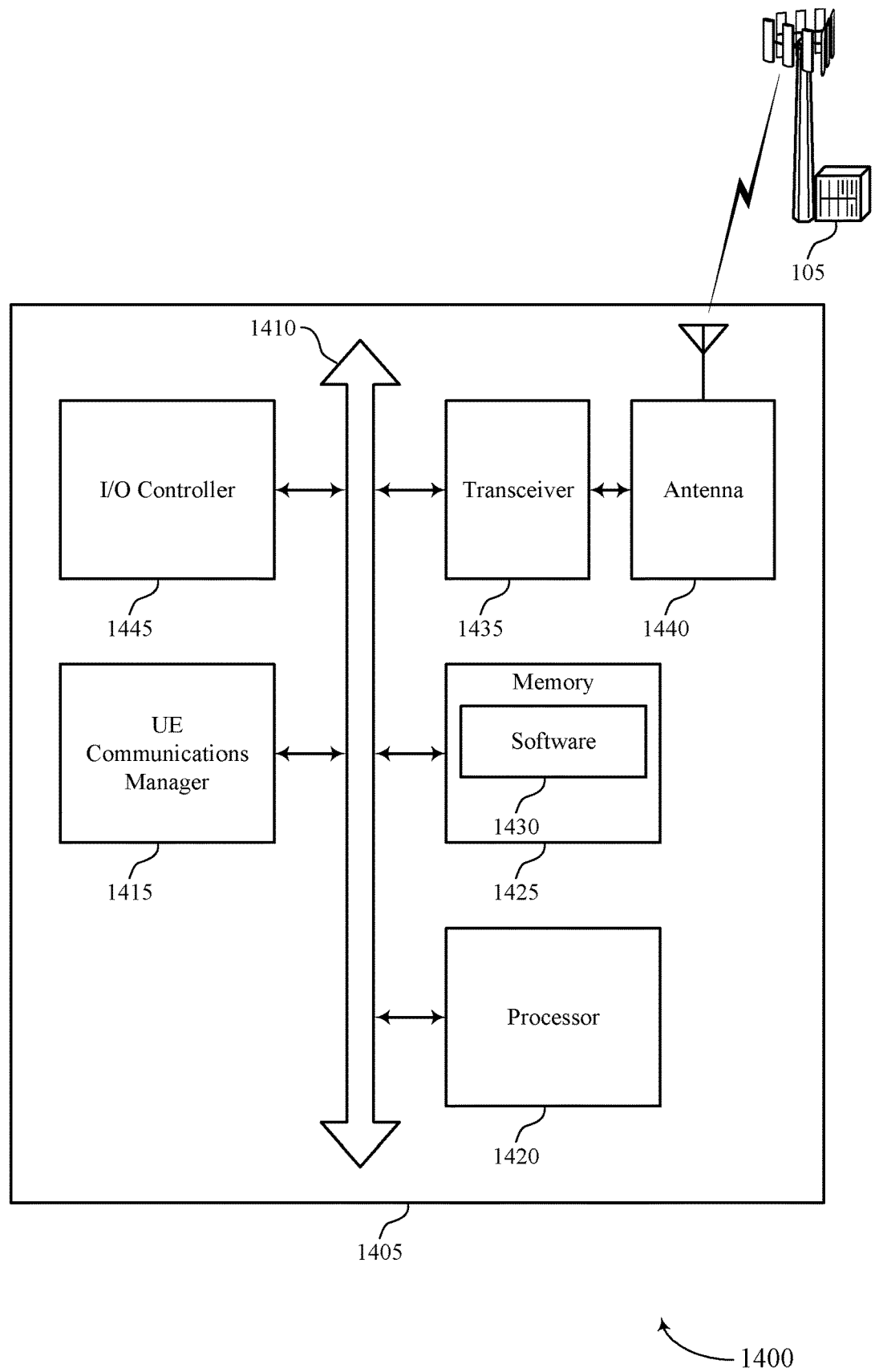
FIG. 14 illustrates a block diagram of a system including a UE that supports SPS for shared spectrum in accordance with aspects of the present disclosure.

FIG. 14 shows a diagram of a system 1400 including a device 1405 that supports SPS for shared spectrum in accordance with aspects of the present disclosure. Device 1405 may be an example of or include the components of wireless device 1105, wireless device 1205, or a UE 115 as described above, (e.g., with reference to FIGS. 11 and 12). Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting SPS for shared spectrum).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware or software operation such as the interaction with peripheral components or devices.

Software 1430 may include code to implement aspects of the present disclosure, including code to support SPS for shared spectrum. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
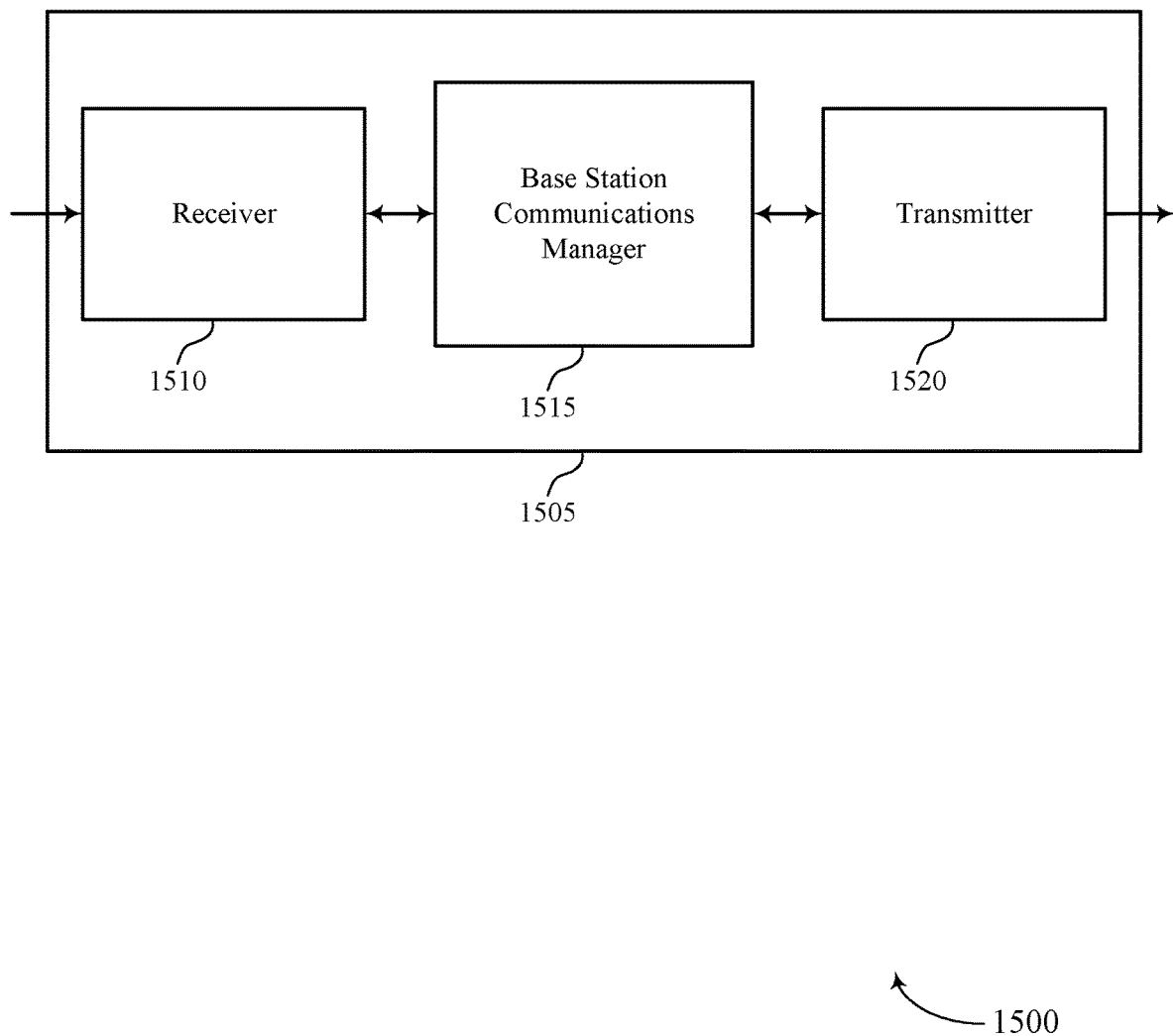
FIGS. 15 through 17 show block diagrams of a device that supports SPS for shared spectrum in accordance with aspects of the present disclosure.

FIG. 15 shows a block diagram 1500 of a wireless device 1505 that supports SPS for shared spectrum in accordance with aspects of the present disclosure. Wireless device 1505 may be an example of aspects of a base station 105 as described herein. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to SPS for shared spectrum, etc.). Information may be passed on to other components of the device. The receiver 1510 may be an example of aspects of the transceiver 1835 described with reference to FIG. 18. The receiver 1510 may utilize a single antenna or a set of antennas.

Base station communications manager 1515 may be an example of aspects of the base station communications manager 1815 described with reference to FIG. 18.

Base station communications manager 1515 and/or at least some of its various sub-components may be implemented in hardware, software executed by a processor, firmware, or any combination thereof. If implemented in software executed by a processor, the functions of the base station communications manager 1515 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1515 and/or at least some of its various sub-components may be physically located at various positions, including being distributed such that portions of functions are implemented at different physical locations by one or more physical devices. In some examples, base station communications manager 1515 and/or at least some of its various sub-components may be a separate and distinct component in accordance with various aspects of the present disclosure. In other examples, base station communications manager 1515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1515 may identify one or more UEs for performing downlink SPS communications over a shared radio frequency spectrum band, transmit an SPS configuration message to the one or more UEs that includes at least one SPS parameter for the downlink SPS communications over the shared radio frequency spectrum band, and perform the downlink SPS communications during one or more subframes or slots according to the SPS configuration. The base station communications manager 1515 may also identify one or more UEs for performing uplink SPS communications over a shared radio frequency spectrum band, transmit an SPS configuration message to the one or more UEs that includes at least one SPS parameter for the uplink SPS communications over the shared radio frequency spectrum band, and perform the uplink SPS communications during one or more subframes or slots according to the SPS configuration.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1835 described with reference to FIG. 18. The transmitter 1520 may utilize a single antenna or a set of antennas.

Figure 16:
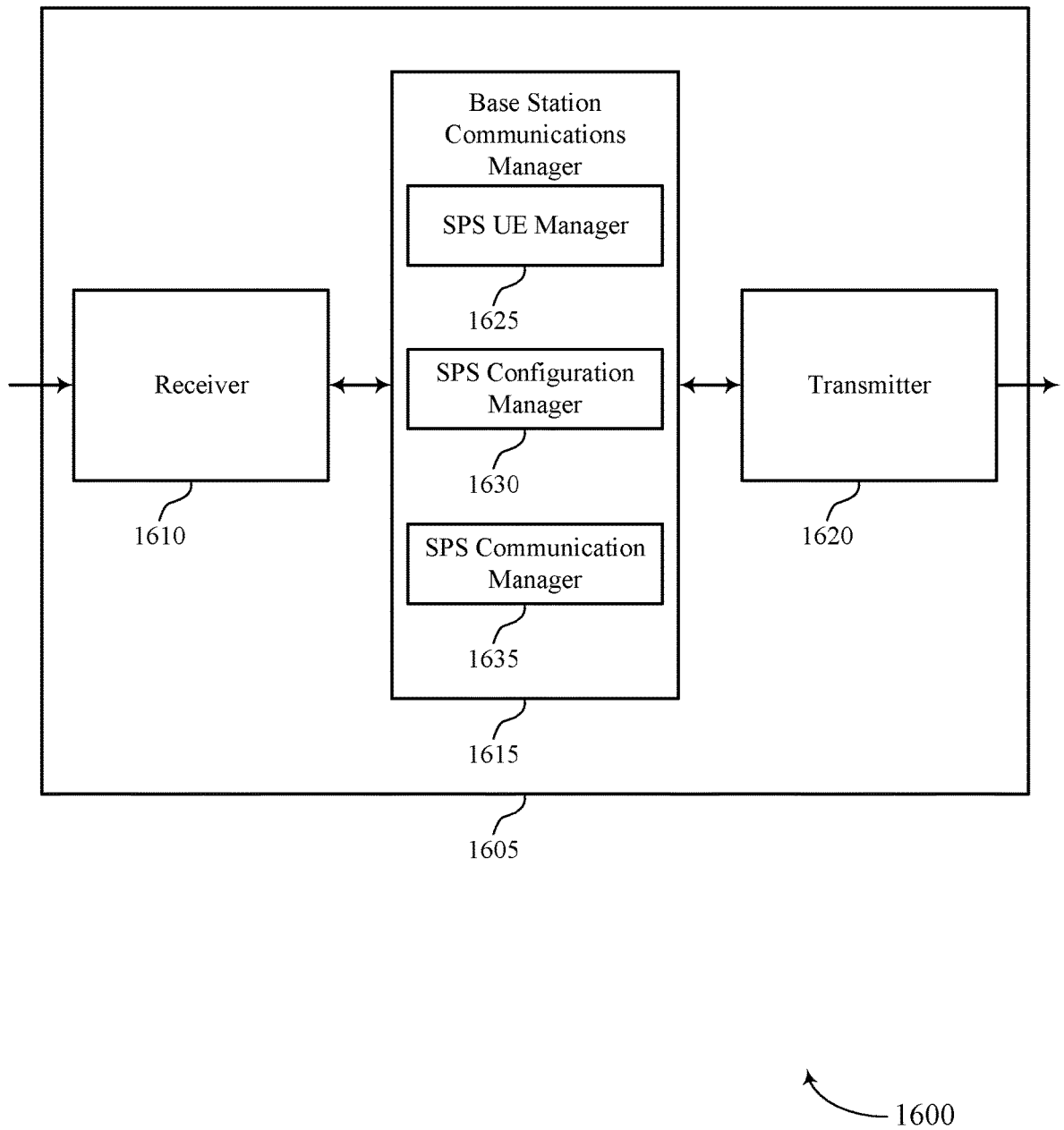

FIG. 16 shows a block diagram 1600 of a wireless device 1605 that supports SPS for shared spectrum in accordance with aspects of the present disclosure. Wireless device 1605 may be an example of aspects of a wireless device 1505 or a base station 105 as described with reference to FIG. 15. Wireless device 1605 may include receiver 1610, base station communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to SPS for shared spectrum, etc.). Information may be passed on to other components of the device. The receiver 1610 may be an example of aspects of the transceiver 1835 described with reference to FIG. 18. The receiver 1610 may utilize a single antenna or a set of antennas.

Base station communications manager 1615 may be an example of aspects of the base station communications manager 1815 described with reference to FIG. 18.

Base station communications manager 1615 may also include SPS UE manager 1625, SPS configuration manager 1630, and SPS communication manager 1635.

SPS UE manager 1625 may identify one or more UEs for performing downlink SPS communications over a shared radio frequency spectrum band and identify one or more UEs for performing uplink SPS communications over a shared radio frequency spectrum band.

SPS configuration manager 1630 may transmit an SPS configuration message to the one or more UEs that includes at least one SPS parameter for the downlink SPS communications over the shared radio frequency spectrum band and transmit an SPS configuration message to the one or more UEs that includes at least one SPS parameter for the uplink SPS communications over the shared radio frequency spectrum band.

SPS communication manager 1635 may perform the downlink SPS communications during one or more subframes or slots according to the SPS configuration and perform the uplink SPS communications during one or more subframes or slots according to the SPS configuration.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1835 described with reference to FIG. 18. The transmitter 1620 may utilize a single antenna or a set of antennas.

Figure 17:
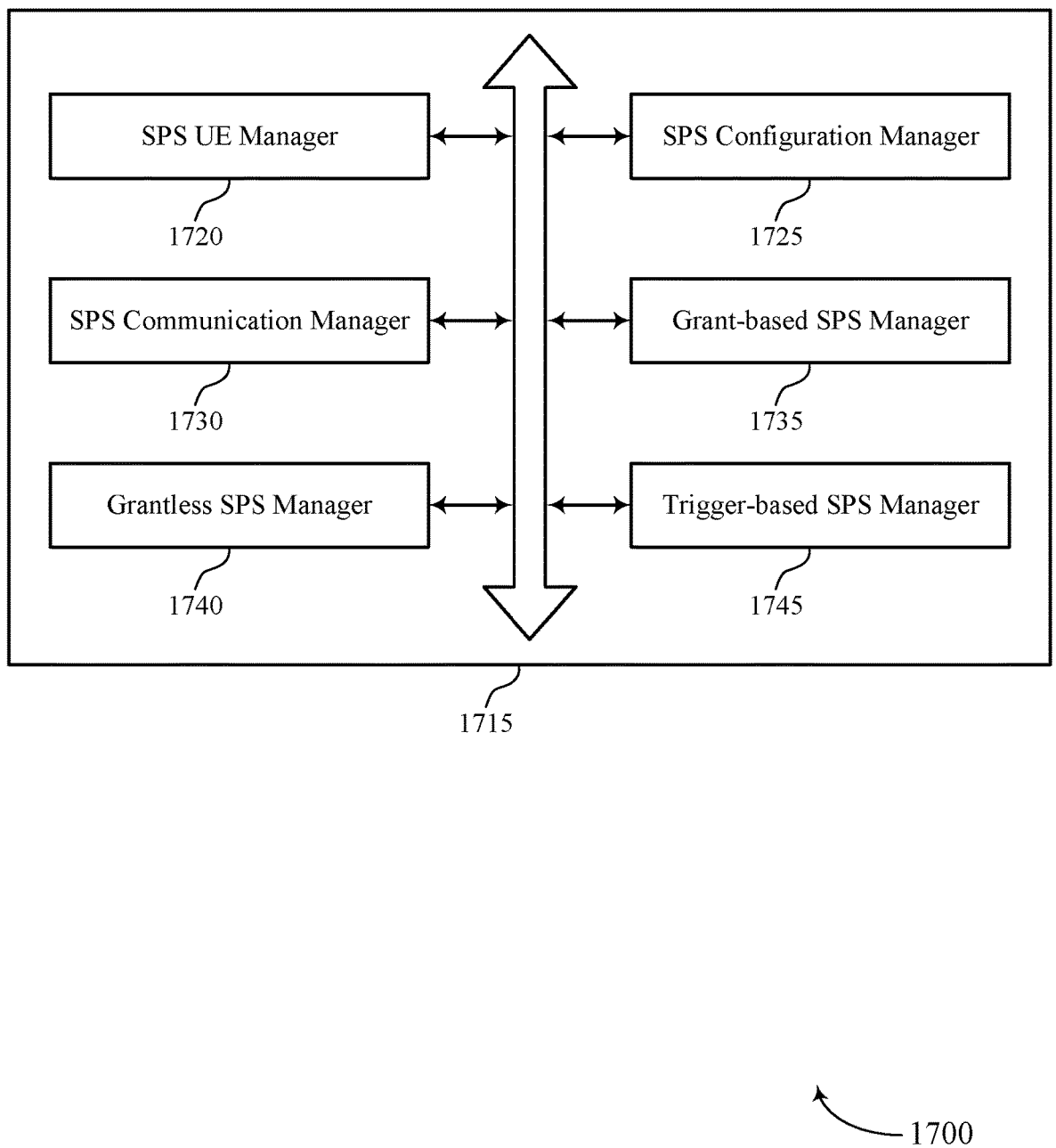

FIG. 17 shows a block diagram 1700 of a base station communications manager 1715 that supports SPS for shared spectrum in accordance with aspects of the present disclosure. The base station communications manager 1715 may be an example of aspects of a base station communications manager 1815 described with reference to FIGS. 15, 16, and 18. The base station communications manager 1715 may include SPS UE manager 1720, SPS configuration manager 1725, SPS communication manager 1730, grant-based SPS manager 1735, grantless SPS manager 1740, and trigger-based SPS manager 1745. Each of these modules may communicate, directly or indirectly, with one another (e.g., via one or more buses).

SPS UE manager 1720 may identify one or more UEs for performing downlink SPS communications over a shared radio frequency spectrum band and identify one or more UEs for performing uplink SPS communications over a shared radio frequency spectrum band.

SPS configuration manager 1725 may transmit an SPS configuration message to the one or more UEs that includes at least one SPS parameter for the downlink SPS communications over the shared radio frequency spectrum band and may transmit an SPS configuration message to the one or more UEs that includes at least one SPS parameter for the uplink SPS communications over the shared radio frequency spectrum band.

SPS communication manager 1730 may perform the downlink SPS communications during one or more subframes or slots according to the SPS configuration and perform the uplink SPS communications during one or more subframes or slots according to the SPS configuration.

Grant-based SPS manager 1735 may assign a new HARQ process assignment for the message based on the message not being received, attempt to transmit the message on the channel during the second subframe or slot in accordance with the downlink grant, set a NDI field of the downlink grant based on the unavailability of the channel, assign the message to a new HARQ process based on the unavailability of the channel during the second subframe or slot, transmit a configuration message indicating a set of possible PUCCH resources for ACK/NACK transmissions, where the indication of the ACK/NACK resource in the downlink grant identifies one of the possible PUCCH resources, transmit a downlink grant based on the unavailability of the channel, the downlink grant indicating a second subframe or slot that replaces the first subframe or slot for transmission of the message, transmit the message on the channel during the second subframe or slot based on a result of the CCA, transmit an uplink grant based on the determination, the uplink grant indicating a second subframe or slot that replaces the first subframe or slot for transmission of the message, receive the message on the channel during the second subframe or slot in accordance with the uplink grant, encode a field of a PHICH to indicate that the message was not received, determine that the channel is unavailable for transmission of an ACK/NACK message during a third subframe or slot according to the downlink grant, drop the ACK/NACK message based on the channel being unavailable, and drop a packet including the message based on the unavailability of the channel during the second subframe or slot. In some cases, performing the downlink SPS communications includes determining that a channel of the shared radio frequency spectrum is unavailable for a transmission of a message during a first subframe or slot according to the SPS configuration. In some cases, attempting to transmit the message on the channel during the second subframe or slot includes determining that the channel is unavailable during the second subframe or slot for transmitting the message. In some cases, the downlink grant includes an indication of an ACK/NACK resource associated with the message. In some cases, attempting to transmit the message on the channel during the second subframe or slot includes determining that the channel is unavailable during the second subframe or slot for transmitting the message. In some cases, attempting to transmit the message on the channel during the second subframe or slot includes performing a CCA on the channel prior to the second subframe or slot. In some cases, performing the uplink SPS communications includes determining that a transmission of a message was not received on a channel of the shared radio frequency spectrum during a first subframe or slot according to the SPS configuration.

Grantless SPS manager 1740 may transmit a configuration message indicating a window size associated with the configured window, the window size including a set of subframes or slots within the configured window, perform a grantless transmission of the message on the channel during the selected second subframe or slot, determine a window size associated with the configured window, where the second subframe or slot is selected based on the window size, determine a transmission parameter associated with transmission of the message during the first subframe or slot, where the grantless transmission is performed based on the transmission parameter, identify a first PRACH waveform to use for ACK messages transmitted in accordance with the SPS configuration, identify a second PRACH waveform to use for NACK messages transmitted in accordance with the SPS configuration, determine that a defined number of UE are associated with active SPS processes, select a second subframe or slot that replaces the first subframe or slot based on the unavailability of the channel and a configured window within an SPS period, select a second subframe or slot that replaces the first subframe or slot based on the determining and the SPS configuration, receive a grantless transmission of the message on the channel during the selected second subframe or slot, transmit a configuration message identifying resources associated to be used for grantless uplink transmissions, where the grantless transmission is received using at least a portion of the identified resources, set one or more bits of a DCI to provide an ACK/NACK indication associated with receiving the grantless transmission of the message, transmit the DCI in a signal during a third subframe or slot on the channel, scramble a group common DCI using an identifier associated with a set of UE, and select an SPS periodicity of the SPS configuration based on the determining. In some cases, performing the downlink SPS communications includes determining that a channel of the shared radio frequency spectrum is unavailable for a transmission of a message during a first subframe or slot according to the SPS configuration. In some cases, the transmission parameter includes at least one of: a MCS to be used for transmission of the message during the first subframe or slot, or a resource allocation scheme associated with the transmission of the message during the first subframe or slot, or a combination thereof. In some cases, performing the uplink SPS communications includes: determining that a transmission of a message was not received on a channel of the shared radio frequency spectrum during a first subframe or slot according to the SPS configuration. In some cases, the identified resources are available for a set of the one or more UEs to use for grantless uplink transmissions.

Trigger-based SPS manager 1745 may transmit the downlink message to the UE during the subframe or slot in accordance with the SPS trigger, configure a GC-PDCCH to indicate the SPS trigger for the UE, configure one or more bits in the GC-PDCCH to indicate the SPS trigger for the UE and at least one additional UE, scramble a DCI of the control signal using an identifier associated with the SPS configuration to indicate the SPS trigger, transmit a control signal during the subframe or slot, the control signal including an SPS trigger based on the SPS parameter for the UE, and receive the uplink message from the UE during the subframe or slot in accordance with the SPS trigger. In some cases, performing the downlink SPS communications includes selecting a subframe or slot for an SPS transmission of a downlink message to a UE of the one or more UEs. In some cases, the identifier includes a GC-SPS C-RNTI. In some cases, the at least one SPS parameter includes an SPS periodicity, or a number of HARQ processes associated with the SPS configuration, or a combination thereof. In some cases, the SPS configuration message does not identify the subframe or slot for the SPS transmission of the downlink message. In some cases, the identifier includes a GC-SPS C-RNTI. In some cases, the at least one SPS parameter includes an SPS periodicity, or a subframe or slot delay parameter associated with the SPS configuration, or a number of HARQ processes associated with the SPS configuration, or a combination thereof. In some cases, the SPS configuration message does not identify the subframe or slot for the SPS transmission of the uplink message. In some cases, performing the uplink SPS communications includes selecting a subframe or slot for an SPS transmission of an uplink message from a UE of the one or more UEs.

Figure 18:
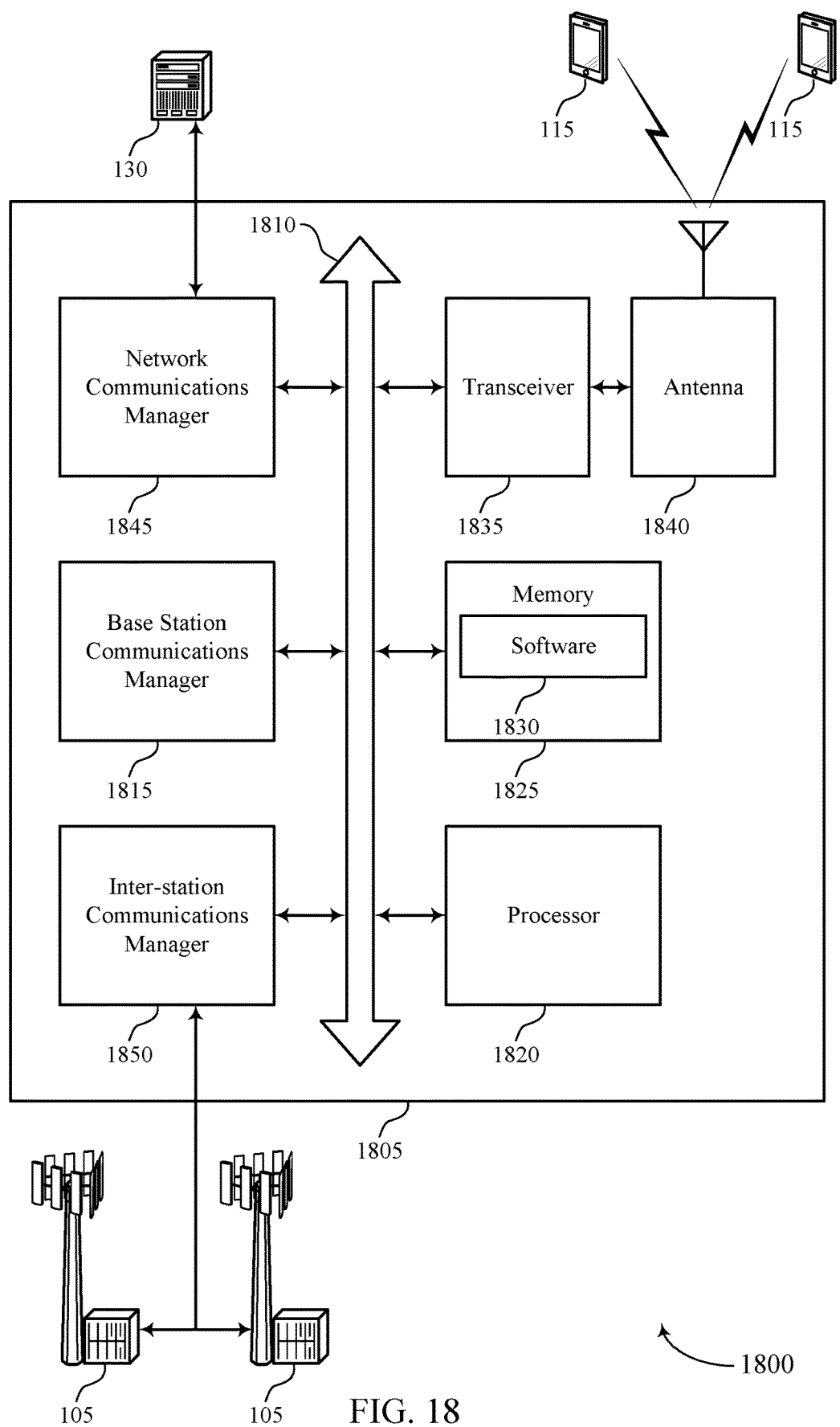
FIG. 18 illustrates a block diagram of a system including a base station that supports SPS for shared spectrum in accordance with aspects of the present disclosure.

FIG. 18 shows a diagram of a system 1800 including a device 1805 that supports SPS for shared spectrum in accordance with aspects of the present disclosure. Device 1805 may be an example of or include the components of base station 105 as described above, (e.g., with reference to FIG. 1). Device 1805 may include components for bi-directional voice and data communications including components for transmitting and receiving communications, including base station communications manager 1815, processor 1820, memory 1825, software 1830, transceiver 1835, antenna 1840, network communications manager 1845, and inter-station communications manager 1850. These components may be in electronic communication via one or more buses (e.g., bus 1810). Device 1805 may communicate wirelessly with one or more UEs 115.

Processor 1820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting SPS for shared spectrum).

Memory 1825 may include RAM and ROM. The memory 1825 may store computer-readable, computer-executable software 1830 including instructions that, when executed, cause the processor to perform various functions described herein. In some cases, the memory 1825 may contain, among other things, a BIOS which may control basic hardware or software operation such as the interaction with peripheral components or devices.

Software 1830 may include code to implement aspects of the present disclosure, including code to support SPS for shared spectrum. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

In some cases, the wireless device may include a single antenna 1840. However, in some cases the device may have more than one antenna 1840, which may be capable of concurrently transmitting or receiving multiple wireless transmissions.

Network communications manager 1845 may manage communications with the core network (e.g., via one or more wired backhaul links). For example, the network communications manager 1845 may manage the transfer of data communications for client devices, such as one or more UEs 115.

Inter-station communications manager 1850 may manage communications with other base station 105, and may include a controller or scheduler for controlling communications with UEs 115 in cooperation with other base stations 105. For example, the inter-station communications manager 1850 may coordinate scheduling for transmissions to UEs 115 for various interference mitigation techniques such as beamforming or joint transmission. In some examples, inter-station communications manager 1850 may provide an X2 interface within an LTE/LTE-A wireless communication network technology to provide communication between base stations 105.

Figure 19:
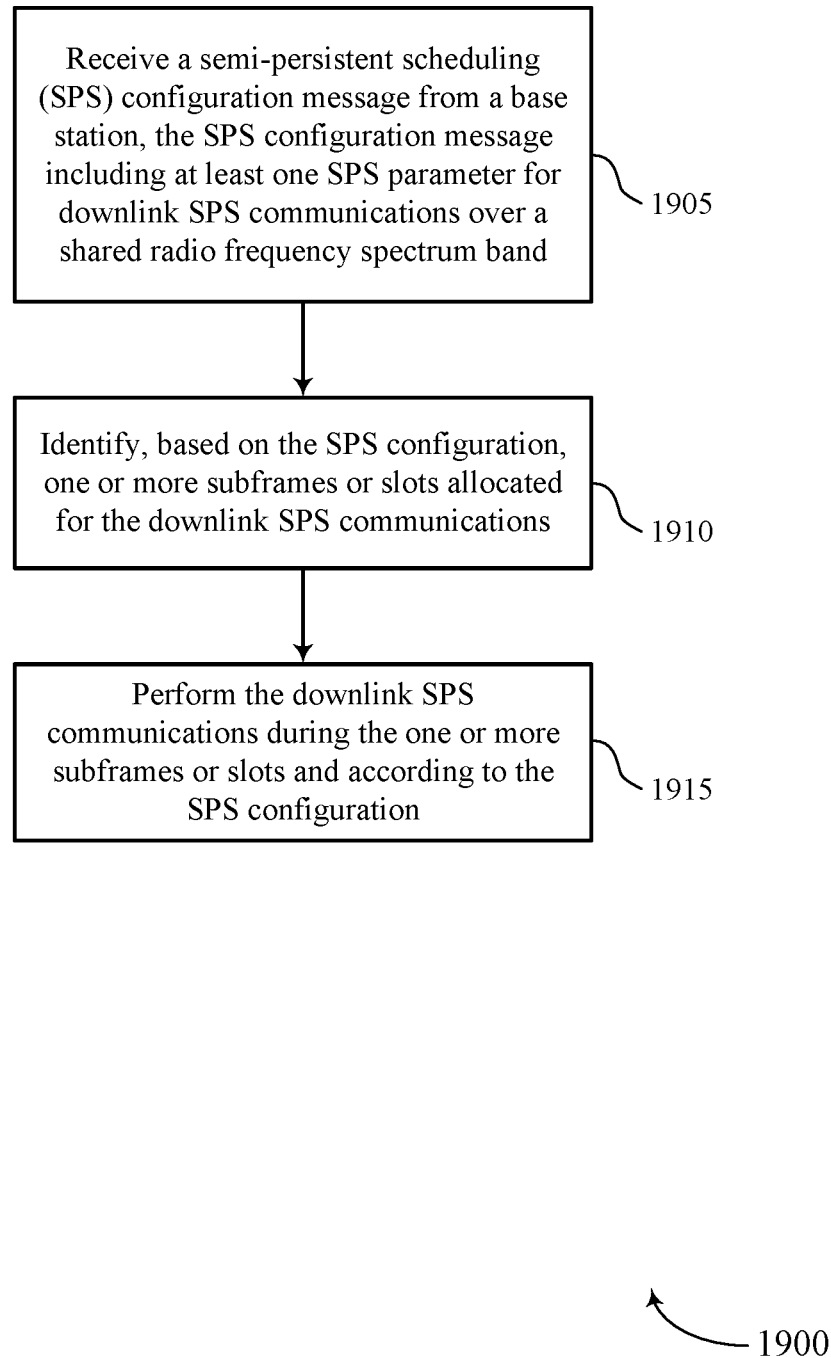
FIGS. 19 through 26 illustrate methods for SPS for shared spectrum in accordance with aspects of the present disclosure.

FIG. 19 shows a flowchart illustrating a method 1900 for SPS for shared spectrum in accordance with aspects of the present disclosure. The operations of method 1900 may be implemented by a UE 115 or its components as described herein. For example, the operations of method 1900 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may receive an SPS configuration message from a base station, the SPS configuration message containing at least one SPS parameter for downlink SPS communications over a shared radio frequency spectrum band. The operations of 1905 may be performed according to the methods described herein. In certain examples, aspects of the operations of 1905 may be performed by an SPS configuration manager as described with reference to FIGS. 11 through 14.

At 1910 the UE 115 may identify, based on the SPS configuration, one or more subframes or slots allocated for the downlink SPS communications. The operations of 1910 may be performed according to the methods described herein. In certain examples, aspects of the operations of 1910 may be performed by an SPS subframe or slot manager as described with reference to FIGS. 11 through 14.

At 1915 the UE 115 may perform the downlink SPS communications during the one or more subframes or slots and according to the SPS configuration. The operations of 1915 may be performed according to the methods described herein. In certain examples, aspects of the operations of 1915 may be performed by an SPS communication manager as described with reference to FIGS. 11 through 14.

Figure 20:
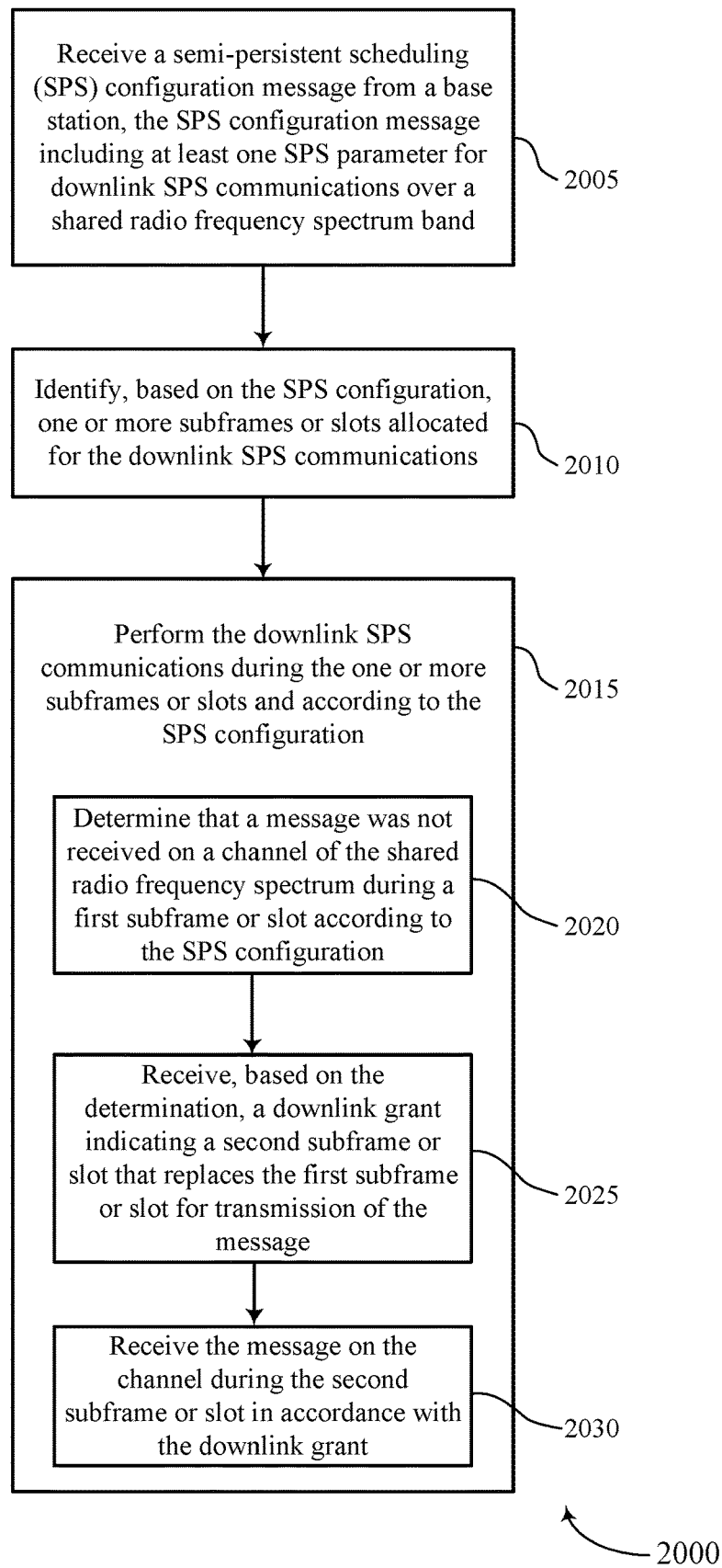

FIG. 20 shows a flowchart illustrating a method 2000 for SPS for shared spectrum in accordance with aspects of the present disclosure. The operations of method 2000 may be implemented by a UE 115 or its components as described herein. For example, the operations of method 2000 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may receive an SPS configuration message from a base station, the SPS configuration message containing at least one SPS parameter for downlink SPS communications over a shared radio frequency spectrum band. The operations of 2005 may be performed according to the methods described herein. In certain examples, aspects of the operations of 2005 may be performed by an SPS configuration manager as described with reference to FIGS. 11 through 14.

At 2010 the UE 115 may identify, based on the SPS configuration, one or more subframes or slots allocated for the downlink SPS communications. The operations of 2010 may be performed according to the methods described herein. In certain examples, aspects of the operations of 2010 may be performed by an SPS subframe or slot manager as described with reference to FIGS. 11 through 14.

At 2015 the UE 115 may perform the downlink SPS communications during the one or more subframes or slots and according to the SPS configuration. The operations of 2015 may be performed according to the methods described herein. In certain examples, aspects of the operations of 2015 may be performed by an SPS communication manager as described with reference to FIGS. 11 through 14.

At 2020 the UE 115 may determine that a message was not received on a channel of the shared radio frequency spectrum during a first subframe or slot according to the SPS configuration. The operations of 2020 may be performed according to the methods described herein. In certain examples, aspects of the operations of 2020 may be performed by an SPS communication manager as described with reference to FIGS. 11 through 14.

At 2025 the UE 115 may receive, based on the determination, a downlink grant indicating a second subframe or slot that replaces the first subframe or slot for transmission of the message. The operations of 2025 may be performed according to the methods described herein. In certain examples, aspects of the operations of 2025 may be performed by a grant-based SPS manager as described with reference to FIGS. 11 through 14.

At 2030 the UE 115 may receive the message on the channel during the second subframe or slot in accordance with the downlink grant. The operations of 2030 may be performed according to the methods described herein. In certain examples, aspects of the operations of 2030 may be performed by a grant-based SPS manager as described with reference to FIGS. 11 through 14.

Figure 21:
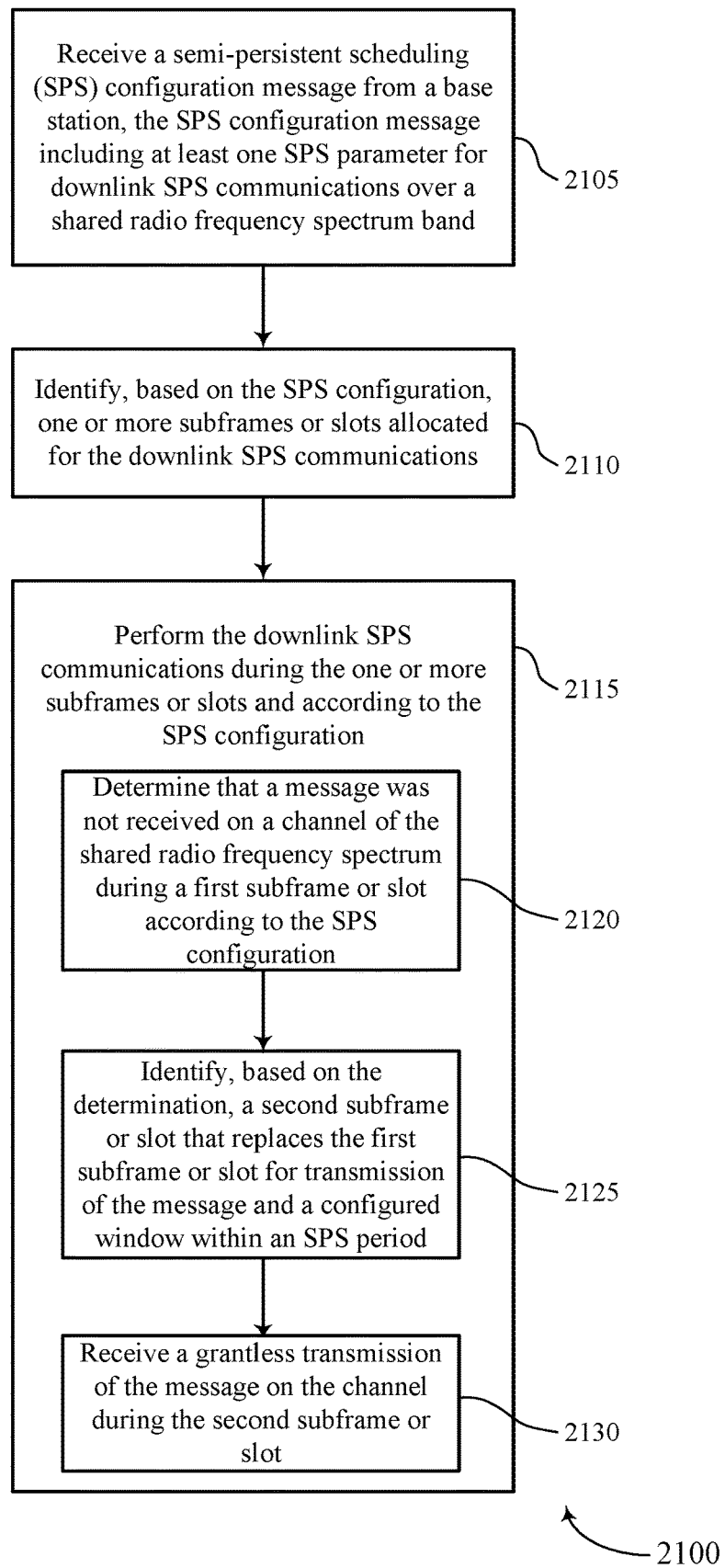

FIG. 21 shows a flowchart illustrating a method 2100 for SPS for shared spectrum in accordance with aspects of the present disclosure. The operations of method 2100 may be implemented by a UE 115 or its components as described herein. For example, the operations of method 2100 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may receive an SPS configuration message from a base station, the SPS configuration message containing at least one SPS parameter for downlink SPS communications over a shared radio frequency spectrum band. The operations of 2105 may be performed according to the methods described herein. In certain examples, aspects of the operations of 2105 may be performed by an SPS configuration manager as described with reference to FIGS. 11 through 14.

At 2110 the UE 115 may identify, based on the SPS configuration, one or more subframes or slots allocated for the downlink SPS communications. The operations of 2110 may be performed according to the methods described herein. In certain examples, aspects of the operations of 2110 may be performed by an SPS subframe or slot manager as described with reference to FIGS. 11 through 14.

At 2115 the UE 115 may perform the downlink SPS communications during the one or more subframes or slots and according to the SPS configuration. The operations of 2115 may be performed according to the methods described herein. In certain examples, aspects of the operations of 2115 may be performed by an SPS communication manager as described with reference to FIGS. 11 through 14.

At 2120, as part of performing the downlink SPS communications during the one or more subframes or slots and according to the SPS configuration, the UE 115 may determine that a message was not received on a channel of the shared radio frequency spectrum during a first subframe or slot according to the SPS configuration. The operations of 2120 may be performed according to the methods described herein. In certain examples, aspects of the operations of 2120 may be performed by a grantless SPS manager as described with reference to FIGS. 11 through 14.

At 2125, as part of performing the downlink SPS communications during the one or more subframes or slots and according to the SPS configuration, the UE 115 may identify, based on the determination, a second subframe or slot that replaces the first subframe or slot for transmission of the message and a configured window within an SPS period. The operations of 2125 may be performed according to the methods described herein. In certain examples, aspects of the operations of 2125 may be performed by a grantless SPS manager as described with reference to FIGS. 11 through 14.

At 2130, as part of performing the downlink SPS communications during the one or more subframes or slots and according to the SPS configuration, the UE 115 may receive a grantless transmission of the message on the channel during the second subframe or slot. The operations of 2130 may be performed according to the methods described herein. In certain examples, aspects of the operations of 2130 may be performed by a grantless SPS manager as described with reference to FIGS. 11 through 14.

Figure 22:
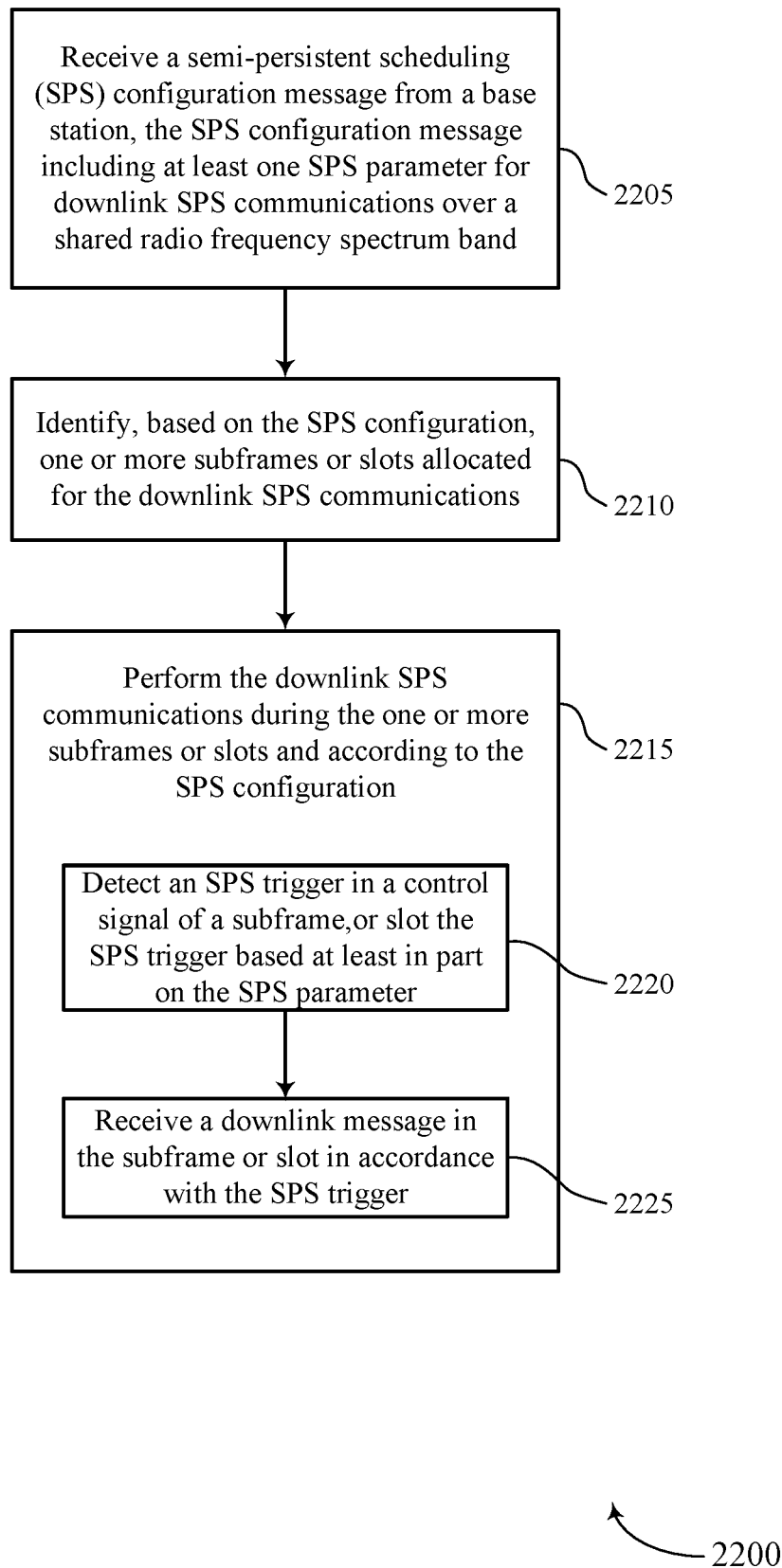

FIG. 22 shows a flowchart illustrating a method 2200 for SPS for shared spectrum in accordance with aspects of the present disclosure. The operations of method 2200 may be implemented by a UE 115 or its components as described herein. For example, the operations of method 2200 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 2205 the UE 115 may receive an SPS configuration message from a base station, the SPS configuration message containing at least one SPS parameter for downlink SPS communications over a shared radio frequency spectrum band. The operations of 2205 may be performed according to the methods described herein. In certain examples, aspects of the operations of 2205 may be performed by an SPS configuration manager as described with reference to FIGS. 11 through 14.

At 2210 the UE 115 may identify, based on the SPS configuration, one or more subframes or slots allocated for the downlink SPS communications. The operations of 2210 may be performed according to the methods described herein. In certain examples, aspects of the operations of 2210 may be performed by an SPS subframe or slot manager as described with reference to FIGS. 11 through 14.

At 2215, as part of performing the downlink SPS communications during the one or more subframes or slots and according to the SPS configuration, the UE 115 may perform the downlink SPS communications during the one or more subframes or slots and according to the SPS configuration. The operations of 2215 may be performed according to the methods described herein. In certain examples, aspects of the operations of 2215 may be performed by an SPS communication manager as described with reference to FIGS. 11 through 14.

At 2220, as part of performing the downlink SPS communications during the one or more subframes or slots and according to the SPS configuration, the UE 115 may detect an SPS trigger in a control signal of a subframe or slot, the SPS trigger based on the SPS parameter. The operations of 2220 may be performed according to the methods described herein. In certain examples, aspects of the operations of 2220 may be performed by a trigger-based SPS manager as described with reference to FIGS. 11 through 14.

At 2225, as part of performing the downlink SPS communications during the one or more subframes or slots and according to the SPS configuration, the UE 115 may receive a downlink message in the subframe or slot in accordance with the SPS trigger. The operations of 2225 may be performed according to the methods described herein. In certain examples, aspects of the operations of 2225 may be performed by a trigger-based SPS manager as described with reference to FIGS. 11 through 14.

Figure 23:
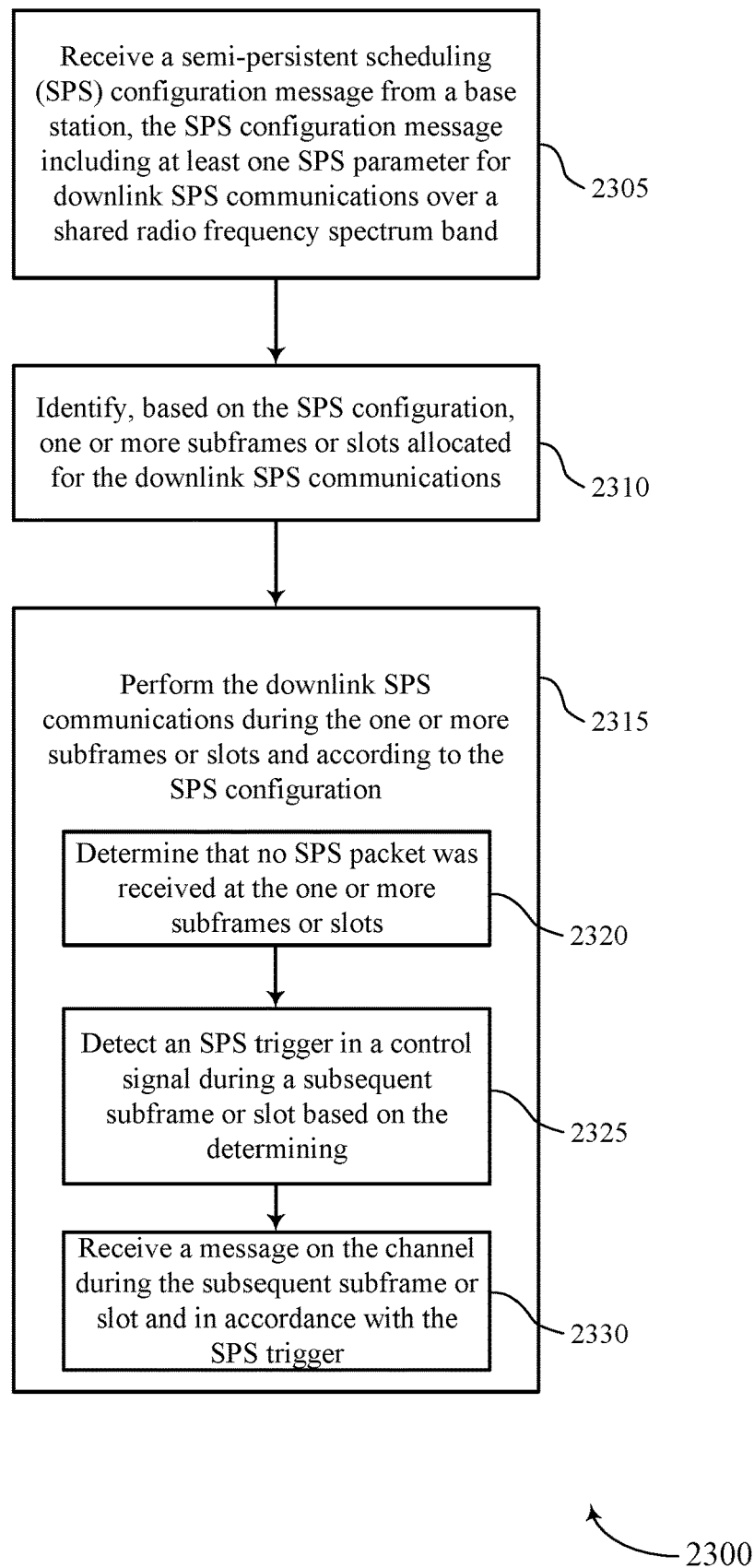

FIG. 23 shows a flowchart illustrating a method 2300 for SPS for shared spectrum in accordance with aspects of the present disclosure. The operations of method 2300 may be implemented by a UE 115 or its components as described herein. For example, the operations of method 2300 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 2305 the UE 115 may receive an SPS configuration message from a base station, the SPS configuration message containing at least one SPS parameter for downlink SPS communications over a shared radio frequency spectrum band. The operations of 2305 may be performed according to the methods described herein. In certain examples, aspects of the operations of 2305 may be performed by an SPS configuration manager as described with reference to FIGS. 11 through 14.

At 2310 the UE 115 may identify, based on the SPS configuration, one or more subframes or slots allocated for the downlink SPS communications. The operations of 2310 may be performed according to the methods described herein. In certain examples, aspects of the operations of 2310 may be performed by an SPS subframe or slot manager as described with reference to FIGS. 11 through 14.

At 2315 the UE 115 may perform the downlink SPS communications during the one or more subframes or slots and according to the SPS configuration. The operations of 2315 may be performed according to the methods described herein. In certain examples, aspects of the operations of 2315 may be performed by an SPS communication manager as described with reference to FIGS. 11 through 14.

At 2320, as part of performing the downlink SPS communications during the one or more subframes or slots and according to the SPS configuration, the UE 115 may determine that no SPS packet was received at the one or more subframes of slots allocated for the downlink SPS communications. The operations of 2320 may be performed according to the methods described herein. In certain examples, aspects of the operations of 2320 may be performed by a hybrid SPS manager as described with reference to FIGS. 11 through 14.

At 2325, as part of performing the downlink SPS communications during the one or more subframes or slots and according to the SPS configuration, the UE 115 may detect an SPS trigger in a control signal during a subsequent subframe or slot based on the determining. The operations of 2325 may be performed according to the methods described herein. In certain examples, aspects of the operations of 2325 may be performed by a hybrid SPS manager as described with reference to FIGS. 11 through 14.

At 2330, as part of performing the downlink SPS communications during the one or more subframes or slots and according to the SPS configuration, the UE 115 may receive a message on the channel during the subsequent subframe or slot and in accordance with the SPS trigger. The operations of 2330 may be performed according to the methods described herein. In certain examples, aspects of the operations of 2330 may be performed by a hybrid SPS manager as described with reference to FIGS. 11 through 14.

Figure 24:
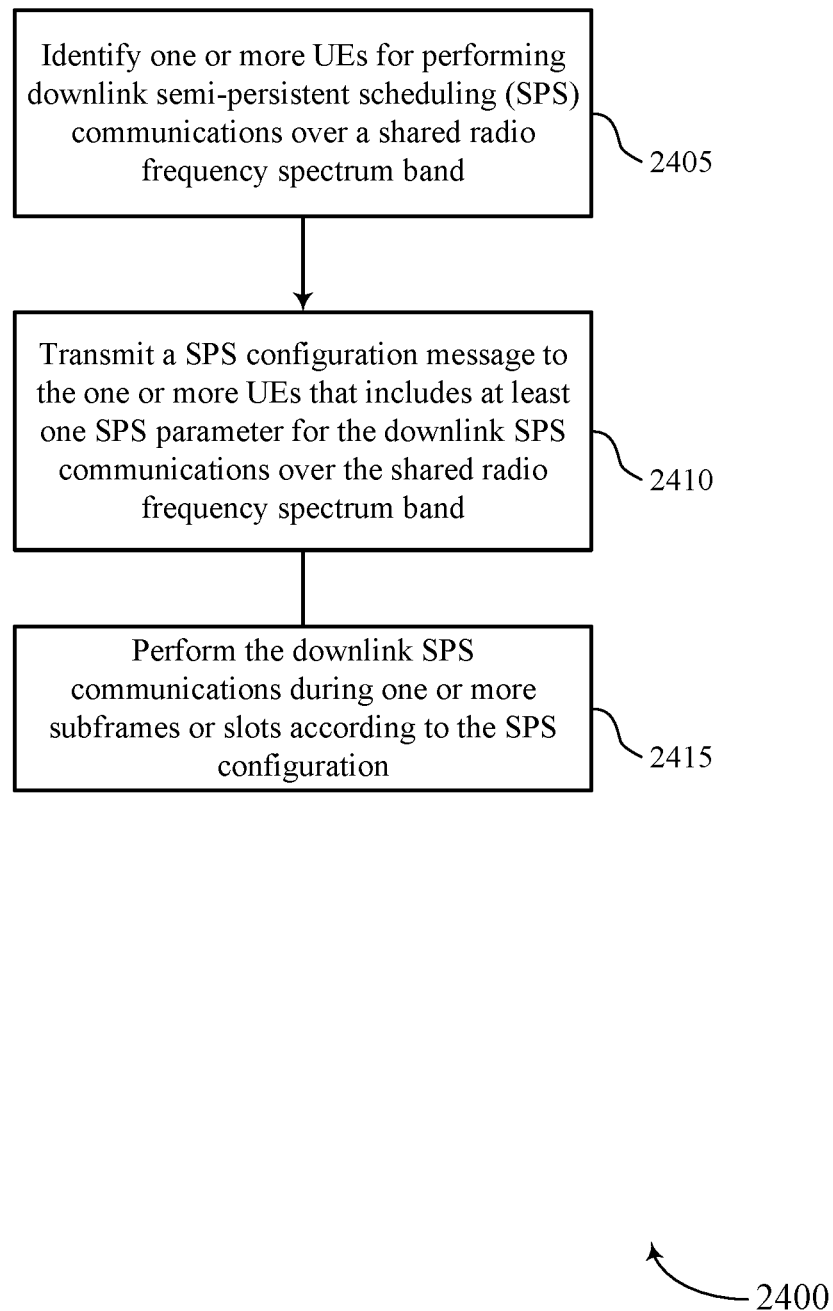

FIG. 24 shows a flowchart illustrating a method 2400 for SPS for shared spectrum in accordance with aspects of the present disclosure. The operations of method 2400 may be implemented by a base station 105 or its components as described herein. For example, the operations of method 2400 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At 2405 the base station 105 may identify one or more UEs for performing downlink SPS communications over a shared radio frequency spectrum band. The operations of 2405 may be performed according to the methods described herein. In certain examples, aspects of the operations of 2405 may be performed by an SPS UE manager as described with reference to FIGS. 15 through 18.

At 2410 the base station 105 may transmit an SPS configuration message to the one or more UEs that contains at least one SPS parameter for the downlink SPS communications over the shared radio frequency spectrum band. The operations of 2410 may be performed according to the methods described herein. In certain examples, aspects of the operations of 2410 may be performed by an SPS configuration manager as described with reference to FIGS. 15 through 18.

At 2415 the base station 105 may perform the downlink SPS communications during one or more subframes or slots according to the SPS configuration. The operations of 2415 may be performed according to the methods described herein. In certain examples, aspects of the operations of 2415 may be performed by an SPS communication manager as described with reference to FIGS. 15 through 18.

Figure 25:
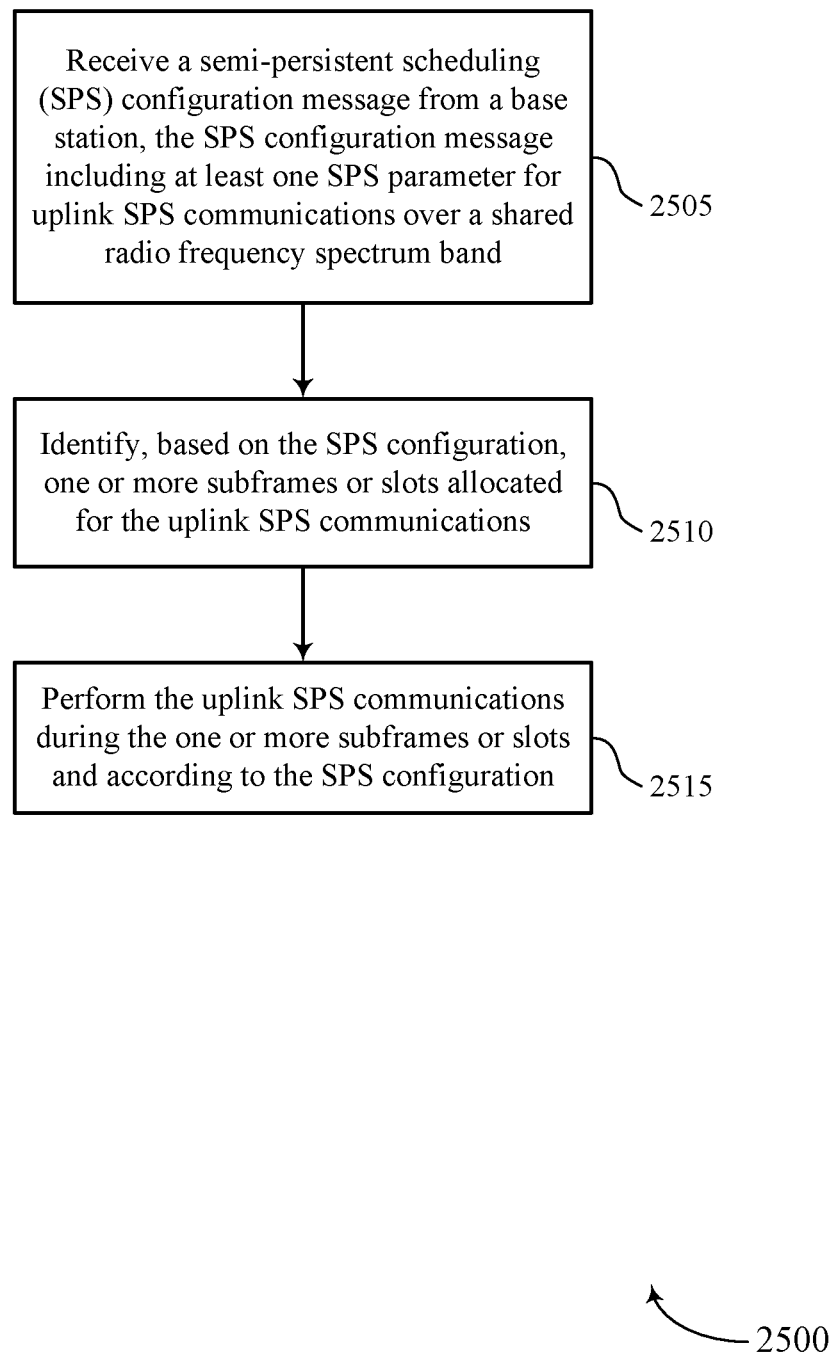

FIG. 25 shows a flowchart illustrating a method 2500 for SPS for shared spectrum in accordance with aspects of the present disclosure. The operations of method 2500 may be implemented by a UE 115 or its components as described herein. For example, the operations of method 2500 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 2505 the UE 115 may receive an SPS configuration message from a base station, the SPS configuration message containing at least one SPS parameter for uplink SPS communications over a shared radio frequency spectrum band. The operations of 2505 may be performed according to the methods described herein. In certain examples, aspects of the operations of 2505 may be performed by an SPS configuration manager as described with reference to FIGS. 11 through 14.

At 2510 the UE 115 may identify, based on the SPS configuration, one or more subframes or slots allocated for the uplink SPS communications. The operations of 2510 may be performed according to the methods described herein. In certain examples, aspects of the operations of 2510 may be performed by an SPS subframe or slot manager as described with reference to FIGS. 11 through 14.

At 2515 the UE 115 may perform the uplink SPS communications during the one or more subframes or slots and according to the SPS configuration. The operations of 2515 may be performed according to the methods described herein. In certain examples, aspects of the operations of 2515 may be performed by an SPS communication manager as described with reference to FIGS. 11 through 14.

Figure 26:
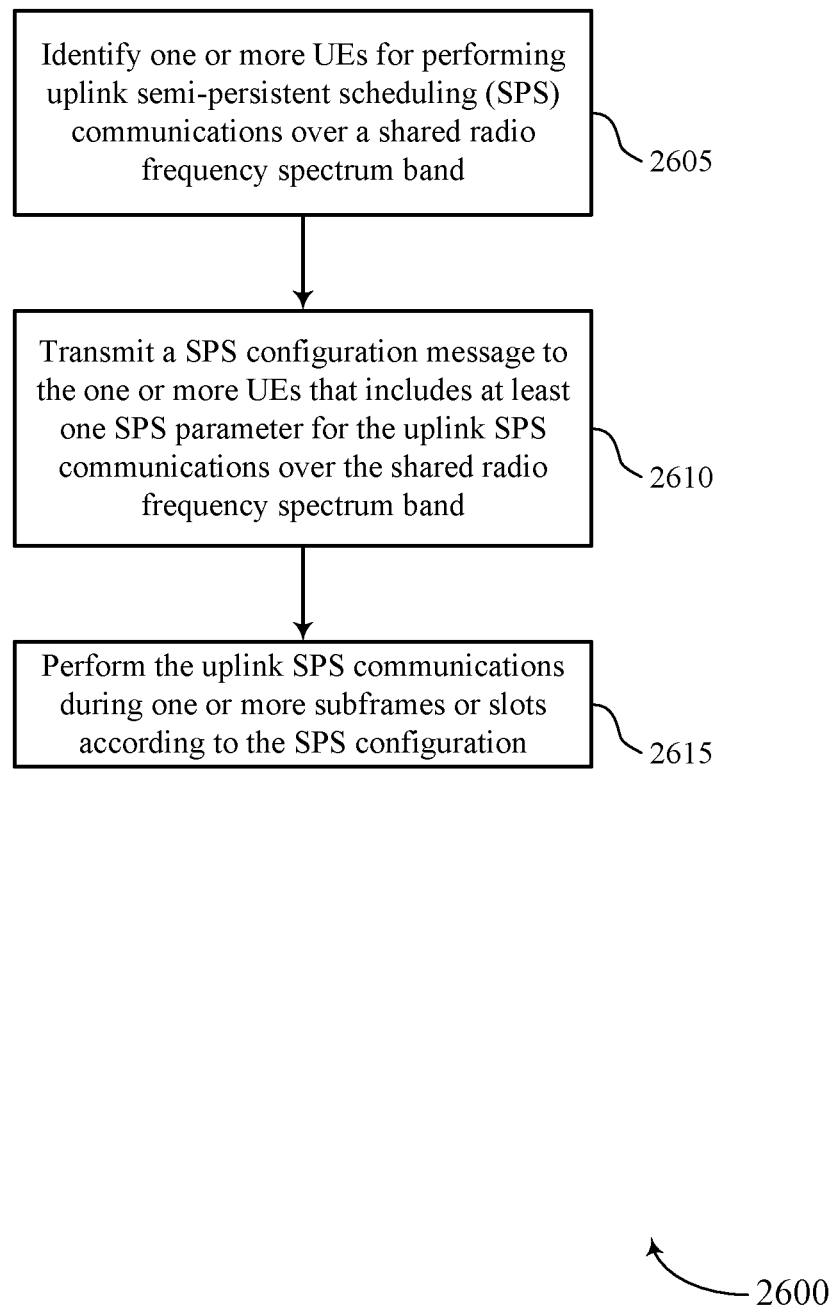

FIG. 26 shows a flowchart illustrating a method 2600 for SPS for shared spectrum in accordance with aspects of the present disclosure. The operations of method 2600 may be implemented by a base station 105 or its components as described herein. For example, the operations of method 2600 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At 2605 the base station 105 may identify one or more UEs for performing uplink SPS communications over a shared radio frequency spectrum band. The operations of 2605 may be performed according to the methods described herein. In certain examples, aspects of the operations of 2605 may be performed by an SPS UE manager as described with reference to FIGS. 15 through 18.

At 2610 the base station 105 may transmit an SPS configuration message to the one or more UEs that contains at least one SPS parameter for the uplink SPS communications over the shared radio frequency spectrum band. The operations of 2610 may be performed according to the methods described herein. In certain examples, aspects of the operations of 2610 may be performed by an SPS configuration manager as described with reference to FIGS. 15 through 18.

At 2615 the base station 105 may perform the uplink SPS communications during one or more subframes or slots according to the SPS configuration. The operations of 2615 may be performed according to the methods described herein. In certain examples, aspects of the operations of 2615 may be performed by an SPS communication manager as described with reference to FIGS. 15 through 18.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS).

LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, and LTE-A Pro applications, including in 5G or NR applications, among others.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
receiving a semi-persistent scheduling (SPS) configuration message from a base station, the SPS configuration message comprising at least one SPS parameter for downlink SPS communications over a shared radio frequency spectrum band;
determining that a message was not received on a channel of the shared radio frequency spectrum during a first subframe or slot according to the SPS configuration;
identifying, based at least in part on the SPS configuration, a second subframe or slot allocated for the downlink SPS communications, wherein the second subframe or slot replaces the first subframe or slot for transmission of the message; and
performing the downlink SPS communications during one or more subframes or slots according to the SPS configuration based at least in part on the determination.

2. The method of claim 1, wherein performing the downlink SPS communications comprises:
receiving, based at least in part on the determination, a downlink grant indicating the second subframe or slot that replaces the first subframe or slot for transmission of the message; and
receiving the message on the channel during the second subframe or slot in accordance with the downlink grant.

3. The method of claim 2, further comprising:
determining that the channel is unavailable for transmission of an acknowledgement/negative acknowledgement (ACK/NACK) message during a third subframe or slot according to the downlink grant; and
dropping the ACK/NACK message based at least in part on the channel being unavailable.

4. The method of claim 2, wherein receiving the downlink grant comprises:
obtaining a new data indicator (NDI) field of the downlink grant that is set based at least in part on an unavailability of the channel during the first subframe or slot.

5. The method of claim 2, wherein receiving the downlink grant comprises:
obtaining a new hybrid automatic repeat request (HARQ) process assignment for the message based at least in part on an unavailability of the channel during the first subframe or slot.

6. The method of claim 2, wherein the downlink grant comprises an indication of an acknowledgement/negative acknowledgement (ACK/NACK) resource associated with the message.

7. The method of claim 6, further comprising:
receiving a configuration message indicating a plurality of possible physical uplink control channel (PUCCH) resources for ACK/NACK transmissions, wherein the indication of the ACK/NACK resource in the downlink grant identifies one of the possible PUCCH resources.

8. The method of claim 1, wherein performing the downlink SPS communications comprises:
identifying, based at least in part on the determination, a configured window within an SPS period; and
receiving a grantless transmission of the message on the channel during the second subframe or slot.

9. The method of claim 8, further comprising:
determining, based at least in part on the SPS configuration, a window size of the configured window, wherein the second subframe or slot is identified based at least in part on the determining.

10. The method of claim 8, wherein identifying the second subframe or slot comprises:
decoding a plurality of consecutive subframes or slots within the configured window to detect the grantless transmission of the message.

11. The method of claim 8, further comprising:
receiving a configuration message indicating a window size associated with the configured window, the window size comprising a plurality of subframes or slots within the configured window.

12. The method of claim 8, further comprising:
determining a transmission parameter associated with receiving the message during the first subframe or slot, wherein the grantless transmission is received based at least in part on the transmission parameter.

13. The method of claim 12, wherein the transmission parameter comprises at least one of: a modulation and coding scheme (MCS) to be used for reception of the message during the first subframe or slot, or a resource allocation scheme associated with the reception of the message during the first subframe or slot, or a combination thereof.

14. The method of claim 8, further comprising:
transmitting, based at least in part on receiving the message and in accordance with the SPS configuration, at least one of an acknowledgement (ACK) message using a first physical random access channel (PRACH) waveform or a negative acknowledgement (NACK) message using a second PRACH waveform.

15. The method of claim 1, wherein performing the downlink SPS communications comprises:
detecting an SPS trigger in a control signal of a subframe or slot, the SPS trigger based at least in part on the SPS parameter; and receiving a downlink message in the subframe or slot in accordance with the SPS trigger.

16. The method of claim 15, further comprising:
descrambling a downlink control indicator (DCI) of the control signal using an identifier associated with the SPS configuration to detect the SPS trigger.

17. The method of claim 16, wherein the identifier comprises a group common SPS cell radio network temporary identifier (GC-SPS C-RNTI).

18. The method of claim 15, further comprising:
monitoring a plurality of subframes or slots within a configured window within an SPS period to detect the SPS trigger, wherein the plurality of subframes or slots comprise the subframe or slot.

19. The method of claim 15, wherein the at least one SPS parameter comprises an SPS periodicity, or a number of hybrid automatic repeat/request (HARD) processes associated with the SPS configuration, or a combination thereof.

20. The method of claim 15, wherein the SPS configuration message does not identify the subframe or slot for an SPS transmission of the downlink message.

21. The method of claim 15, further comprising:
decoding a group common physical downlink control channel (GC-PDCCH) to detect the SPS trigger.

22. The method of claim 21, wherein the GC-PDCCH indicates the SPS trigger for the UE and for at least one additional UE.

23. The method of claim 1, wherein performing the downlink SPS communications comprises:
determining that no SPS packet was received at the one or more subframes or slots allocated for the downlink SPS communications;
detecting an SPS trigger at a subsequent subframe or slot based at least in part on the determining; and
receiving a message on a channel during the subsequent subframe or slot and in accordance with the SPS trigger.

24. A method for wireless communications, comprising:
identifying one or more user equipment (UE) for performing downlink semi-persistent scheduling (SPS) communications over a shared radio frequency spectrum band;
transmitting an SPS configuration message to the one or more UEs that comprises at least one SPS parameter for the downlink SPS communications over the shared radio frequency spectrum band;
determining that a channel of the shared radio frequency spectrum is unavailable for a transmission of a message during a first subframe or slot according to the SPS configuration;
identifying a second subframe or slot allocated for the downlink SPS communications, wherein the second subframe or slot replaces the first subframe or slot for transmissions of the message; and
performing the downlink SPS communications during one or more subframes or slots according to the SPS configuration based at least in part on the determination.

25. The method of claim 24, wherein performing the downlink SPS communications comprises:
transmitting a downlink grant based at least in part on the unavailability of the channel, the downlink grant indicating the second subframe or slot that replaces the first subframe or slot for transmission of the message; and
attempting to transmit the message on the channel during the second subframe or slot in accordance with the downlink grant.

26. The method of claim 25, further comprising:
setting a new data indicator (NDI) field of the downlink grant based at least in part on the unavailability of the channel.

27. The method of claim 25, wherein attempting to transmit the message on the channel during the second subframe or slot comprises:
determining that the channel is unavailable during the second subframe or slot for transmitting the message; and
assigning the message to a new hybrid automatic repeat request (HARQ) process based at least in part on the unavailability of the channel during the second subframe or slot.

28. The method of claim 25, wherein the downlink grant comprises an indication of an acknowledgement/negative acknowledgement (ACK/NACK) resource associated with the message.

29. The method of claim 28, further comprising:
transmitting a configuration message indicating a plurality of possible physical uplink control channel (PUCCH) resources for ACK/NACK transmissions, wherein the indication of the ACK/NACK resource in the downlink grant identifies one of the possible PUCCH resources.

30. The method of claim 25, wherein attempting to transmit the message on the channel during the second subframe or slot comprises:
determining that the channel is unavailable during the second subframe or slot for transmitting the message; and
dropping a packet comprising the message based on the unavailability of the channel during the second subframe or slot.

31. The method of claim 25, wherein attempting to transmit the message on the channel during the second subframe or slot comprises:
performing a clear channel assessment (CCA) on the channel prior to the second subframe or slot; and
transmitting the message on the channel during the second subframe or slot based on a result of the CCA.

32. The method of claim 24, wherein performing the downlink SPS communications comprises:
performing a grantless transmission of the message on the channel during the selected second subframe or slot.

33. The method of claim 32, further comprising:
determining a window size associated with a configured window within an SPS period, wherein the second subframe or slot is selected based at least in part on the window size.

34. The method of claim 33, further comprising:
transmitting a configuration message indicating a window size associated with the configured window, the window size comprising a plurality of subframes or slots within the configured window.

35. The method of claim 32, further comprising:
determining a transmission parameter associated with transmission of the message during the first subframe or slot, wherein the grantless transmission is performed based at least in part on the transmission parameter.

36. The method of claim 35, wherein the transmission parameter comprises at least one of: a modulation and coding scheme (MCS) to be used for transmission of the message during the first subframe or slot, or a resource allocation scheme associated with the transmission of the message during the first subframe or slot, or a combination thereof.

37. The method of claim 32, further comprising:
identifying a first physical random access channel (PRACH) waveform to use for acknowledgement (ACK) messages transmitted in accordance with the SPS configuration; and
identifying a second PRACH waveform to use for negative acknowledgement (NACK) messages transmitted in accordance with the SPS configuration.

38. The method of claim 32, further comprising:
determining that a defined number of user equipment (UE) are associated with active SPS processes; and
selecting an SPS periodicity of the SPS configuration based at least in part on the determining.

39. The method of claim 24, wherein performing the downlink SPS communications comprises:
selecting a subframe or slot for an SPS transmission of a downlink message to a UE of the one or more UEs;
transmitting a control signal during the subframe or slot, the control signal comprising an SPS trigger based at least in part on the SPS parameter for the UE; and
transmitting the downlink message to the UE during the subframe or slot in accordance with the SPS trigger.

40. The method of claim 39, wherein the at least one SPS parameter comprises an SPS periodicity, or a number of hybrid automatic repeat/request (HARD) processes associated with the SPS configuration, or a combination thereof.

41. The method of claim 39, wherein the SPS configuration message does not identify the subframe or slot for the SPS transmission of the downlink message.

42. The method of claim 39, further comprising:
configuring a group common physical downlink control channel (GC-PDCCH) to indicate the SPS trigger for the UE.

43. The method of claim 42, further comprising:
configuring one or more bits in the GC-PDCCH to indicate the SPS trigger for the UE and at least one additional UE.

44. The method of claim 39, further comprising:
scrambling a downlink control indicator (DCI) of the control signal using an identifier associated with the SPS configuration to indicate the SPS trigger.

45. The method of claim 44, wherein the identifier comprises a group common SPS cell radio network temporary identifier (GC-SPS C-RNTI).

46. An apparatus for wireless communications, comprising:
a processor;
memory in electronic communication with the processor; and
instructions stored in the memory and executable by the processor to:
receive a semi-persistent scheduling (SPS) configuration message from a base station, the SPS configuration message comprising at least one SPS parameter for downlink SPS communications over a shared radio frequency spectrum band;
determining that a message was not received on a channel of the shared radio frequency spectrum during a first subframe or slot according to the SPS configuration;
identify, based at least in part on the SPS configuration, a second subframe or slot allocated for the downlink SPS communications, wherein the second subframe or slot replaces the first subframe or slot for transmission of the message; and
perform the downlink SPS communications during one or more subframes or slots according to the SPS configuration based at least in part on the determination.

47. The apparatus of claim 46, wherein the instructions executable by the processor to perform the downlink SPS communications comprise instructions executable by the processor to:
receive, based at least in part on the determination, a downlink grant indicating the second subframe or slot that replaces the first subframe or slot for transmission of the message; and
receive the message on the channel during the second subframe or slot in accordance with the downlink grant.

48. An apparatus for wireless communications, comprising:
a processor;
memory in electronic communication with the processor; and
instructions stored in the memory, wherein the instructions are executable by the processor to:
identify one or more user equipment (UE) for performing downlink semi-persistent scheduling (SPS) communications over a shared radio frequency spectrum band;
transmit an SPS configuration message to the one or more UEs that comprises at least one SPS parameter for the downlink SPS communications over the shared radio frequency spectrum band;
determine that a channel of the shared radio frequency spectrum is unavailable for a transmission of a message during a first subframe or slot according to the SPS configuration;
identify a second subframe or slot allocated for the downlink SPS communications, wherein the second subframe or slot replaces the first subframe or slot for transmissions of the message; and
perform the downlink SPS communications during one or more subframes or slots according to the SPS configuration based at least in part on the determination.

49. The apparatus of claim 48, wherein the instructions executable by the processor to perform the downlink SPS communications comprise instructions executable by the processor to:
transmit a downlink grant based at least in part on the unavailability of the channel, the downlink grant indicating the second subframe or slot that replaces the first subframe or slot for transmission of the message; and
attempt to transmit the message on the channel during the second subframe or slot in accordance with the downlink grant.

* * * * *